US012338184B2

(12) United States Patent
Ren et al.

(10) Patent No.: US 12,338,184 B2
(45) Date of Patent: Jun. 24, 2025

(54) METHOD FOR FORMING A CERAMIC AEROGEL

(71) Applicant: The Research Foundation for The State University of New York, Amherst, NY (US)

(72) Inventors: Shenqiang Ren, Williamsville, NY (US); Ruizhe Yang, Buffalo, NY (US); Binbo Chai, Buffalo, NY (US); Feng Hu, Buffalo, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 996 days.

(21) Appl. No.: 17/422,441

(22) PCT Filed: Jan. 13, 2020

(86) PCT No.: PCT/US2020/013409
§ 371 (c)(1),
(2) Date: Jul. 12, 2021

(87) PCT Pub. No.: WO2020/146901
PCT Pub. Date: Jul. 16, 2020

(65) Prior Publication Data
US 2022/0089503 A1 Mar. 24, 2022

Related U.S. Application Data

(60) Provisional application No. 62/861,892, filed on Jun. 14, 2019, provisional application No. 62/791,778, filed on Jan. 12, 2019.

(51) Int. Cl.
*C04B 38/10* (2006.01)
*C04B 35/14* (2006.01)
(Continued)

(52) U.S. Cl.
CPC .............. *C04B 38/10* (2013.01); *C04B 35/14* (2013.01); *C04B 35/62218* (2013.01);
(Continued)

(58) Field of Classification Search
CPC ....................................................... C04B 38/10
See application file for complete search history.

(56) References Cited

U.S. PATENT DOCUMENTS 6,602,449 B1  8/2003  Grader et al.
8,129,300 B2  3/2012  His et al.
(Continued)

FOREIGN PATENT DOCUMENTS

CN    1304390 A    7/2001
CN    102026939 A   4/2011
(Continued)

OTHER PUBLICATIONS

First Office Action for Chinese Patent Application 202080020335.3 issued by the Chinese Patent Office of the State Intellectual Property Office, dated Jun. 9, 2022. (8 pgs.).
(Continued)

*Primary Examiner* — Edmund H Lee
(74) *Attorney, Agent, or Firm* — Haynes and Boone, LLP; Randall C. Brown

(57) ABSTRACT

Provided are ceramic foams. The ceramic foams may have a hierarchical pore gradient. The ceramic foams may be silica aerogels. The ceramic foams may be made by reaction of one or more precursors in the presence of an inert gas generated by a pore-forming gas-forming additive. The ceramic foams may be used as insulating materials.

11 Claims, 47 Drawing Sheets

(51) Int. Cl.
    *C04B 35/622* (2006.01)
    *C04B 38/00* (2006.01)
    *C04B 38/02* (2006.01)

(52) U.S. Cl.
    CPC .... *C04B 35/62222* (2013.01); *C04B 38/0025* (2013.01); *C04B 38/0054* (2013.01); *C04B 38/0067* (2013.01); *C04B 38/02* (2013.01); *C04B 2235/3418* (2013.01); *C04B 2235/422* (2013.01); *C04B 2235/5454* (2013.01); *C04B 2235/9607* (2013.01)

(56) References Cited

U.S. PATENT DOCUMENTS

| | | |
|---|---|---|
| 2010/0179288 A1 | 7/2010 | Leventis et al. |
| 2011/0064876 A1 | 3/2011 | Grader et al. |
| 2011/0097259 A1* | 4/2011 | Del-Gallo ............ B01J 35/19 502/100 |
| 2012/0047860 A1 | 3/2012 | Boger et al. |
| 2015/0290834 A1 | 10/2015 | Klotz et al. |
| 2018/0029893 A1 | 2/2018 | Siller et al. |
| 2018/0282232 A1 | 10/2018 | Yang et al. |
| 2018/0305215 A1 | 10/2018 | Kim et al. |
| 2021/0016239 A1 | 1/2021 | Kim et al. |

FOREIGN PATENT DOCUMENTS

| | | | |
|---|---|---|---|
| CN | 102093075 | A | 6/2011 |
| CN | 202146697 | U | 2/2012 |
| CN | 102765725 | * | 11/2012 |
| CN | 104529519 | A | 4/2015 |
| CN | 106747576 | A | 5/2017 |
| CN | 107628626 | A | 1/2018 |
| CN | 107686117 | * | 2/2018 |
| CN | 108658576 | A | 10/2018 |
| DE | 102008027418 | A1 | 12/2009 |
| JP | H04224511 | A | 8/1992 |
| KR | 20060124353 | * | 12/2006 |
| KR | 20170054817 | A | 5/2017 |
| WO | 2003/070636 | A1 | 8/2003 |
| WO | WO 2013/009984 | A2 | 1/2013 |
| WO | WO2013009984 | * | 1/2013 |
| WO | WO 2016/132117 | A1 | 8/2016 |
| WO | WO2016132117 | * | 8/2016 |

OTHER PUBLICATIONS

English Translation of First Office Action for Chinese Patent Application 202080020335.3 issued by the Chinese Patent Office of the State Intellectual Property Office, dated Jun. 9, 2022. (9 pgs.).

International Search Report and Written Opinion issued by the United States Patent and Trademark Office as International Searching Authority for International Application No. PCT/US2020/013409, dated May 15, 2020, 12 pgs.

International Preliminary Report on Patentability issued by The International Bureau of WIPO for International Application No. PCT/US2020/013409, dated Jun. 16, 2021, 9 pgs.

Wu, X., et al., Silica aerogels formed from soluble silicates and methyl trimethoxysilane (MTMS) using CO2 gas as a gelation agent, Ceramics International, Jan. 2018, vol. 44, No. 1, pp. 821-829.

Hong, S.K., et al., Fabrication of Spherical Silica Aerogel Granules from Water Glass by Ambient Pressure Drying, Journal of The American Ceramic Society, Jul. 27, 2011, vol. 94, No. 10, pp. 3198 to 3201.

Han, X., Ambient pressure drying synthesis of aerogels, Doctoral Thesis, Newcastle University, 2016, 1 page.

Supplementary Partial European Search Report for European Patent Application No. 20738211.0 issued by the European Patent Office, dated Oct. 5, 2022. (51 pgs.).

Nadiir Bheekhun et al: "Aerogels in Aerospace: An Overview", Advances in Materials Science and Engineering, vol. 2013, Jan. 1, 2013 (Jan. 1, 2013), pp. 1-18, XP055604524, us ISSN: 1687-8434, DOI: 10.1155/2013/406065. (19 pgs.).

Second Chinese Office Action for Chinese Patent Application No. 202080020335.3 issued by the China National Intellectual Property Administration, dated Nov. 15, 2022. (42 pgs.).

English Translation of Second Chinese Office Action for Chinese Patent Application No. 202080020335.3 issued by the China National Intellectual Property Administration, dated Nov. 15, 2022. (13 pgs.).

Yu, Wan Jun, Cell Structure Control and Performance Analysis of Bi-precursor organic-inorganic hybrid silica aerogels, "Full Database of Chinese Chamber Papers", pp. 1-77, publication date May 5, 2016. (4 pgs.).

Seo, Kwangseok et al., Candle-based process for creating a stable superhydrophobic surface, "Carbon", vol. 68, pp. 583-596, publication date: Nov. 22, 2013. (14 pgs.).

Huang, Shuntian et al., Advances in Application Research of Carbon Aerogels in the Electrochemical Field, Yellow Days, Material Guidance, vol. 32, No. S1, pp. 10-16, publication date: May 31, 2018. (7 pgs.).

Han, Xiao et al., Bioinspired synthesis of monolithic and layered aerogels, "Advanced Materials", vol. 30, No. 23, pp. 1706294, Apr. 25, 2018. (7 pgs.).

First Examination Report for Indian Patent Application No. 202117036300 issued by the Indian Patent Office, dated Dec. 15, 2022. (8 pgs.).

Extended European Search Report for European Patent Application No. 20738211.0 issued by the European Patent Office, dated Jan. 12, 2023. (12 pgs.).

\* cited by examiner

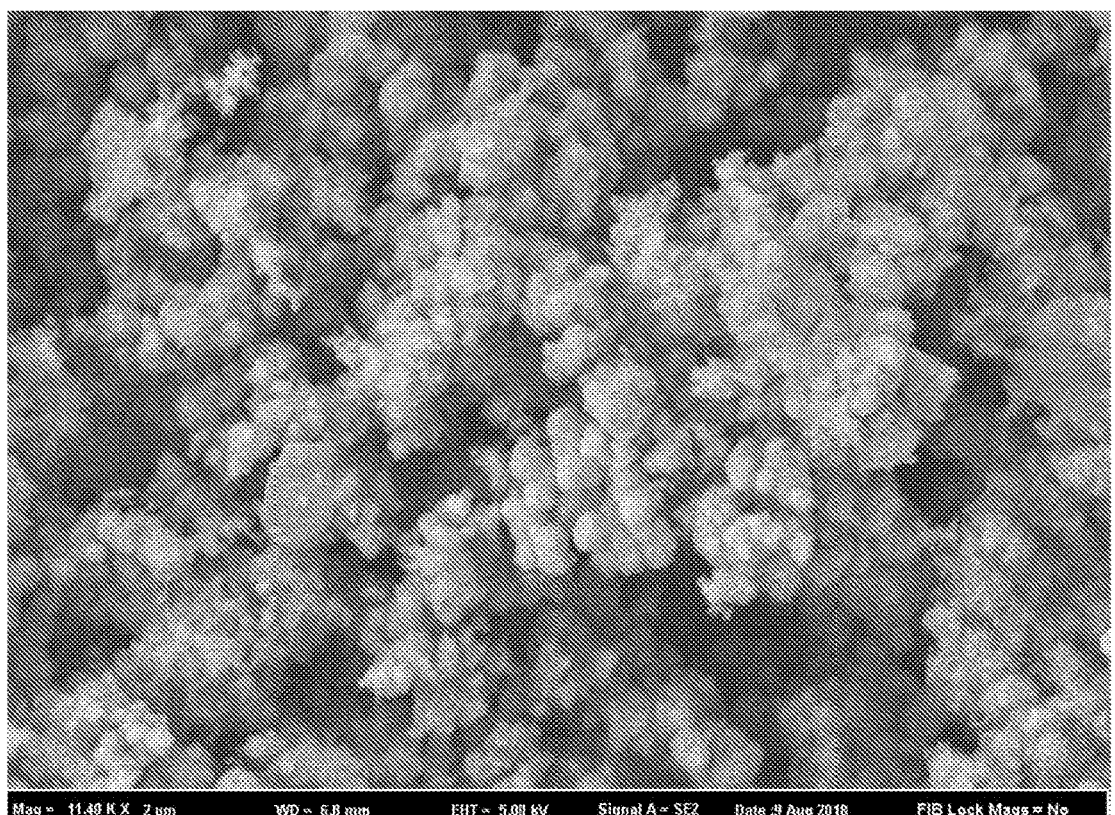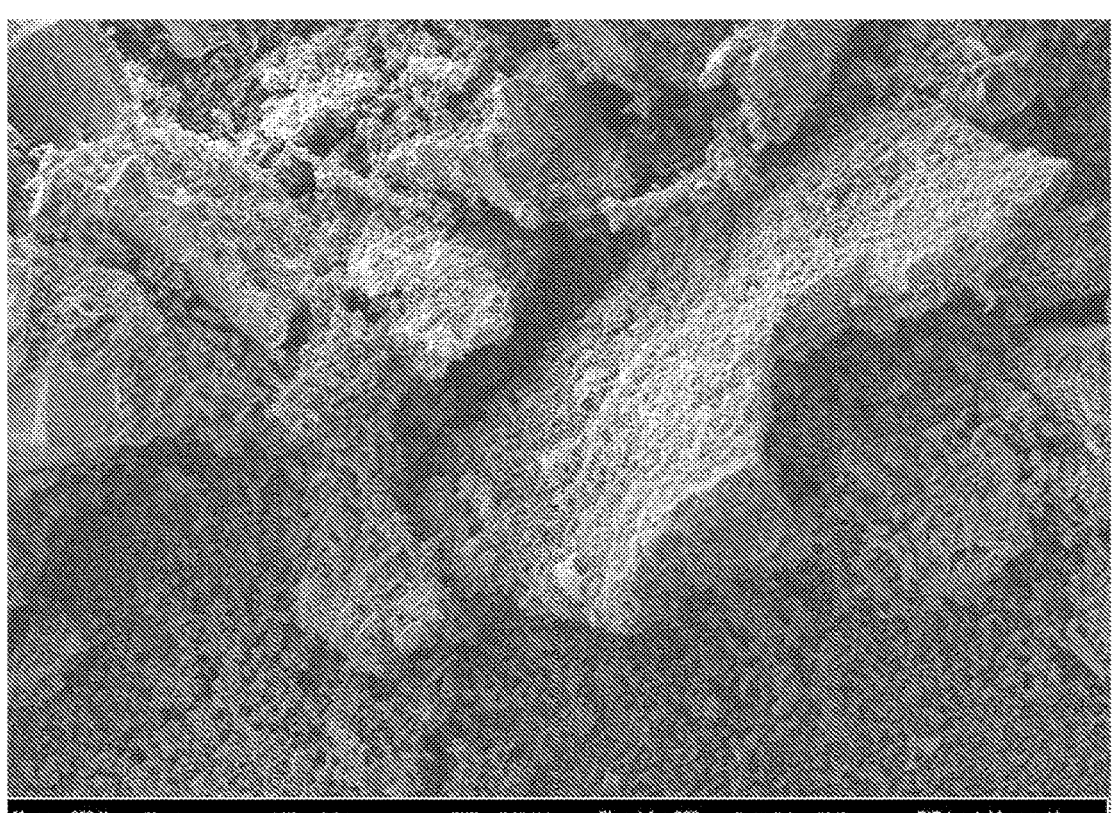
Figure 2

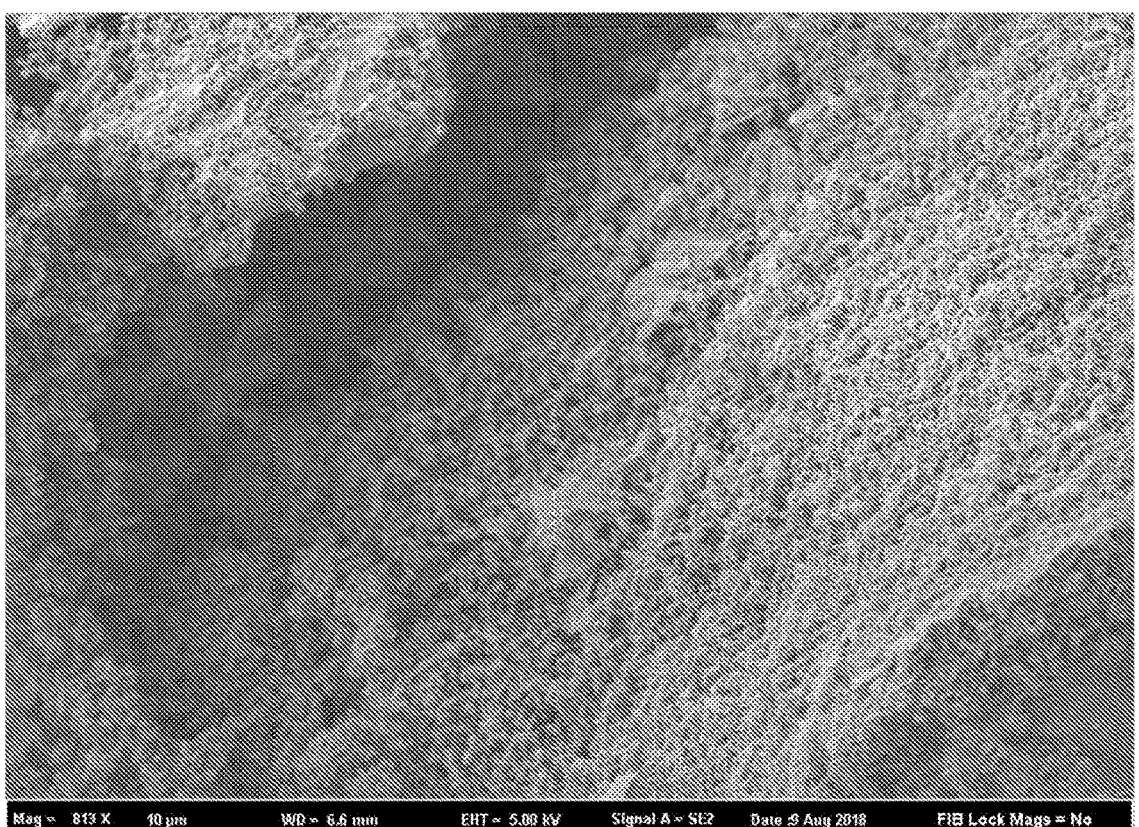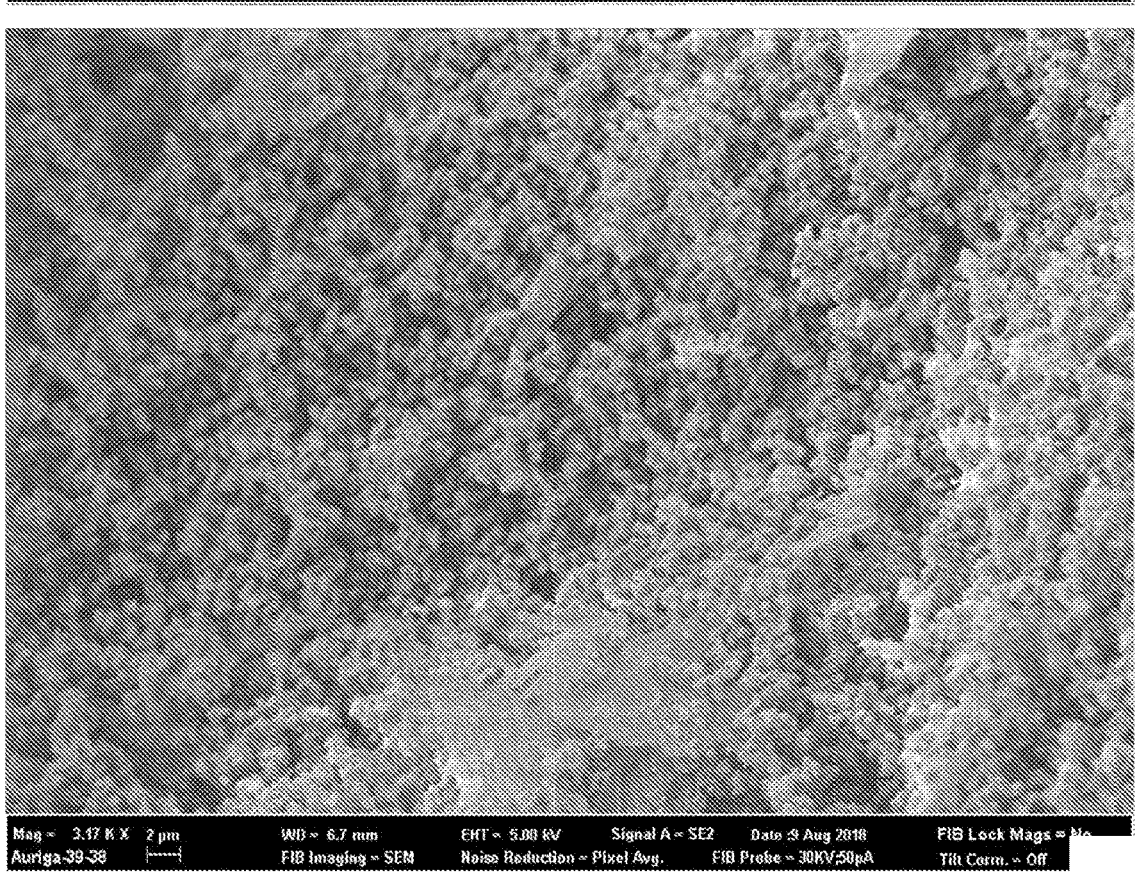
Figure 3

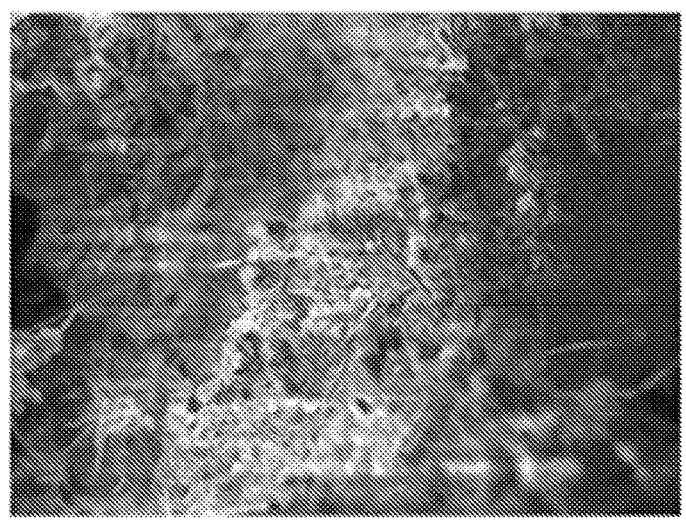
Electron Image 1
O Ka 1
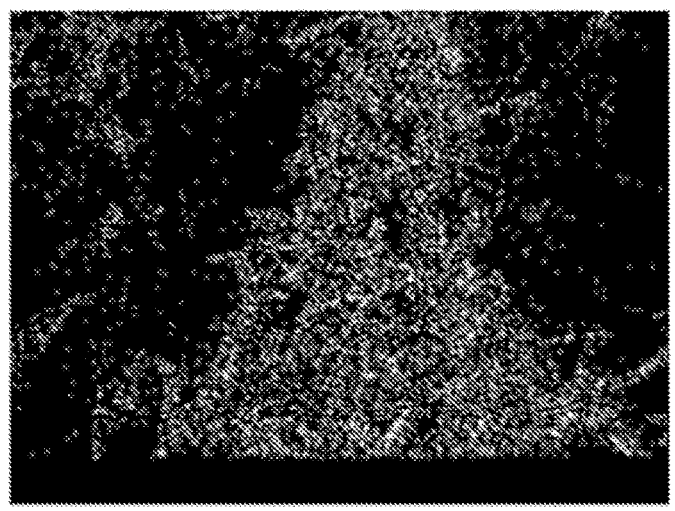
Mg Ka1_2
Figure 4

Si Kα1
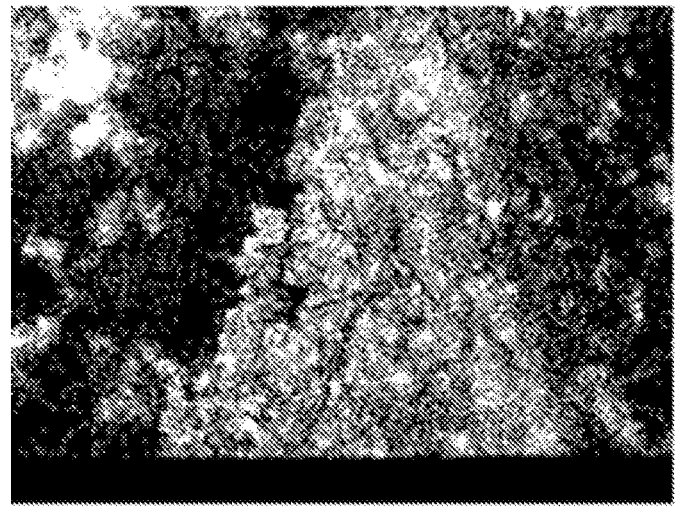
Cl Kα1
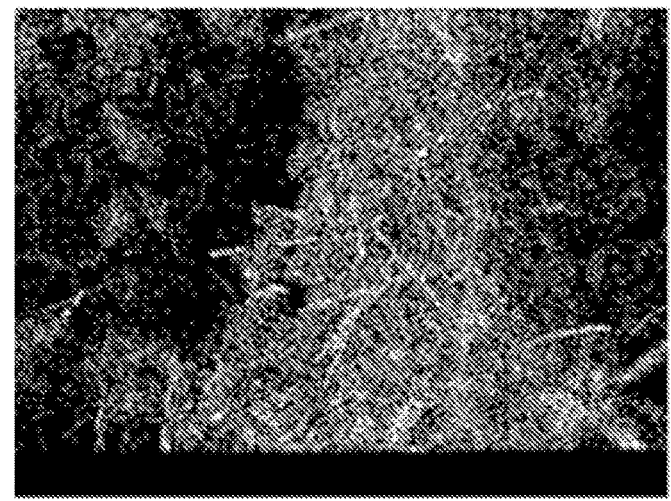
Ca Kα1
Figure 5

| number | Thermal conductivity (W·m⁻¹·K⁻¹) | density(g/mm^3) |
|---|---|---|
| 1 | 0.07631366 | 0.000255 |
| 2 | 0.084926441 | 0.000204 |
| 3 | 0.123743132 | 0.000276 |
| 4 | 0.078712371 | 0.000207 |
| 5 | 0.070331371 | 0.000138 |
| 6 | 0.074646829 | 0.000208 |
| 7 | 0.075204559 | 0.00022372 |
| 8 | 0.073969534 | 0.00022549 |
| 9 | 0.061271 | 0.00019415 |
| 10 | 0.070586 | 0.00012219 |

Figure 10

```
AccuPycII 1340 V2.00
       Serial Number:   464
     Density and Volume Report Sample ID: 181211                    Started:   11/12/18  16:40:13
Sample Mass:  0.0000 g               Completed: 11/12/18  17:10:32
Temperature: 22.6 °C
Number of Purges: 10                 Equilibration Rate: 1.0000 psig/min
Cell Volume:  2.8382 cm3             Expansion Volume:   9.2525 cm3

Volume    Deviation   Density    Deviation   Elapsed    Temperature
Cycle#   cm3       cm3         g/cm3      g/cm3       Time       °C
------   -------   ---------   --------   ---------   --------   -----------
  1      0.0775    -0.0007     0.0000     0.0000      0:13:36    22.6
  2      0.0782     0.0001     0.0000     0.0000      0:14:34    22.6
  3      0.0776    -0.0005     0.0000     0.0000      0:15:32    22.6
  4      0.0781    -0.0000     0.0000     0.0000      0:16:30    22.6
  5      0.0778    -0.0003     0.0000     0.0000      0:17:27    22.5
  6      0.0784     0.0002     0.0000     0.0000      0:18:24    22.6
  7      0.0786     0.0004     0.0000     0.0000      0:19:21    22.5
  8      0.0786     0.0004     0.0000     0.0000      0:20:18    22.6
  9      0.0780    -0.0001     0.0000     0.0000      0:21:15    22.6
 10      0.0785     0.0004     0.0000     0.0000      0:22:11    22.6

Average Volume:    0.0781 cm3      Standard Deviation:  0.0004 cm3
Average Density:   0.0000 g/cm3    Standard Deviation:  0.0000 g/cm3
```

Figure 20

```
AccuPycII 1340 V2.00
    Serial Number: 464
Density and Volume Report
```

Sample ID: 19011001                    Started: 10/01/19  15:09:54
Sample Mass: 0.0000 g                  Completed: 10/01/19  15:26:24
Temperature: 22.9 °C
Number of Purges: 10                   Equilibration Rate: 1.0000 psig/min
Cell Volume: 2.8652 cm3                Expansion Volume: 9.2785 cm3

| Cycle# | Volume cm3 | Deviation cm3 | Density g/cm3 | Deviation g/cm3 | Elapsed Time | Temperature °C |
|---|---|---|---|---|---|---|
| 1 | 0.0638 | -0.0005 | 0.0000 | 0.0000 | 0:09:19 | 23.0 |
| 2 | 0.0638 | -0.0004 | 0.0000 | 0.0000 | 0:10:15 | 22.9 |
| 3 | 0.0638 | -0.0005 | 0.0000 | 0.0000 | 0:11:11 | 23.0 |
| 4 | 0.0651 | 0.0008 | 0.0000 | 0.0000 | 0:12:07 | 23.0 |
| 5 | 0.0648 | 0.0005 | 0.0000 | 0.0000 | 0:13:02 | 22.9 |
| 6 | 0.0652 | 0.0009 | 0.0000 | 0.0000 | 0:13:58 | 23.0 |
| 7 | 0.0640 | -0.0002 | 0.0000 | 0.0000 | 0:14:53 | 23.0 |
| 8 | 0.0638 | -0.0005 | 0.0000 | 0.0000 | 0:15:48 | 23.0 |

Average Volume:  0.0643 cm3        Standard Deviation: 0.0006 cm3
Average Density: 0.0000 g/cm3      Standard Deviation: 0.0000 g/cm3

Figure 21 a
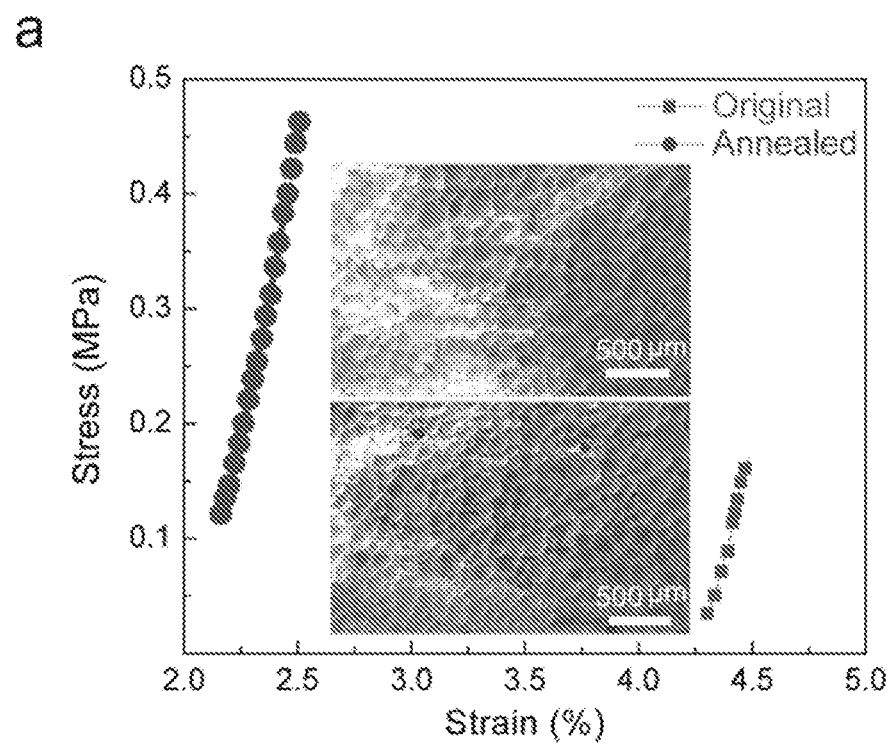
b
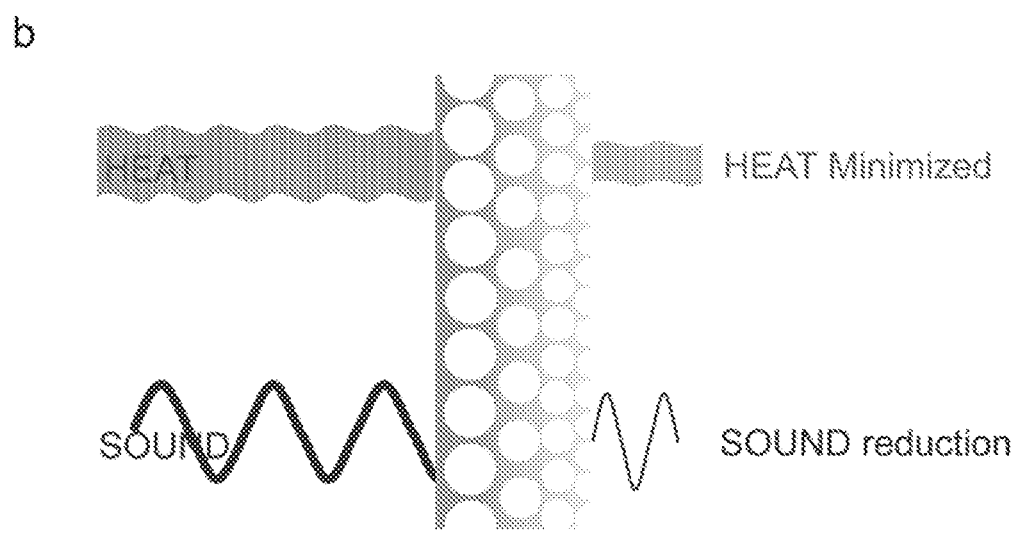
Figure 26

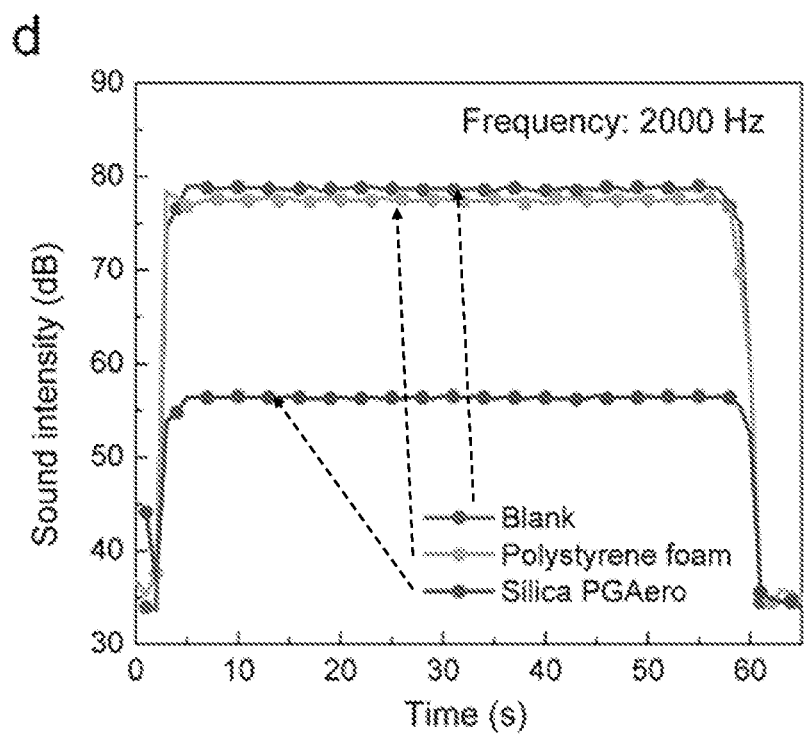
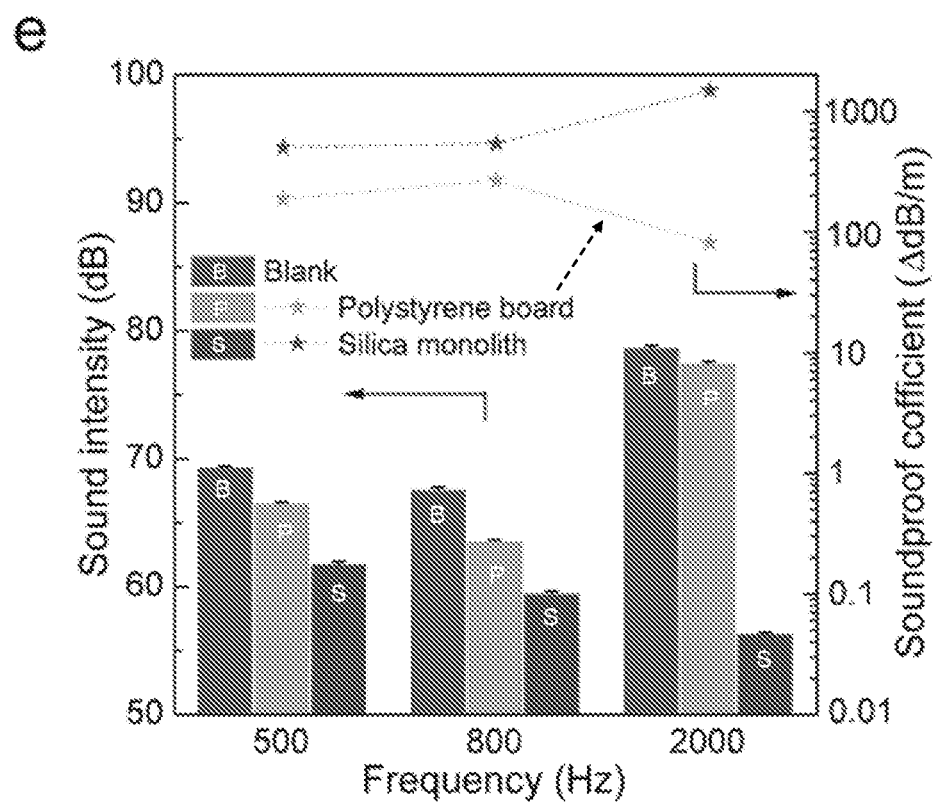
Figure 26 (continued)

| Sample | Tunning |
|---|---|
| PGAero-1 | Original |
| PGAero-5 | TEOS to 2.1 mol L$^{-1}$ |
| PGAero-6 | TEOS to 2.8 mol L$^{-1}$ |
| PGAero-7 | CTAB to 0.15 mol L$^{-1}$ |
| PGAero-8 | UREA to 1.5 mol L$^{-1}$ |
| PGAero-9 | UREA to 4.5 mol L$^{-1}$ |
| PGAero-10 | Acetic Acid to 1.5 mmol L$^{-1}$ |

Figure 29

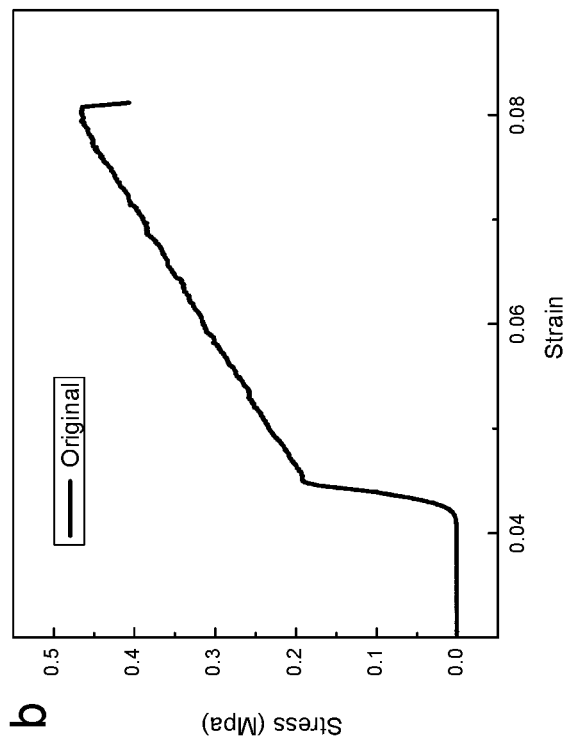
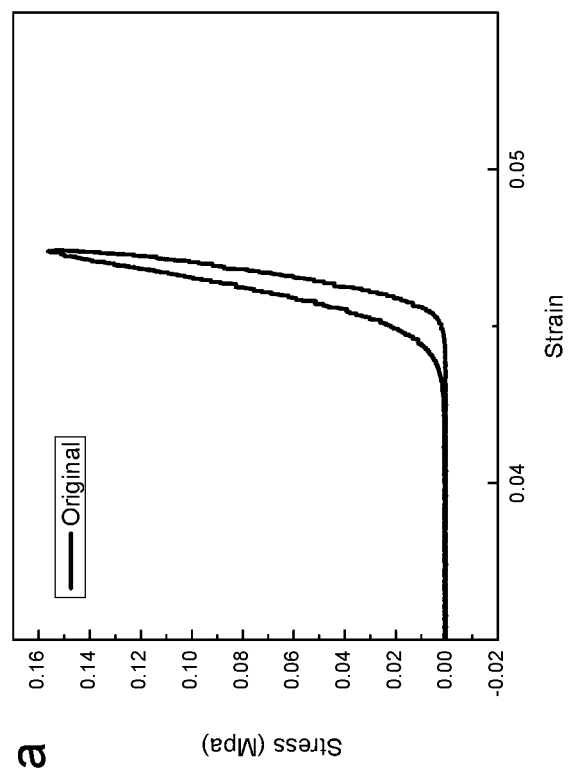
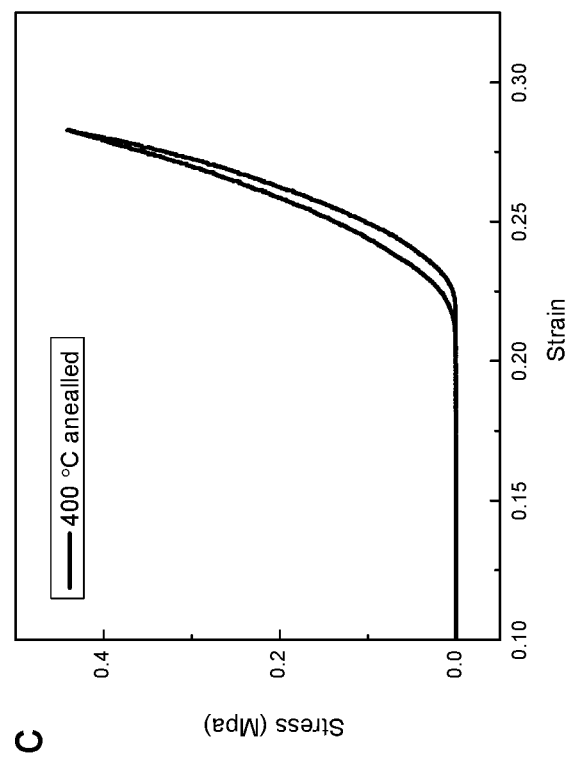
Figure 32

METHOD FOR FORMING A CERAMIC AEROGEL

CROSS REFERENCE TO RELATED APPLICATIONS

This application is a U.S. National Stage patent application of International Patent Application No. PCT/US2020/013409, filed Jan. 13, 2020, which claims priority to U.S. Provisional Application No. 62/791,778, filed on Jan. 12, 2019, and U.S. Provisional Application No. 62/861,892, filed on Jun. 14, 2019, the disclosures of which are hereby incorporated by reference.

BACKGROUND OF THE DISCLOSURE

Searching for light-weight and mechanical strong superinsulation (thermal and acoustic) is key for the energy-efficiency buildings and many other sectors, while the low-cost manufacturing with scalability is indispensable for large-scale, practical, and energy saving applications.

HVAC (heating, ventilation and air conditioning) of buildings accounts for 40% of global energy consumption. HVAC of existing buildings and future construction can be improved by installing improved thermal insulation and thus reduce $CO_2$ emission. An economical approach to decrease thermal losses of buildings is to install a thicker layer of insulation materials. However, it occupies more space, and therefore living space would decrease. Silica aerogel can achieve the same thermal insulation performance with only half of the thickness of traditionally installed insulation materials. The silica aerogels exhibit the lowest thermal conductivity of any solid known, of order 0.015 W/m·K at ambient temperature, pressure, and relative humidity. Such low thermal conductivity results from the combination of its low density and pores created during fabrication. In the building industry, space saving is one of the most important reasons to use high-performance insulation materials, for building retrofit as well as thin facade insulation, side balcony and roof balcony construction. The major drawback for large-scale usage of silica aerogels as standard thermal insulation in buildings is their production cost.

Superinsulation materials require the tight regulation of heat transfer. In this context, silica aerogel is one of the most efficient thermal insulation materials, which can even reach an ultralow thermal conductivity less than still air. Superinsulation of ceramic aerogels results from the geometrical morphology of porous materials including high pore volume, optimized void size and porous solid walls with boundaries and defects, where the confined thermal conduction through the gas voids and dissipative path for heat transport through the low solid fraction under phonon scattering contribute its good thermal insulation. Even with its superinsulation performance, the large-scale silica aerogel applications have been prohibitive due to its expensive and time-consuming manufacturing through the supercritical drying, which avoids the capillary induced structural degradation during the drying process. In addition, poor mechanical stability of aerogels prohibits its monolithic applications. Although the additives, such as carbon nanowires and polymer fibers, are used to be blended with the aerogel to increase mechanical stability, it is still quite challenging to achieve mechanical strength without compromising the insulation performance.

The aerogel-like foam materials with the pore size gradient, inspired by the human-skin structure, has recently caught interests due to its asymmetric structure which can not only confer superior thermal insulating performance but provide the basis for the development of new functionalities. In addition, such aerogel-like foam materials with the pore gradient structures show promising in optimizing mechanical properties over dense or porous materials with uniform pore size. The gradient-pore poly(lactic acid) foam with the same porosity has been found with a ~20% more enhancement on sound absorption capacity than that of uniform foam. The silica foams with controlled hollow nano/microstructures for the tunable void fraction, pore size, and mass density have played in the development of superinsulation materials.

Light-weight aerogel materials may be desirable for thermal insulation. However, its low mechanical integrity and high-cost manufacturing hampered its progress for large-scale adoption in energy-efficient building insulations. In addition, it may be important for thermal management to achieve more soundproof and heat-resistant characteristics.

The interior surface chemistry of silica aerogel plays an important role in its thermal and chemical behaviors due to its extraordinarily large surface-to-volume ratio ($\sim2\times10^9$ $m^{-1}$) and specific surface area ($\sim900$ $m^2/g$). The traditional supercritical drying produces a surface exclusively covered with hydroxyl (—OH) groups ($\sim5$-OH/$nm^2$) with strong hydrogen-bonding capability (hydrophilic). As a result, they absorb water from moist air, which increases their mass by up to 20%. Furthermore, condensation of moisture within a nanometer-scale pore exerts capillary forces strong enough to fracture the silica backbone and to collapse the aerogel monolith. In addition, at a relatively high temperature, the radiative component of thermal conductance in silica aerogel is significant.

Silica aerogels are usually prepared via a sol-gel process coupled with supercritical extraction to maintain the structural integrity and high porosity. The conventional aerogel manufacturing via supercritical extraction suffers from numerous limitations, including high energy consumption, large environmental footprint, long processing time, and high material cost. However, the complex processing and high pressure involved in the supercritical drying restricts its scalability for large-scale production of silica aerogel for building insulation. The most common aerogel synthesis approach involves the liquid extraction from a gel by critical point drying using a low surface tension supercritical fluid (e.g. $CO_2$ or $CH_4$). However, supercritical extraction requires expensive high pressure equipment and it can be a hazardous and time-consuming process. Alternative approaches include organic solvent sublimation that are challenging to scale up due to the energy intensive requirements of high vacuum for the solvent sublimation and relatively low temperature for freeze drying. The conventional ambient pressure-drying process, as a less energy intensive alternative method, replaces the original solvent used for the gel formation with organic low surface tension solvents, such as hexane, heptane, and octane, etc. In addition, it usually leads to the generation of hydrochloric acid, which further demands organic solvents to remove. Therefore, current APD methods are nonetheless still a time-consuming and costly process, due to use of a large amount of organic solvent. All these limit large-scale aerogel production for building insulation. According to the report by Allied market research in 2014, the interest in silica aerogel insulation ($18.5/ft 2-inch) is illustrated by the rapid growth of the aerogel market: in 2004, about $25M of aerogel insulation materials were sold, but this had increased to $500M by 2013 (expecting $1,927M by 2021). Still the major drawback for large-scale adoption of silica aerogels as a standard insulation material in buildings is their high production cost. As a result, current aerogel production is mostly used for industrial applications, such as pipeline insulation.

New methods for insulation materials (e.g., gradient-structured insulation materials) with desirable mechanical integrity and low cost are desirable, particularly for the scalable manufacturing of insulation materials (e.g., gradient-structured insulation materials).

SUMMARY OF THE DISCLOSURE

In this disclosure, in various examples, scalable ceramic aerogels, such as, for example, pore-gradient ceramic aerogels, which may be referred to as ceramic foams, monoliths (e.g., PGAeros) were designed and synthesized. The low-cost manufacturing of PGAeros is further facilitated by the in-situ gas bubble formation to support the pore gradient. The PGAeros can exhibit a robust mechanical and thermal stability across a broad temperature range (e.g., 0.040 W $m^{-1}$ $K^{-1}$, and a compressive strength of 100.56 MPa, respectively). The integral ceramic monolith nature of, for example, PGAeros can exhibit robust soundproof and fire-resistance performance. This demonstration of scalable manufacturing of ceramic aerogel materials may be used in thermal insulation applications with, for example, desirable thermal management, mechanical strength, low mass density, and soundproof and fire-retardant performance.

In an aspect, the present disclosure provides methods of making ceramic foams. The ceramic foams may be referred to as ceramic aerogels or ceramic-aerogel-like foams (e.g., silica-aerogel-like foams). The ceramic foams may be silica aerogels. The silica aerogels may be silica aerogel films. The methods are based on in-situ generation of a pore-forming gas reaction. The reaction may be carried out in a sealed environment (e.g., reaction a greater than ambient pressure). The ceramic foams may be formed under hydrothermal conditions. In an example, a method does not comprise use of any supercritical gas species. Non-limiting examples of methods are provided herein.

In various examples, a method for forming a ceramic foam: contacting (e.g., which may be in a sealed environment, such as, for example, a sealed vessel) one or more ceramic precursor(s) (e.g., one or more silica precursor(s)); one or more pore-forming gas-forming additive(s) (one or more inert gas-generating agent(s)); one or more catalyst(s); and optionally, one or more additive(s), where the contacting results in formation of an inert gas (e.g., carbon dioxide) and the ceramic foam (e.g., a silica aerogel). The ceramic foam (e.g., a silica aerogel) may be formed under hydrothermal conditions. The reactants (ceramic precursor(s), pore-forming gas-forming additive(s), catalyst(s); and optionally, additive(s) may be added/contacted in any order. The reactants may be contacted in a single vessel. The as-formed ceramic foam (e.g., a silica aerogel) may be subjected to ambient pressure drying (APD). In various examples, a method further comprises post-ceramic foam formation modification of at least a portion of a surface of the ceramic foam (e.g., the silica aerogel). Advanced surface modification, including, for example, trimethylchlorosilane treatment and/or carbon coating, may be used to engineer capillarity and superhydrophobicity. A method may be a continuous (e.g., roll-to-roll) method.

In an aspect, the present disclosure provides ceramic foams. The ceramic foams may be ceramic foam films. The ceramic foams may be referred to as ceramic aerogels. The ceramic foams may be silica aerogels. The silica aerogels may be silica aerogel films. Non-limiting examples of ceramic foams are provided herein. A ceramic foam material (e.g., a ceramic foam composite material) comprises a ceramic foam. A ceramic foam comprises matrix of ceramic material. A ceramic foam may be made by a method of the present disclosure. The ceramic foam (e.g., silica aerogel) may have various forms. For example, the ceramic foam (e.g., silica aerogel) is a monolith. In another example, the ceramic foam (e.g., silica aerogel) is a film. A ceramic foam (e.g., silica aerogel) film may be a free-standing film or be disposed on a substrate. A ceramic foam (e.g., silica aerogel) film may be infiltrated in a substrate. The ceramic foam may be porous and exhibit a hierarchical, gradient pore structure. The ceramic matrix of a ceramic foam may be mesoporous. A ceramic foam material may be a composite material (e.g., a composite ceramic foam, such as, for example, composite silica aerogel). The composite material may comprise a polymer material (which may be referred to as a hybrid composite material or hybrid ceramic foam) in a portion of or all of the pores of the ceramic foam. A ceramic foam may have desirable sound transmission/sound isolation/acoustic insulation properties. In an example, a ceramic foam is used as an insulating material (e.g., a building material and/or soundproofing material). In various examples, a ceramic foam is used as a template or the support substrates for coating with other functional materials as the composites in the applications for the catalyst, membrane, separation, and the like.

BRIEF DESCRIPTION OF THE FIGURES

For a fuller understanding of the nature and objects of the disclosure, reference should be made to the following detailed description taken in conjunction with the accompanying figures.

FIG. 2 shows scanning electron microscopy (SEM) images of an example of a silica aerogel of the present disclosure.

FIG. 3 shows SEM images of an example of a silica aerogel of the present disclosure.

FIG. 4 shows EDX images of an example of a silica aerogel of the present disclosure.

FIG. 5 shows EDX images of an example of a silica aerogel of the present disclosure.

FIG. 10 shows thermal conductivity data for examples of silica aerogel produced using the method described in Example 2 (and TEOS as the silica precursor). The equation used for heat resistance is: q=P/A*d/ΔT, where PIA was recorded by the FluxTap, d is the thickness of the sample, and ΔT is calculated by minus the readings of the two temperature sensor.

FIG. 20 shows porosity data obtained using a pycnometer for example of white silica aerogel produced using the method described in Example 2 (and TEOS as the silica precursor). The material has porosity of 89.587%.

FIG. 21 shows porosity data obtained using a pycnometer for example of transparent silica aerogel produced using the method described in Example 2 (and MTMS as the silica precursor). The material has porosity of 83.925.

FIG. 29 shows tuning detail of sample PGAero-1, PGAero-5-10.

FIG. 32 shows a) a stress strain curve of original sample PGAero-1 under 6 lbs. b) Stress strain curve of original sample compressed to broken. c) Stress strain curve of 400° C. annealed sample under 20 lbs.

DETAILED DESCRIPTION OF THE DISCLOSURE

Figure 1:
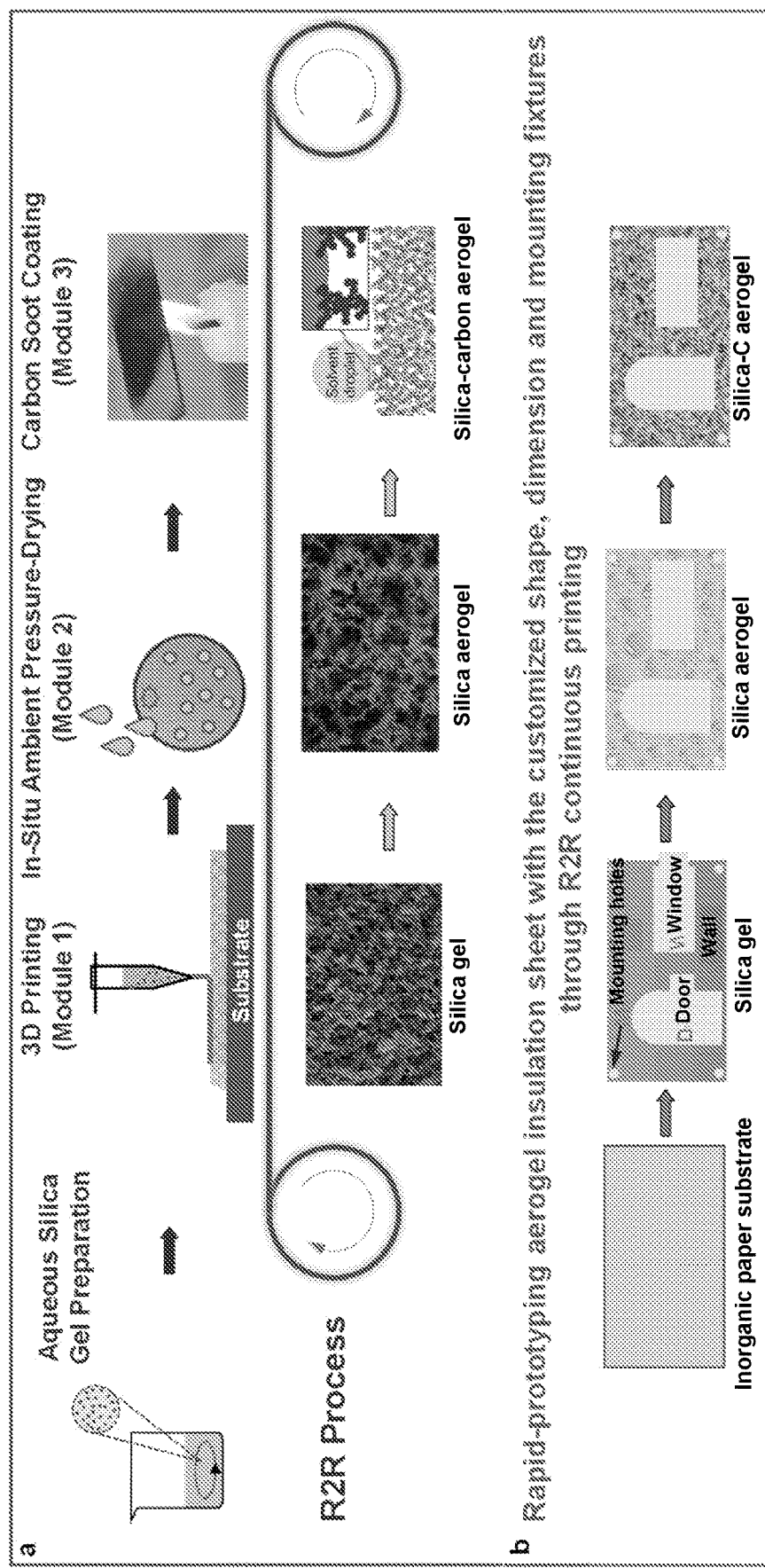
FIG. 1 shows an example of a R2R process of the present disclosure coupled with in-situ APD manufacturing low-cost silica aerogel.
Figure 6:
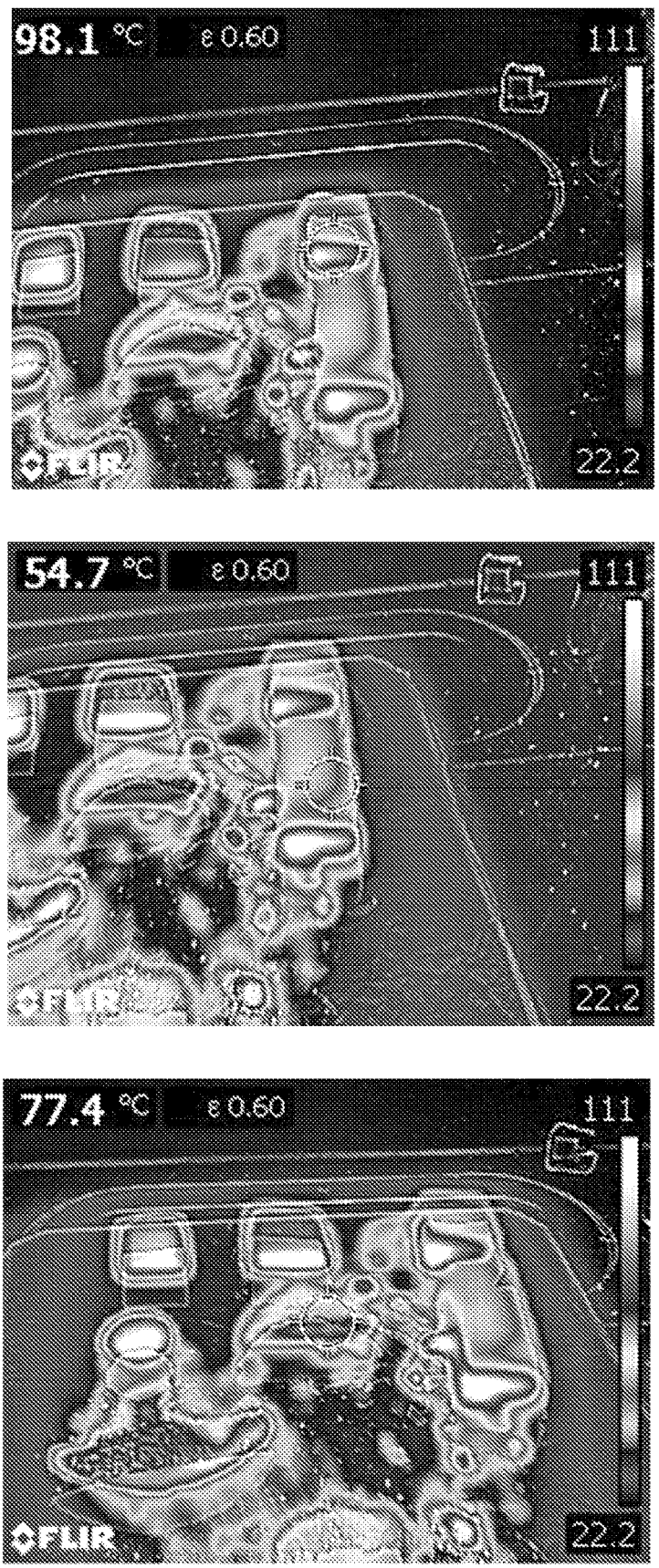
FIG. 6 shows thermal images of an example of a silica aerogel produced using the method described in Example 1.
Figure 7:
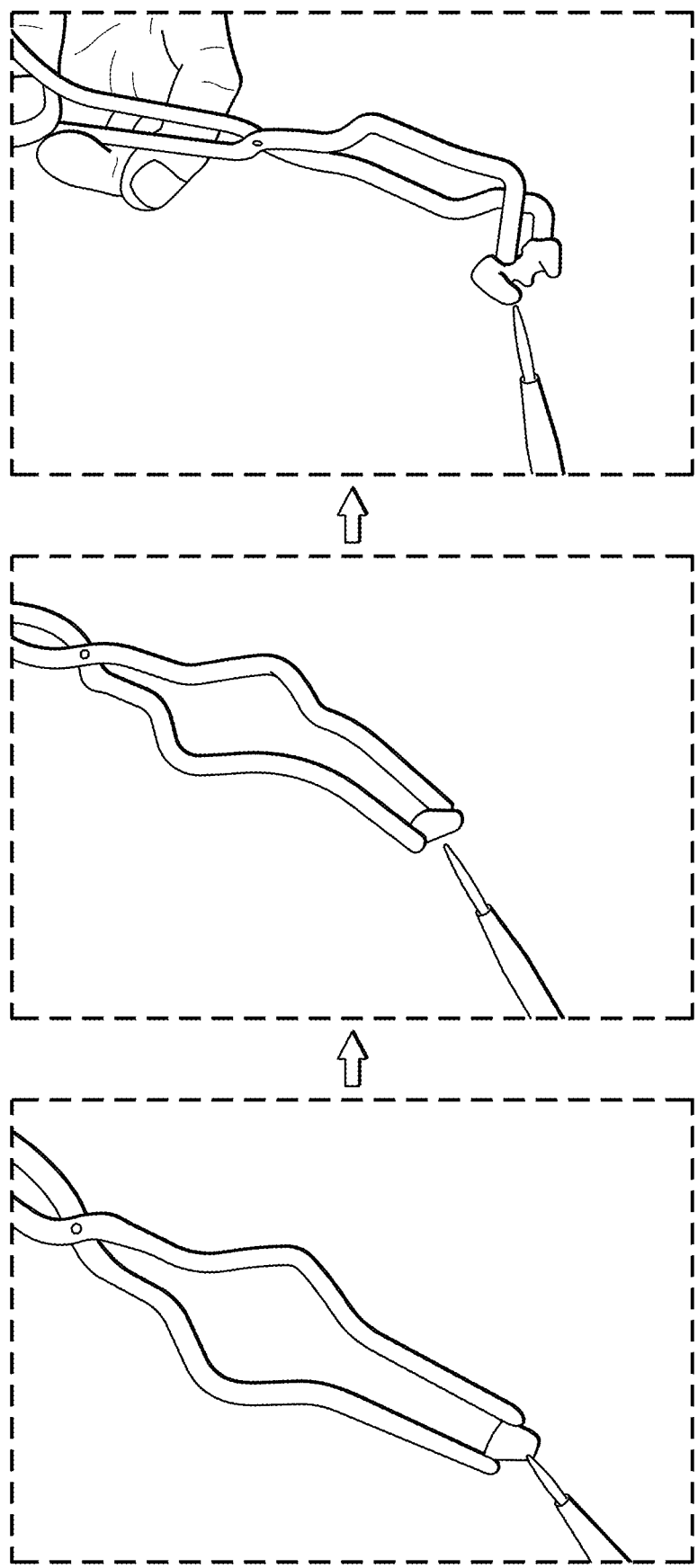
FIG. 7 shows an image of an example of a silica aerogel produced using the method described in Example 2 being heated demonstrating fire-retardant property of the silica aerogel.
Figure 8:
FIG. 8 shows an image of an example of a silica aerogel of the present disclosure and an image of a carbon-material coated silica aerogel of the present disclosure.
Figure 9:
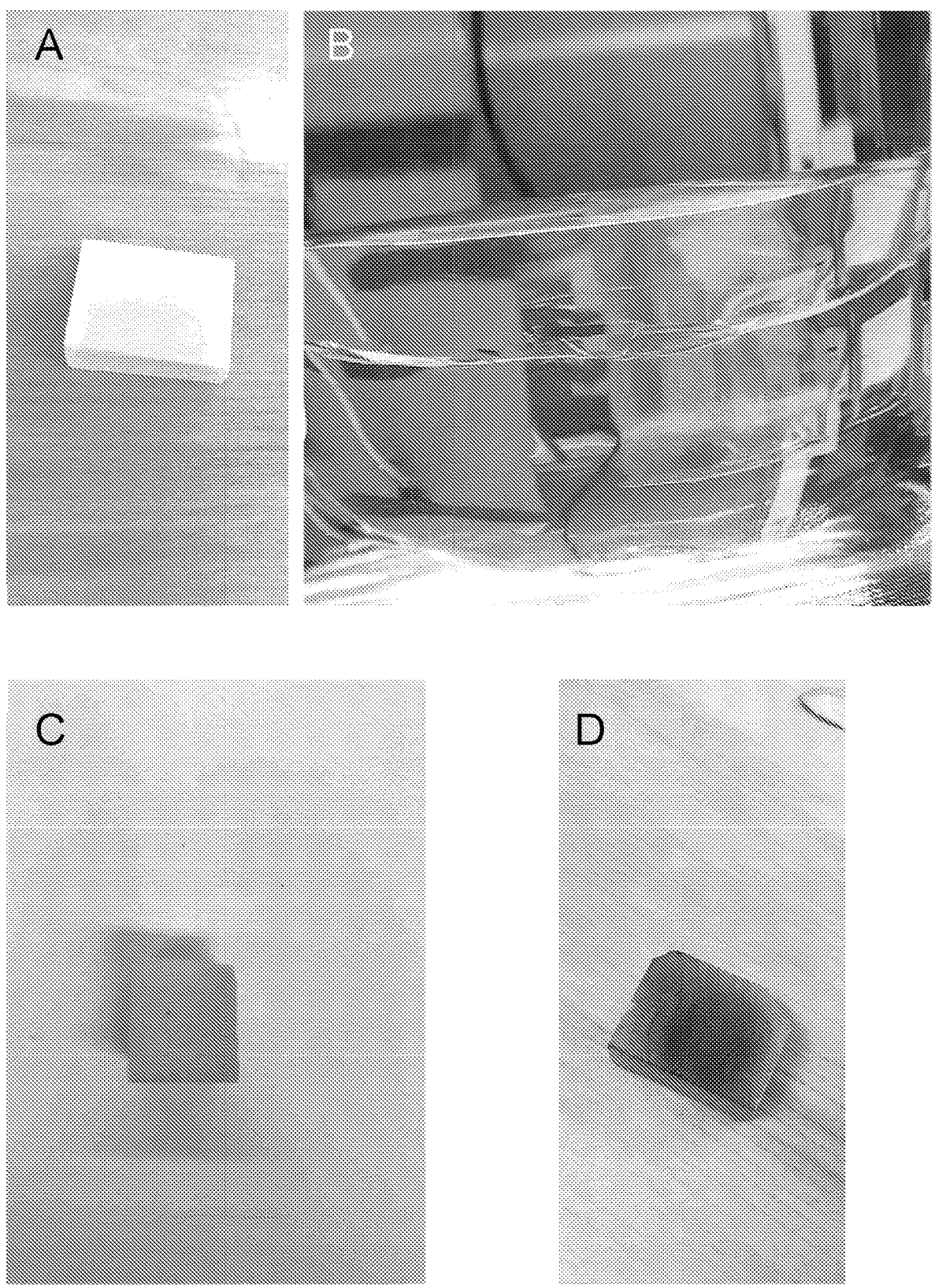
FIG. 9 shows images of examples of silica aerogels produced using the method described in Example 2 (A is a white silica aerogel produced using TEOS as the silica precursor and B is a transparent silica aerogel produced using MTMS as the silica precursor) and images (C, 400° C., 3 hours and D, 600° C., 6 hours) of thermally treated white silica aerogel (B, which is transparent) under different conditions. The thermal treatment was carried out in a tube furnace.
Figure 11:
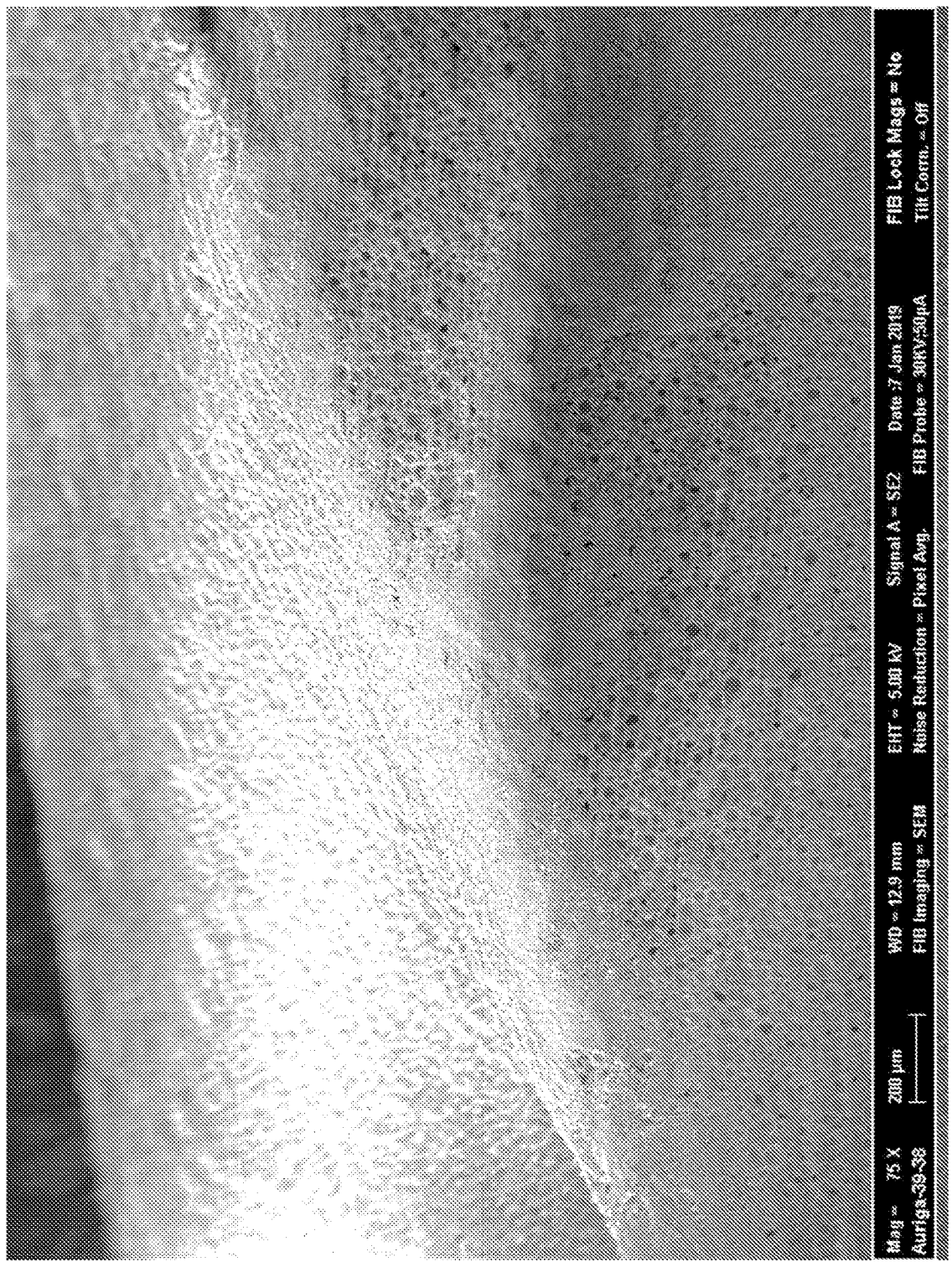
FIG. 11 shows an SEM image of an example of a white silica aerogel produced using the method described in Example 2 (and TEOS as the silica precursor). The image shows the porous structure on the white silica aerogel surface.
Figure 12:
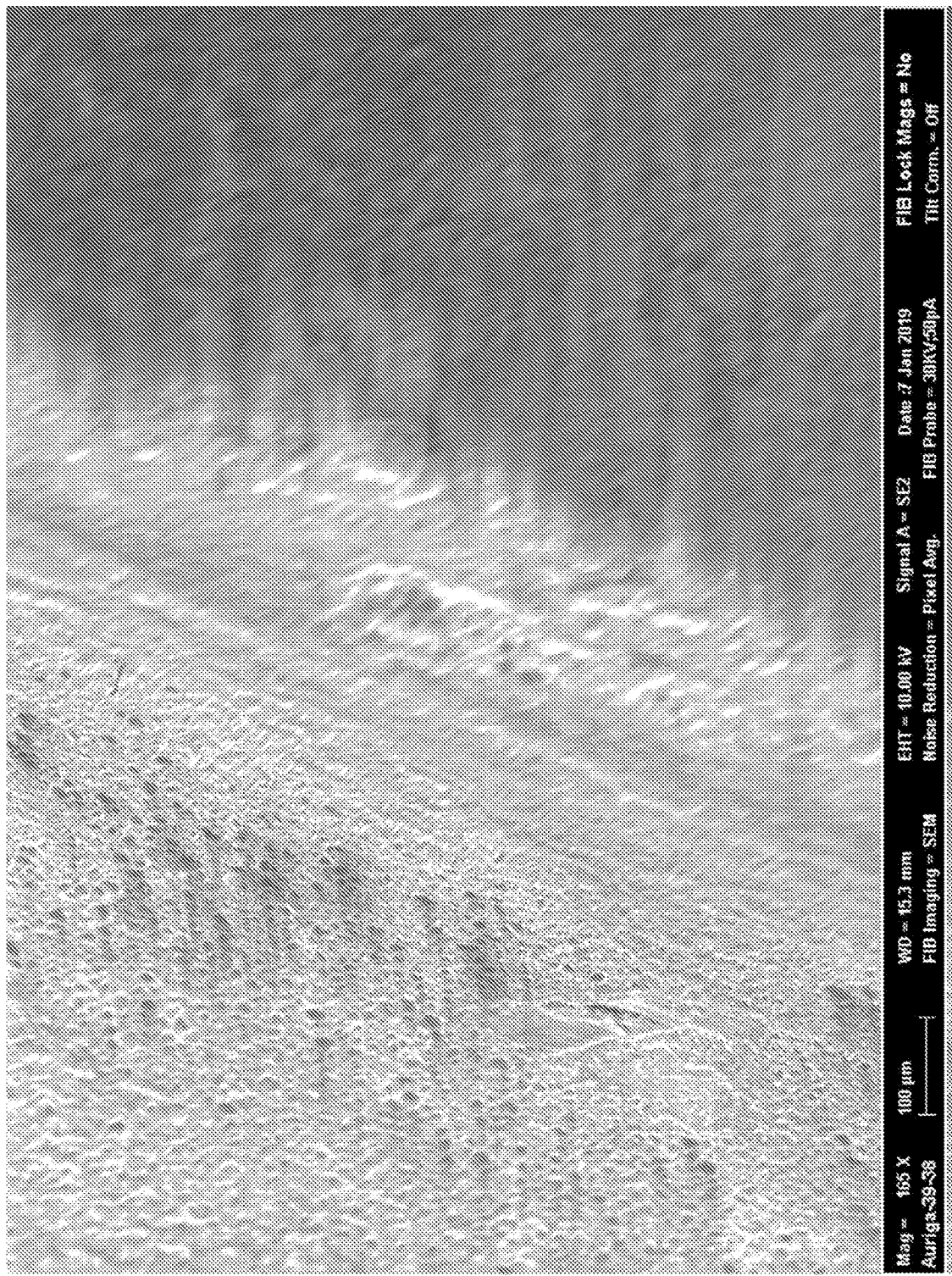
FIG. 12 shows an SEM image of an example of a white silica aerogel produced using the method described in Example 2 (and TEOS as the silica precursor). The image shows the porous structure on the white silica aerogel side surface.
Figure 13:
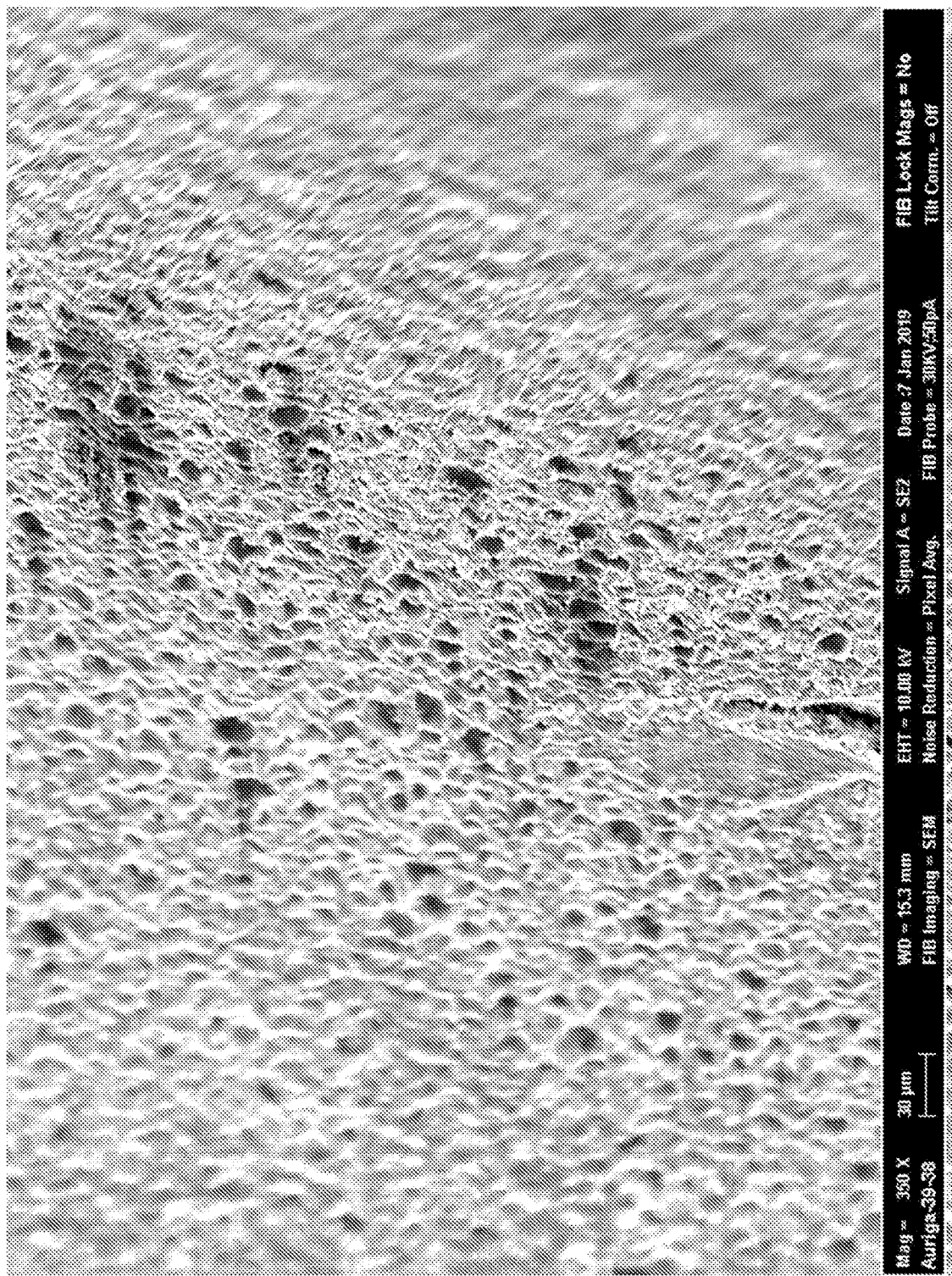
FIG. 13 shows an SEM image of an example of a white silica aerogel produced using the method described in Example 2 (and TEOS as the silica precursor). The image shows the porous structure on the white silica aerogel surface.
Figure 14:
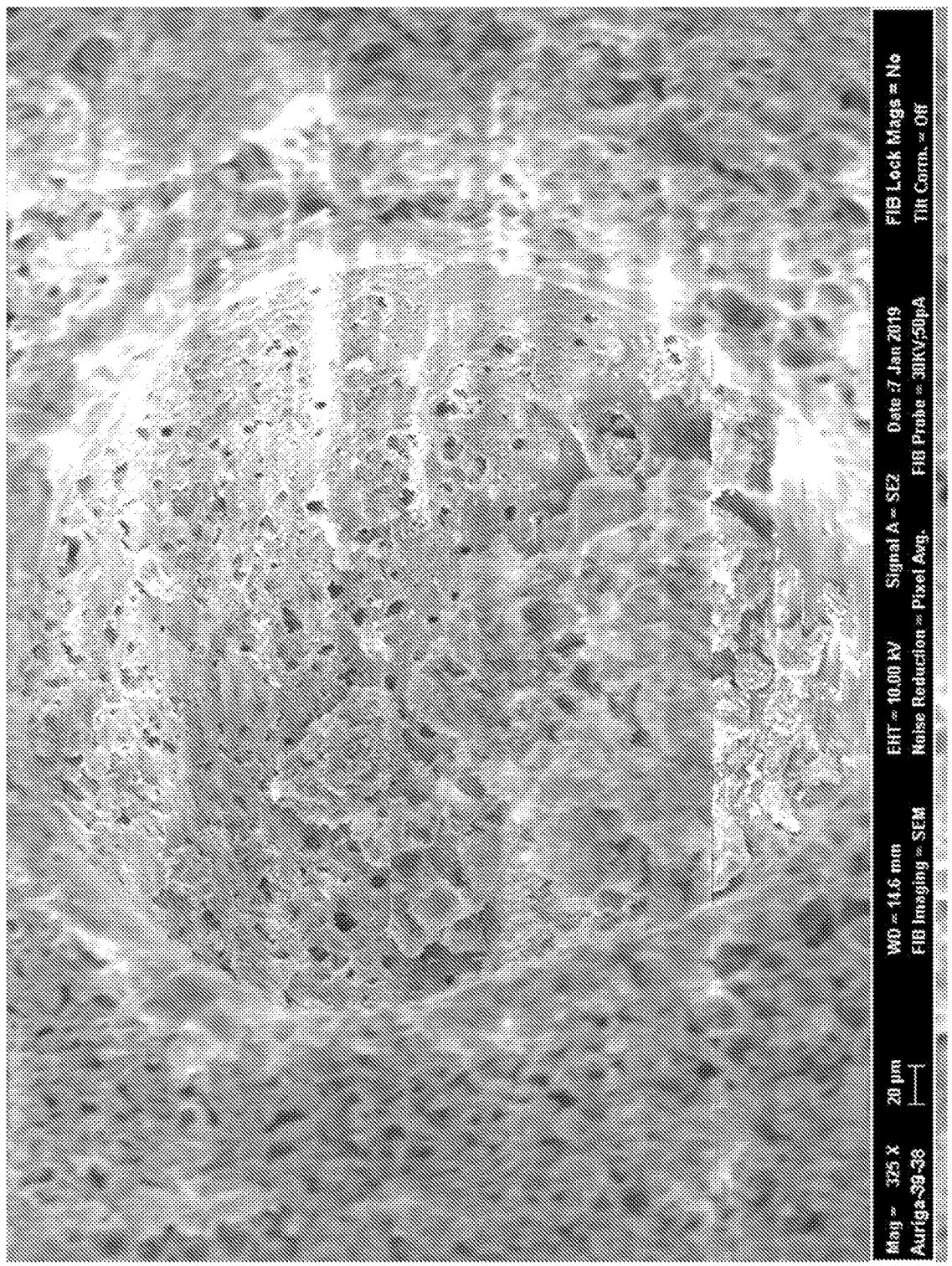
FIG. 14 shows an SEM image of an example of a white silica aerogel produced using the method described in Example 2 (and TEOS as the silica precursor). The image shows the porous structure on the white silica aerogel surface. The pore structure includes smaller pores and larger pores.
Figure 15:
FIG. 15 shows an SEM image of an example of a white silica aerogel produced using the method described in Example 2 (and TEOS as the silica precursor).
Figure 16:
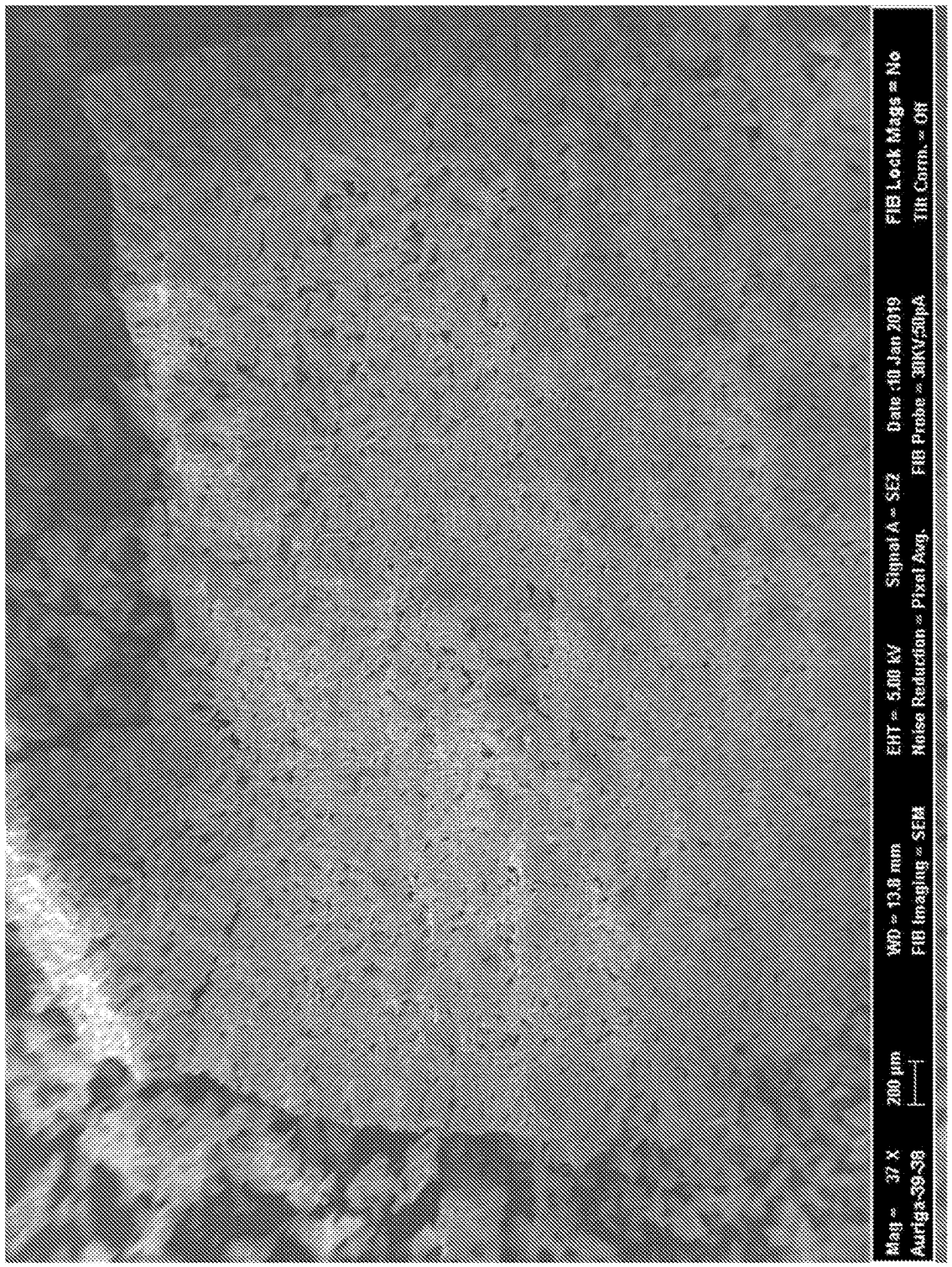
FIG. 16 shows an SEM image of an example of a transparent silica aerogel produced using the method described in Example 2 (and MTMS as the silica precursor). The image shows the porous structure on the white silica aerogel surface.
Figure 17:
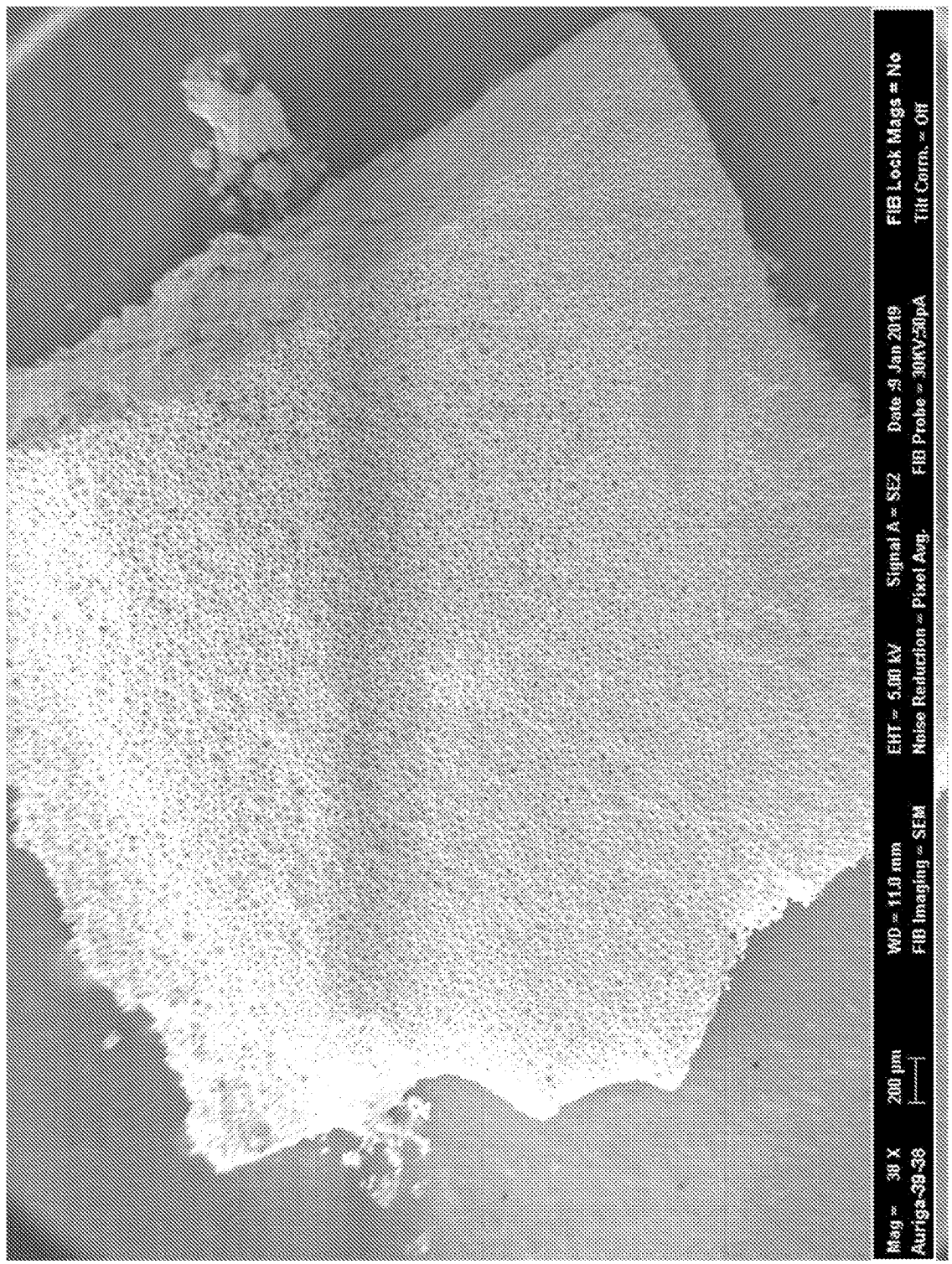
FIG. 17 shows an SEM image of an example of white silica aerogel produced using the method described in Example 2 (and TEOS as the silica precursor) which was heated at 400° C. for 3 hours. The image shows the porous structure on the white silica aerogel surface.
Figure 18:
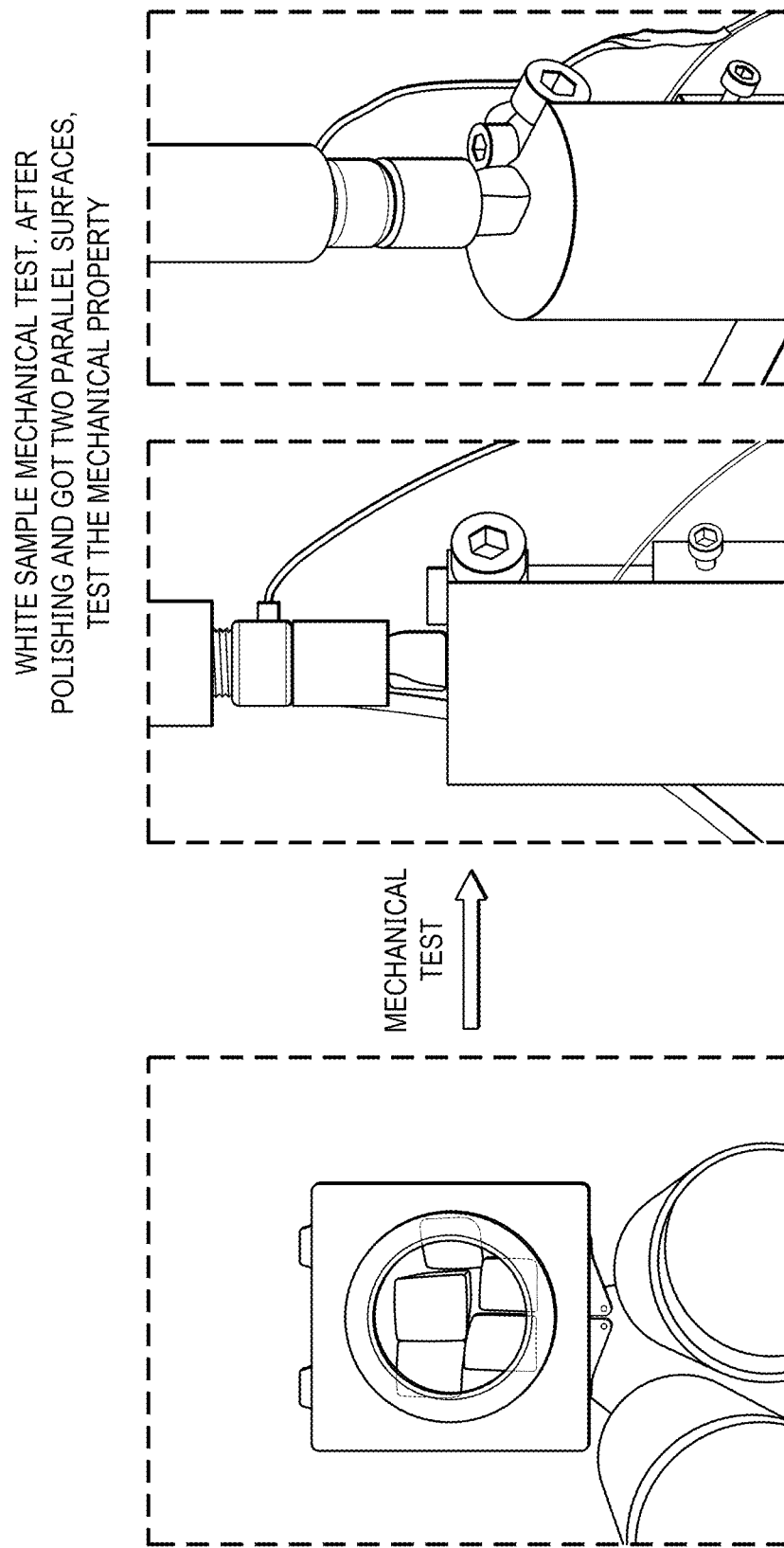
FIG. 18 shows images describing mechanical testing of silica aerogel samples of the present disclosure.
Figure 19:
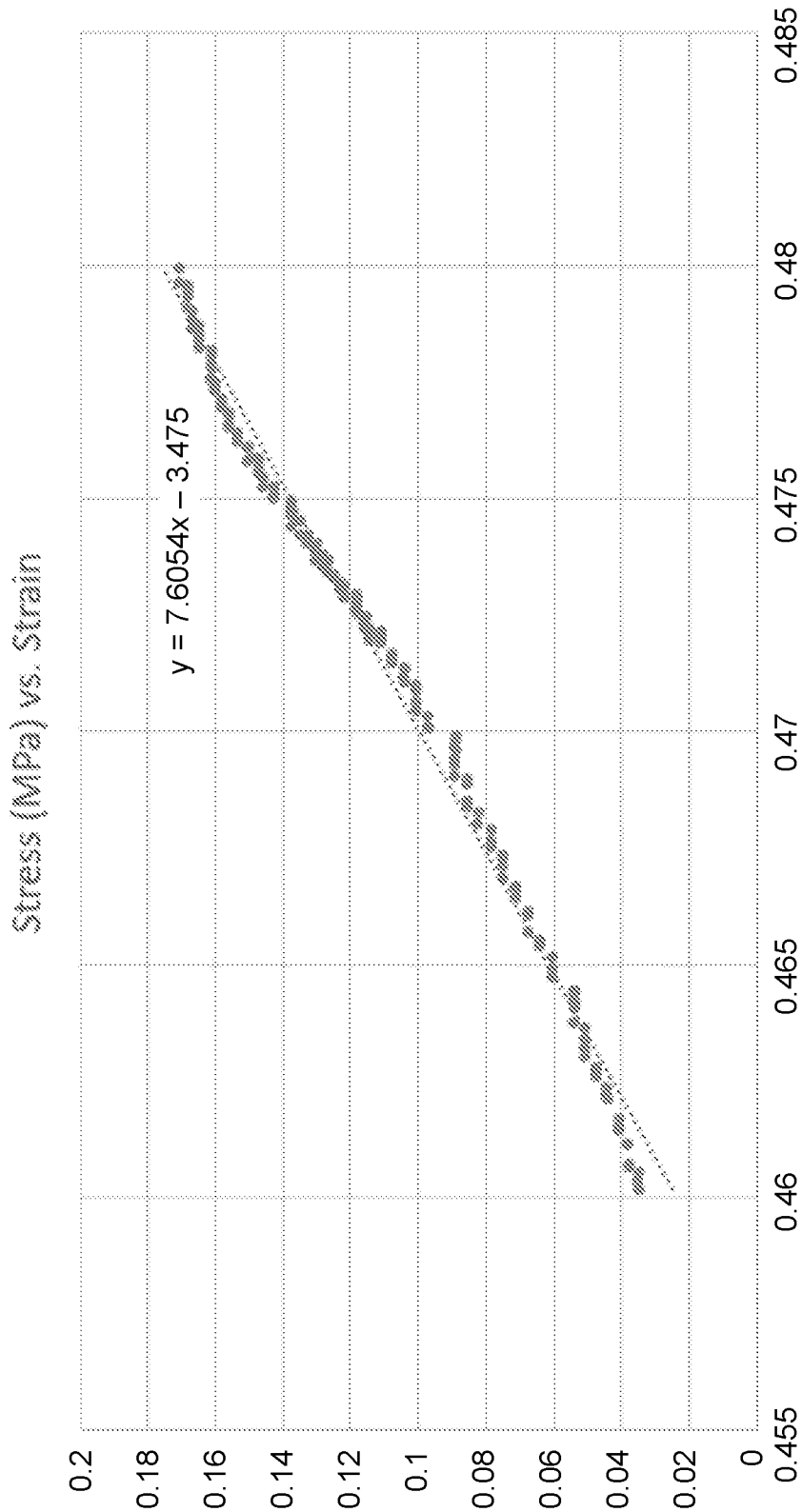
FIG. 19 shows mechanical test data for example of white silica aerogel produced using the method described in Example 2 (and TEOS as the silica precursor). The material has a Young's modulus of 7.6054 MPa.
Figure 22:
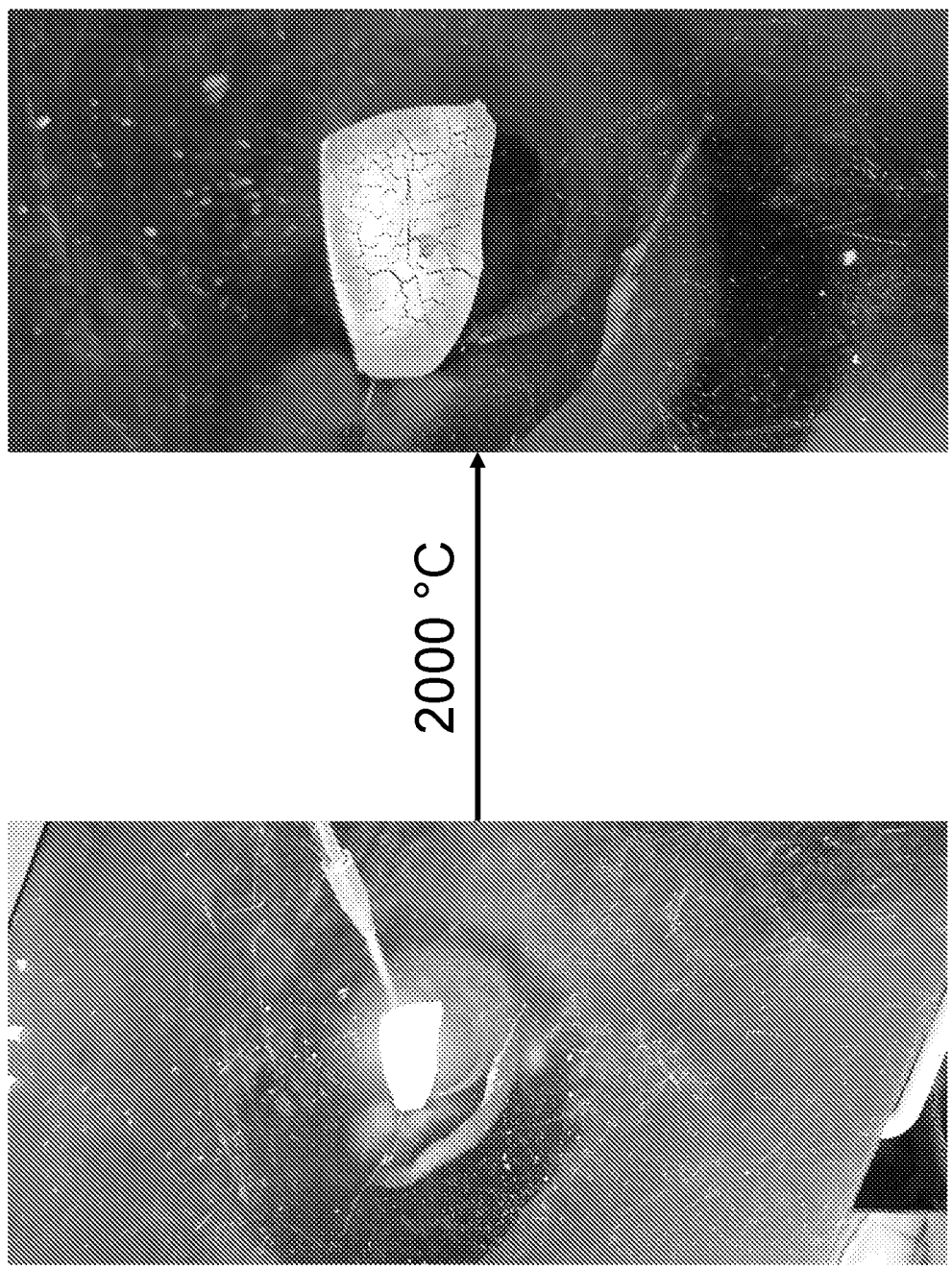
FIG. 22 shows an image of an example of a white silica aerogel produced using the method described in Example 2 (and TEOS as the silica precursor) being heated to 2000° C. demonstrating fire-retardant property of the silica aerogel.

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "group" refers to a chemical entity that has one terminus or two or more termini that can be covalently bonded to other chemical species. Examples of groups include, but are not limited to:

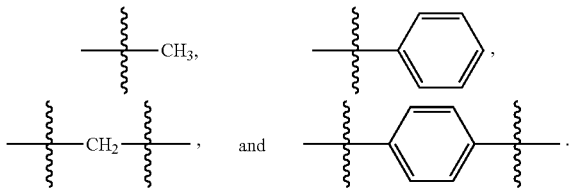

The term "group" includes radicals.

As used herein, unless otherwise indicated, the term "alkyl" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, the alkyl group is a $C_1$ to $C_5$ (e.g., a $C_1$, $C_2$, $C_3$, $C_4$, or $C_5$ alkyl group). The alkyl group may be unsubstituted or substituted with one or more substituent. Examples of substituents include, but are not limited to, halogens (—F, —Cl, —Br, and —I), aliphatic groups (e.g., alkyl groups, alkenyl groups, and alkynyl groups), aryl groups, alkoxide groups, carboxylate groups, carboxylic acids, ether groups, and the like, and combinations thereof.

As used herein, unless otherwise indicated, the term "alkoxy" refers to —OR groups, where R is an alkyl group as defined herein. Examples of alkyoxy groups include, but are not limited to, methoxy groups, ethoxy groups, n-propoxy groups, i-propoxy groups, n-butoxy groups, i-butoxy groups, s-butoxy groups, and the like. In an example, an alkoxy group comprises a $C_1$-$C_5$ alkyl group.

The present disclosure provides ceramic foams. The present disclosure also provides methods of making ceramic foams and uses of ceramic foams.

In this disclosure, in various examples, scalable ceramic aerogels, such as, for example, pore-gradient ceramic aerogels, which may be referred to as ceramic foams, monoliths (e.g., PGAeros) were designed and synthesized. The low-cost manufacturing of PGAeros is facilitated by the in-situ gas bubble formation, which may support a pore gradient. The PGAeros can exhibit a robust mechanical and thermal stability across a broad temperature range (e.g., 0.040 W $m^{-1}$ $K^{-1}$, and a compressive strength of 100.56 MPa, respectively). The integral ceramic monolith nature of, for example, PGAeros can exhibit robust soundproof and fire-resistance performance. This demonstration of scalable manufacturing of ceramic aerogel materials may be used in thermal insulation applications with, for example, one or more or all of desirable thermal management, mechanical strength, low mass density, soundproof performance, and fire-retardant performance.

The present disclosure, in various examples, provides ceramic aerogel chemistry coupled with reaction in a sealed environment (e.g., reaction at above ambient pressure reaction conditions) and in-situ ambient pressure drying. The methods can produces ceramic aerogels with hierarchical pore gradients.

The present disclosure, in various examples, also provides surface modification of ceramic foams. Surface modification as described herein may provide ceramic foam materials with reduced capillarity and radiative component of thermal conductance: For example, replacing supercritical drying-induced hydroxyl (—OH) groups (~5 OH/nm$^2$), which produce strong hydrogen-bonding and capillary force, are replaced with, for example, methyl groups (—CH$_3$) and/or a carbon material coating to reduce capillary pressure and radiative transport of energy. In various examples, the surface modification is a moisture and/or fire-resistant surface modification. The surface modification may form a fractal-like superhydrophobic network. In an example, the nanocrystalline deposit on the silica framework yields a smaller pore size, stronger mechanical integrity, higher moisture and fire resistance, and lower thermal conductivity.

In an example, coupling ceramic foam (e.g., silica aerogel) chemistry, in-situ ambient pressure-drying, and roll-to-roll (R2R) manufacturing is expected to provide continuous low-cost manufacture (~90% reduction), high R-value, and high-durability ceramic foam (e.g., silica aerogel-like) building insulation materials. Thus, for example, coupled silica aerogel chemistry, in-situ ambient pressure-drying, and roll-to-roll (R2R) manufacturing effort is expected to be used to continuously manufacture low-cost (~90% reduction), high R-value, and high-durability silica aerogel building insulation materials. It is considered that a current manufacturing processes can be retrofitted to enable cost-effective, continuous production (e.g., rapid-prototyping) of ceramic foam (e.g., silica aerogel-like foam) sheets, while maintaining desirable thermal insulation properties of the silica aerogel. Thus, it is considered that a current R2R manufacturing processes can be retrofitted to enable cost-effective, continuous production (e.g., rapid-prototyping) of silica-aerogel sheets, while maintaining desirable thermal insulation properties of the silica aerogel. For example, an approach for production of low-cost silica aerogel insulation is shown in (FIG. 1). This approach combines: 1) R2R manufacturing, which may improve production efficiency, 2)

in-situ ambient pressure-drying (APD), which may control aerogel cost, and 3) surface modification to improve R-value and durability.

In this disclosure, in various examples, silica aerogel chemistry is coupled with in-situ ambient pressure drying. The methods can replace the current supercritical extraction step—a complex process employing low-surface-tension organic solvents and high pressure supercritical drying, by using ambient pressure—by, for example, drying with in-situ generated pore-supporting gas bubbles (such as, for example, carbon dioxide, ammonia, and the like). The processes described herein can significantly reduce, for example, one or more or all of energy input, time, and cost for producing silica aerogels, with, for example, controlled porosity and pore size below 60 nm.

For example, R2R rapid-prototyping manufacturing of low-cost water-based APD silica aerogel, followed by continuous surface modification is expected to achieve a smaller pore size (<60 nm, minimizing the gaseous component of thermal conductivity), enhanced durability (mechanical strength, moisture and fire resistance), and increased infrared radiation absorption (minimizing radiative component of thermal conductivity). The benefits of using R2R manufacturing of aqueous gel are that continuous operation at ambient conditions enables scalable, low-cost, durable and rapid-prototyping insulation material synthesis and installation.

In various examples, the present disclosure provides: 1) low-cost and scalable aqueous aerogel synthesis using, for example, tetraethoxysilane, CTAB, and urea to generate the silica gel together with pore-supporting in-situ, enabling APD for significant reduction of energy, time, and cost in silica aerogel production; 2) surface modification to control pore size, reduce capillarity, suppress radiative heat transfer, and meet durability requirements (with respect to fire, structure, moisture, and acoustic modes of degradation); and 3) low-cost and robust installation enabled by R2R continuous manufacturing for rapid-prototyping that enables easier installation.

The present disclosure, in various examples, provides methods to produce aerogel materials that may avoid expensive chemical processing steps and may avoid any supercritical extraction process when the material is brittle. The instant methods are based on in-situ APD of silica aerogel enabled by incorporation of, for example, sodium bicarbonate, which generates pore-supporting carbon dioxide in-situ to significantly reduce the energy, time and cost in silica aerogel production.

The methods may utilize near room temperature and ambient pressure processing to reduce silica aerogel synthesis cost. Rapid prototyping of aerogel products with shape and dimension customization through R2R manufacturing may further reduce installation cost. The introduction of, for example, elemental carbon in silica aerogel is effective to suppress radiative heat transfer. For example, adding additional C to the aerogel reduced thermal conductivity from 0.016 to 0.0135 W/mK at ambient pressure.

In an aspect, the present disclosure provides methods of making ceramic foams. The ceramic foams may be referred to as ceramic aerogels or ceramic-aerogel-like foams (e.g., silica-aerogel-like foams). The ceramic foams may be silica aerogels. The silica aerogels may be silica aerogel films. The methods are based on in-situ generation of a pore-forming gas reaction. The reaction may be carried out in a sealed environment (e.g., reaction a greater than ambient pressure). The ceramic foams may be formed under hydrothermal conditions. In an example, a method does not comprise use of any supercritical gas species. Non-limiting examples of methods are provided herein.

In various examples, a method for forming a ceramic foam: contacting (e.g., which may be in a reaction mixture in a sealed environment, which may be a sealed vessel) one or more ceramic precursor(s); one or more pore-forming gas-forming additive(s) (one or more inert gas-generating agent(s)); one or more catalyst(s); and optionally, one or more additive(s), where the contacting results in formation of an inert gas (e.g., carbon dioxide) and the ceramic foam. The ceramic foam may be formed under hydrothermal conditions. The reactants (ceramic precursor(s), pore-forming gas-forming additive(s), catalyst(s); and optionally, additive(s) may be added/contacted in any order. The reactants may be contacted in a single vessel.

In various examples, a method for forming silica aerogel comprises: contacting (e.g., in a reaction mixture) one or more silica precursor(s); one or more pore-forming gas-forming additive(s) (one or more inert gas-generating agent(s)); one or more catalyst(s); and optionally, one or more additive(s), where the contacting results in formation of an inert gas (e.g., carbon dioxide) and the silica aerogel. The silica aerogel may be formed under hydrothermal conditions. The reactants (silica precursor(s), pore-forming gas-forming additive(s), catalyst(s); and optionally, additive (s) may be added/contacted in any order. The reactants may be contacted in a single vessel.

The reaction may be carried out in a sealed environment. The reaction may be carried out in a sealed vessel or sealed mold. As an illustrative, non-limiting example, the reaction is carried out in an autoclave. The pressure in the vessel may be autogenous pressure (e.g., resulting from the closed nature of the vessel and the state of the reactants) or the pressure may be also be increased externally, by for example, pressurizing the sealed vessel to a desired pressure (e.g., 1 to 100 psi, including all 0.1 psi values and ranges therebetween). A vessel may be pressurized by addition of exogenous gas (e.g., inert gases such as, for example, argon, nitrogen, and the like, and combinations thereof).

In an example, a method for forming a ceramic foam (e.g., silica aerogel-like foam) comprises: contacting (e.g., in a reaction mixture) in a sealed vessel TEOS, MTMS, water-glass/sodium silicate, or a combination thereof silica precursor(s) (e.g., 57 mL of TEOS or MTMS or 1:3 to 3:1 mixture of TEOS:MTMS); urea (e.g., 33.33 g) as the pore-forming gas-forming additive (an inert gas-generating agent); acetic acid, which may be in the form of an aqueous solution (e.g., 100 mL of a 1 mmol/L solution), as the catalyst; and CTAB or SDS (e.g., 3.33 g) a surfactant additive, where the contacting results in formation of an inert gas (e.g., carbon dioxide, ammonia, or the like) and an the silica aerogel-like foam is formed. In various examples, one or more or all of the values in this example are varied by up to and including 5% or up to and including 10%. In various examples, one or more additional additive are contacted (e.g., included in the reaction mixture).

In an example, a method for forming silica aerogels comprises: contacting (e.g., in a reaction mixture) TEOS, MTMS, or a combination thereof silica precursor(s) (e.g., 57 mL of TEOS or MTMS or 1:3 to 3:1 mixture of TEOS:MTMS); urea (e.g., 33.33 g) as the pore-forming gas-forming additive (an inert gas-generating agent); acetic acid, which may be in the form of an aqueous solution (e.g., 100 mL of a 1 mmol/L solution), as the catalyst; and CTAB (e.g., 3.33 g) as an additive, where the contacting results in formation of an inert gas (e.g., carbon dioxide, ammonia, or the like) and an the silica aerogel is formed. In various examples, one or more or all of the values in this example are varied by up to and including 5% or up to and including 10%. In various examples, one or more additional additive are contacted (e.g., included in the reaction mixture).

Various ceramic precursors can be used. The precursors may sol-gel precursors. Suitable sol-gel precursors are known in the art. Non-limiting examples of precursors include silica precursors, alumina precursors, transition-metal oxide precursors, and combinations thereof. In various examples, the silica precursor(s) is/are chosen from tetraalkoxysilanes (e.g., TMOS, TEOS, and the like) (e.g., $C_1$-$C_5$ alkoxy tetraalkoxysilanes), alkyltrialkoxysilanes (e.g., methyltrimethoxysilane (MTMS) and the like) (e.g., $C_1$-$C_5$ alkyl, $C_1$-$C_5$ alkoxy alkyltrialkoxysilanes), sodium metasilicates (e.g., water glass), alkyl and combinations thereof. In various examples, the alumina precursor(s) is/are chosen from aluminum alkoxides (e.g., $C_1$ to $C_6$ aluminum alkoxides), alumatrane, or tris(alumatranyloxy-i-propyl) amine, and the like, and combinations thereof. In various examples, the transition-metal oxide precursor(s) is/are chosen from transition metal alkoxides (e.g., transition metal alkoxides having the formula $M(OR)_x$, wherein M is a transition metal (for example, Al, Ti (e.g. titanium(IV)-isopropoxide and the like), Zr, W, Cr, Mo, and the like) and R is at each occurrence an alkyl group and x is, for example, 1, 2, 3, 4, or 5), and the like. The transition metal can have various oxidation states (e.g., $^+1$, $^+2$, $^+3$, $^+4$, or $^+5$).

In an example, water glass is used as a silica precursor (e.g., alone or in combination with one or more additional silica precursors). Water glass is also referred to as sodium silicate or soluble glass. In an example, water glass is a material comprising sodium oxide ($Na_2O$) and silica (e.g., silicon dioxide, $SiO_2$, and the like) that forms a glassy solid.

Combinations of ceramic precursors may be used. For example, binary, ternary, and higher order mixed oxide ceramic foams can be made using mixtures of precursors. As an illustrative example, a mixed oxide ceramic foam such as, for example, a ceramic foam having a nominal composition corresponding to a desired ratio of $Al_2O_3$ and $TiO_2$ can be made using a combination of one or more $Al_2O_3$ sol-gel precursor (e.g., Alumatrane, tris(alumatranyloxy-i-propyl) amine, or a combination thereof, and the like) and $TiO_2$ sol-gel precursor (e.g., titanium(IV)-iso-propoxide and the like). One skilled in the art will appreciate that a ceramic foam having a desired nominal composition can be formed by choice of appropriate ceramic precursor(s) and/or relative amounts of precursors.

After formation of the ceramic foam, the ceramic foam may be sintered. For example, the ceramic foam is sintered at a temperature of 200 to 800° C. (e.g., 350 to 450° C. or about 400° C.), including all 0.1° C. values and ranges therebetween. The ceramic foam may be sintered in air and/or ambient pressure (e.g., 1 atm). Without intending to be bound by any particular theory, it is considered that the sintering may improve the properties of the ceramic foam. The improvement may result from carbonization of residual organic residue, if present.

In various examples, a method further comprises post-ceramic foam formation modification of at least a portion of a surface of the ceramic foam (e.g., the silica aerogel). An example of a post-ceramic foam formation modification is formation of a layer of a carbon containing material on at least a portion a surface (e.g., all of a surface or all of the surfaces of a ceramic foam (e.g., the silica aerogel). The carbon containing material may provide a superhydrophobic exterior surface. For example, carbon soot coating formed by burning a candle underneath a ceramic foam sample to enable soot coating or by post-thermal annealing.

Advanced surface modification, including trimethylchlorosilane treatment and carbon coating, can be used to engineer the capillarity and superhydrophobicity. This replaces surface hydroxyl groups with methyl groups on the silica gel surface via formation of $(CH_3)_3$—Si—Si—O≡, followed by continuous carbon-material coating. These modification steps control the pore size and surface chemistry to achieve the desired thermal insulation performance and durability.

For example, trimethylchlorosilane, $(CH_3)_3SiCl$, coupled with the continuous carbon-material coating can meet the target of surface modification by methyl group formation and nanocrystalline carbon coating to reduce both capillarity and the radiative transport mode heat transfer at higher temperature. The surface-modified silica would lead to a smaller pore size, stronger mechanical integrity, higher moisture and fire resistance, and lower thermal conductivity.

As another example of post-ceramic foam formation modification includes decorating or coating at least a portion of a surface or all of the surfaces of the ceramic foam with nanoparticles.

A method may be a continuous method. For example, a method is a roll-to-roll continuous manufacturing method. R2R enables near-net-shape manufacturing and dimension customization of ceramic foam formation on, for example, low-cost and high thermal insulation inorganic paper substrate carrier.

Using roll-to-roll continuous manufacturing, it is expected that an improved R-value aerogel-based insulation material will be formed at low cost using, for example, a tetraethoxysilane or waterglass silica gel precursor and R2R manufacturing process that enables shape and dimension customization on, for example, an inorganic ceramic fiber paper substrate carrier (Fiberfrax® by Unifrax), leading to a desirable material cost of silica aerogel.

A method of the present disclosure may comprise a thermal annealing step. The thermal annealing step may be carried out after the ceramic foam (e.g., the silica aerogel) is formed, washed, dried, etc. For example, the thermal annealing is the last step in producing the ceramic foam (e.g., the silica aerogel). In various examples, the thermal annealing is carried out at 300° C. to 600° C., including all integer ° C. values and ranges therebetween and may carried out for a varied amount of time (e.g., 1 hour to 6 hours, including all integer minute values and ranges therebetween).

The ceramic network (e.g., a silica network, alumina network, aluminosilicate network, transition metal oxide network, or a combination thereof), which may be referred to as the ceramic matrix, may comprise ceramic nanoparticles (e.g., silica nanoparticles) (e.g., having a size, which may be a largest or smallest dimension, of 20 to 200 nm (e.g., 150 to 200 or about 200 nm), including all integer nm values and ranges therebetween, or an average size, which may be an average largest or smallest dimension, of 20 to 200 nm (e.g., 150 to 200 or about 200 nm), including all integer nm values and ranges therebetween, of the ceramic aerogel may be formed in the presence of the pore-forming gas. The ceramic nanoparticle may have a narrow size distribution with 90% or more, 95% or more, 99% or more, or all of the ceramic nanoparticles having a size and/or average size of 20 to 200 nm (e.g., 150 to 200 or about 200 nm), including all integer nm values and ranges therebetween. Pore-forming gas may be generated in the presence of ceramic precursors (e.g., pore forming gas is generated during silica network formation). In an example, substantially all ceramic matrix formation (e.g., the silica matrix) is complete in the presence of the pore forming gas. By substantially all ceramic matrix formation it is meant that no additional processing is required to form the ceramic matrix (e.g., the silica matrix) of the ceramic foam (e.g., the silica aerogel). In various examples, 50% or greater, 60% or greater, 70% or greater, 80% or greater of the silica precursor(s) is/are reacted in the presence of the pore-forming gas.

In an aspect, the present disclosure provides ceramic foams. The ceramic foams may be ceramic foam films. The ceramic foams may be referred to as ceramic aerogels. The ceramic foams may be silica aerogels. The silica aerogels may be silica aerogel films. Non-limiting examples of ceramic foams are provided herein. A ceramic foam material (e.g., a ceramic foam composite material) comprises a ceramic foam. A ceramic foam comprises matrix of ceramic material. A ceramic foam may be made by a method of the present disclosure.

The ceramic foam may be an oxide. Non-limiting examples of oxides include silicon oxide (e.g., silica), aluminum oxides (e.g., alumina), transition metal oxides, and the like, and combinations thereof. The ceramic foams may be stoichiometric or non-stoichiometric.

The ceramic foam may be a mixture of oxides. The ceramic foam may be a binary oxide, a ternary oxide system, or a higher order oxide system. Non-limiting illustrative examples of ceramic foams include aluminosilicate foams, an aluminotitanate foams, and the like.

In an example, a ceramic foam and/or a ceramic foam material does not have any fluorine atoms (e.g., any detectible by conventional methods known in the art). The fluorine atoms may be fluorine atoms bonded to silicon atoms (e.g., —Si—F).

The ceramic foam (e.g., silica aerogel) may have various forms. For example, the ceramic foam (e.g., silica aerogel) is a monolith. In another example, the ceramic foam (e.g., silica aerogel) is a film. A ceramic foam (e.g., silica aerogel) film may be a free-standing film or be disposed on a substrate. A ceramic foam (e.g., silica aerogel) film may be infiltrated in a substrate.

The ceramic foam is porous and may exhibit a hierarchical, gradient pore structure. The ceramic foam may be described as comprising hierarchical hollow structures with micropores, which may be referred to as macropores, as the interior (e.g., voids in the ceramic matrix) and mesopores inside the shells (e.g., the matrix). At least a portion or all of the pores may be interconnected. The pores may be mesopores and/or macropores. The pores may be mesopores as defined by IUPAC.

The pores of the ceramic foam, which may be referred to as micropores or macropores and are not mesopores of the ceramic matrix, can have various sizes. For example, the size (e.g., the average size and/or 90%, 95%, 99%, 99.9%, or 100%) of the pores is from 500 microns to 1 micron, including all 0.1 micron values and ranges therebetween. A size may be at least one dimension (e.g., a diameter), as measured in a plane parallel to an axis of the pore. For example, the pores have a size (e.g., at least one dimension (e.g., a diameter), as measured in a plane parallel to an axis of the pore) and/or at least one dimension (e.g., a height) as measured in a plane perpendicular to an axis of the pore) of 500 microns to 1 micron (e.g., 200 microns to 10 microns, 200 microns to 1 micron, or 100 microns to 1 micron). The size of the pores generally decrease or increase along a dimension moving from a first surface of the ceramic foam to a second surface that is opposite the first surface. The gradient may be a linear gradient or a nonlinear gradient.

The ceramic matrix of a ceramic foam may be mesoporous (e.g., comprise mesopores, which may be mesopores as defined by IUPAC). For example, the ceramic matrix has a plurality of pores having a diameter of 2 nm to 100 nm (e.g., 2 nm to 60 nm, 10 nm to 60 nm, or 10 nm to 100 nm), including 0.1 nm values and ranges therebetween. For example, the ceramic matrix has a plurality of pores having an average diameter of 2.5 nm to 30 nm (e.g., 2.5 nm to 10 nm or 15 nm to 30 nm), including 0.1 nm values and ranges therebetween. The pore size distribution may be multimodal, such as, for example, bimodal). For example, the ceramic matrix has a plurality of pores having average diameter 2 nm to 100 nm (e.g., 2 nm to 60 nm, 10 nm to 60 nm, or 10 nm to 100 nm) and a plurality of pores having an average diameter of 2.5 nm to 30 nm (e.g., 2.5 nm to 10 nm or 15 nm to 30 nm).

The pore size and/or pore size distribution of the ceramic foam and/or ceramic matrix can be determined using methods known in the art. For example, the pore size and/or pore size distribution is determined using BET analysis.

The silica aerogel is porous. For example, the silica aerogel has a plurality of pores having a diameter of 2 nm to 100 nm (e.g., 2 nm to 60 nm, 10 nm to 60 nm, or 10 nm to 100 nm), including 0.1 nm values and ranges therebetween. For example, the silica aerogel has a plurality of pores having an average diameter of 2.5 nm to 30 nm (e.g., 2.5 nm to 10 nm or 15 nm to 30 nm), including 0.1 nm values and ranges therebetween. The pore size distribution may be bimodal. For example, the silica aerogel has a plurality of pores having average diameter 2 nm to 100 nm (e.g., 2 nm to 60 nm, 10 nm to 60 nm, or 10 nm to 100 nm) (which may be bimodal) and a plurality of pores having an average diameter of 2.5 nm to 30 nm (e.g., 2.5 nm to 10 nm or 15 nm to 30 nm). The pore size and/or pore size distribution can be determined using methods known in the art. For example, the pore size and/or pore size distribution is determined using BET analysis.

A ceramic foam material may be a composite material (e.g., a composite ceramic foam, such as, for example, composite silica aerogel). The composite material may comprise a polymer material (which may be referred to as a hybrid composite material or hybrid ceramic foam) in a portion of or all of the pores of the ceramic foam. The polymer may be formed by an in-situ polymerization in the ceramic foam. Additionally, or alternatively, a composite material may comprise a carbon coating on the ceramic foam, which may be referred to as ceramic-carbon aerogel. For example, a ceramic foam (e.g., a ceramic foam monolith or ceramic foam film) is at least partially (or completely) coated with a carbon material.

A silica aerogel material may be a composite material (which may be referred to as silica-carbon aerogel) comprising a silica aerogel (e.g., a silica aerogel monolith or silica aerogel film) at least partially (or completely) coated with a carbon material.

A building insulation material may comprise a ceramic foam (e.g., a silica aerogel) of the present disclosure (e.g., a ceramic foam, such as, for example, a silica aerogel) made by a method of the present disclosure).

TABLE 1

The cost, thermal insulation and mechanical performance of Silica-Carbon Aerogel.

| Material | Thermal Conductivity W/(mK) [4] | R-Value | Unit Price ($/ft2) | Mechanical, Structural, Functional Properties |
|---|---|---|---|---|
| Silica-C Aerogel (this study) | 0.01 | 15 | 0.85 | low thermal conductivity, high durability (mechanical strength, moisture and fire resistance) |
| Silica Aerogel | 0.004-0.04 | 12.5-62.5 | 18.5 | strong structural integrity, high load bearing, light weight, fire retardant, high cost |
| Vacuum insulated panel | 0.007 | 35.7 | 10 | VIP products cannot be cut to fit as with conventional insulation, as this would destroy the vacuum, non-standard sizes must be made to order |
| Polyurethane | 0.025 | 10 | 0.63 | thermoset plastic, combustible, photo-degradation |
| Extruded polystyrene | 0.034 | 7.4 | 0.63 | moisture sensitive, lower rate of permeability, harmful to the environment |
| Fiberglass | 0.04 | 6.3 | 0.05 | strong in tension & compression, weak in shear |
| Mineral wool | 0.037 | 6.8 | 0.1 | fire resistance, water resistance, high itch factor |
| Cellulose | 0.035 | 7.1 | 0.05 | fire retardation, small particle dust, slumping |

[4] https://www.saylor.org/site/wp-content/uploads/2011/04/Thermal_conductivity.pdf It is expected that methods of the present disclosure will provide a low-cost building insulation material. It is expected that that the methods of the present disclosure will provide inexpensive large-scale production and installation of high R-value building insulation material (ceramic foam, such as, for example, a silica aerogel) that can impact a broad range of building envelope applications, such as, for example, roof and wall in existing buildings and future construction. A cost reduction by 90% or more relative to current technology is expected by, for example, replacing supercritical dried ceramic foams, such as, for example, silica aerogels (e.g., Spaceloft®, July 2018), with a ceramic foam (e.g., a silica aerogel) of the present disclosure. Also, it is expected that building energy efficiency of insulation with a ceramic foam of the present disclosure will be at least 45%. An insulation with a ceramic foam of the present disclosure may have R-value and thermal conductivity comparable to commercial ceramic foam at room temperature. However, an insulation with a ceramic foam (e.g., a silica aerogel) of the present disclosure may have an increased R-value at high temperature (e.g., relative to commercial ceramic foam and may reduce the unit cost significantly). The complex processing and volatile organic solvents involved in producing ceramic foam by conventional high-pressure supercritical drying make its use by building insulation material manufacturers cost-prohibitive.

A building insulation material may be a thermal insulation sheet. The thermal insulation sheet may be used in commercial or residential applications. The thermal insulation sheet may be formed using R2R production method. The thermal insulation sheet may be used to retrofit an existing building. In various examples, a thermal insulation sheet comprising a ceramic foam (e.g., a silica aerogel) of the present disclosure is an R15/inch thermal insulation sheet, which may have a thermal conductivity of 0.01 W/mK or less.

In an example, the ceramic foam (e.g., silica aerogel) is formed using TEOS and is white. In another example, the ceramic foam (e.g., silica aerogel) is formed using MTMS and exhibits desirable transparency. For example, a ceramic foam (e.g., silica aerogel) formed using MTMS exhibits 85% or greater, 90% or greater, 95% or greater, or 98% or greater transmittance of visible light wavelengths (e.g., light wavelengths of 400-800 nm such as, for example, 530 nm) (e.g., measured at a sample thickness of 2-3 mm (e.g., 2.7 mm). In yet another example, the ceramic foam (e.g., silica aerogel) is formed using TEOS and MTMS and has one or more white and one or more transparent domains (e.g., exhibiting 90% or greater, 95% or greater, or 98% or greater transmittance of visible light wavelengths (e.g., light wavelengths of 400-800 nm)).

In an example, a ceramic foam or ceramic foam-material (e.g., silica aerogel or silica aerogel-material) does not comprise any exogenous materials (e.g., any detectible exogenous materials, which may be detected by conventional methods known in the art). Exogenous materials include, but are not limited to, materials used in forming building materials from silica materials (e.g., ceramic foam materials). Non-limiting examples of exogenous materials include binders (e.g., polymer binders), polymers, and the like.

The ceramic foam (e.g., silica aerogel) can have desirable properties. For example, a ceramic foam (e.g., silica aerogel) has a Young's modulus of 2-100 MPa (e.g., 2-8 MPa), including all integer MPa values and ranges therebetween.

A ceramic foam may have desirable sound transmission/sound isolation/acoustic insulation properties. In various examples, a ceramic foam has at least 10%, at least 15%, at least 20%, or at least 25% improvement in soundproofing (e.g., increased soundproof coefficient) relative to a given thickness of another material (e.g., an organic polymer foam, such as, for example, PS foam, a PU foam, or the like, or ceramic fibers, or the like) in one or more, substantially all, or all of the frequencies from 500 to 2000 Hz. In another example, a silica aerogel-like foam (e.g., silica PGAeros) with a thickness of 0.014 m has better soundproof performance comparing with the reference PS foam at different frequencies of 500 Hz, 800 Hz, and 2,000 Hz, showing the noise reductions of 10.9%, 12.0%, and 28.4%, respectively.

In an example, a silica aerogel and/or a silica aerogel material does not have any fluorine atoms (e.g., any detectible by conventional methods known in the art). The fluorine atoms may be fluorine atoms bonded to silicon atoms (e.g., —Si—F).

In an aspect, the present disclosure provides uses of ceramic foams of the present disclosure. The ceramic foams can be used in a variety of applications. The ceramic foam may be a superinsulation material or provide superinsulation. For example, the material has a thermal conductivity of 0.01 W/mK or less.

In an example, a ceramic foam is used as an insulating material (e.g., a building material or soundproofing material). The insulating material may exhibit desirable thermal management and/or soundproofing properties.

In an example, a ceramic foam is used as a template or the support substrates for coating with other functional materials as the composites in the applications for the catalyst, membrane, separation, and the like.

The steps of the methods described in the various embodiments and examples disclosed herein are sufficient to carry out the methods of the present disclosure. Thus, in an example, a method consists essentially of a combination of steps of the methods disclosed herein. In another example, a method consists of such steps.

The following Statements provide examples of ceramic foams, methods of making ceramic foams, and uses of ceramic foams of the present disclosure:

Statement 1. A method for forming ceramic foam (e.g., a hierarchical pore gradient ceramic foam) (e.g., silica aerogel) comprising: contacting (e.g., in a reaction mixture) in a sealed environment (e.g., a sealed reaction vessel); a ceramic precursor (e.g., a silica precursor) (e.g., one or more ceramic precursor(s) (e.g., silica precursor(s)); a pore-forming gas-forming additive (an inert gas-generating agent) (e.g., one or more pore-forming gas-forming additive(s)); a catalyst (one or more catalyst(s)); and optionally, an additive (e.g., one or more additive(s)), where the contacting is results in formation of an inert gas (e.g., carbon dioxide, nitrogen or a combination thereof) and an a hierarchical pore gradient ceramic foam (e.g., silica aerogel) is formed. E.g., the hierarchical pore gradient ceramic foam is a film or a monolith. A method may comprise a sintering step, where the hierarchical pore gradient ceramic foam is sintered.

Statement 2. A method according to Statement 1, where the contacting is carried out at an initial pressure of 1-100 psi (e.g., the reaction vessel is pressurized to 1-100 psi), including all 0.1 psi values and ranges therebetween, before substantial reaction (e.g., reaction of 5%, 1%, or 0.1%) of the one or more ceramic precursor(s) and/or the one or more pore-forming gas-forming additive(s) and/or, if present, the one or more additive(s), has reacted.

Statement 3. A method according to Statements 1 or 2, where the one or more ceramic precursor(s) is/are selected from silica precursors, alumina precursors, transition-metal oxide precursors, and combinations thereof.

Statement 4. A method according to Statement 3, where the silica precursor(s) is/are chosen from tetraalkoxysilanes (e.g., TMOS, TEOS, and the like) (e.g., $C_1$-$C_5$ alkoxy tetraalkoxysilanes), alkyltrialkoxysilanes (e.g., methyltrimethoxysilane (MTMS) and the like) (e.g., $C_1$-$C_5$ alkyl, $C_1$-$C_5$ alkoxy alkyltrialkoxysilanes), sodium metasilicates (e.g., water glass), alkyl, and combinations thereof.

Statement 5. A method according to Statements 3 or 4, where the alumina precursor(s) is/are chosen from aluminum alkoxides (e.g., $C_1$ to $C_6$ aluminum alkoxides), alumatrane, or tris(alumatranyloxy-i-propyl)amine, and the like, and combinations thereof.

Statement 6. A method according to Statements 3 or 4, where the transition-metal oxide precursor(s) is/are chosen from transition metal alkoxides (e.g., transition metal alkoxides having the formula $M(OR)_x$, where M is a transition metal (for example, Al, Ti (e.g. titanium(IV)-iso-propoxide and the like), Zr, W, Cr, Mo, and the like) and R is at each occurrence an alkyl group and x is 1, 2, 3, 4, or 5) and the like. The transition metal can have various oxidation states (e.g., $^+1$, $^+2$, $^+3$, $^+4$, or $^+5$).

Statement 7. A method according to any one of the preceding Statements, where the one or more catalyst(s) is a base catalyst (e.g., ammonia, ammonium fluoride, ammonium hydroxide, urea, cetyltrimethylammonium bromide, and the like, and combinations thereof).

Statement 8. A method according to any one of Statements 1-6, where the catalyst is an acid catalyst (e.g., protic acids (e.g., acetic acid and the like), hydrohalic acids, and the like, and combinations thereof).

Statement 9. A method according to any one of the preceding Statements, where the one or more pore-forming gas-forming additive(s) (inert gas-generating agent) is chosen from sodium bicarbonate, urea, and combinations thereof (e.g., where the pore-forming gas-forming additive (inert gas-generating agent) provides a sub-critical amount (e.g. pressure) of inert gas). The pore-forming gas (inert gas) may be carbon dioxide and/or nitrogen and/or ammonia.

Statement 10. A method according to any one of the preceding Statements, where in the one or more additive(s) is/are selected from surfactants (e.g., cetyltrimethylammonium bromide (CTAB)), urea, and combinations thereof. The surfactant(s) may aid in pore formation. The surfactant(s) may also provide surface functionalization.

Statement 11. A method according to any one of the preceding Statements, where the one or more ceramic precursor(s) (e.g., silica precursor(s)), the one or more pore-forming gas-forming additive(s) (the inert gas-generating agent), and, optionally, the one or more additive(s) are contacted and then the catalyst is contacted with the one or more ceramic precursor(s) (e.g., silica precursor), the one or more pore-forming gas-forming additive(s) (the inert gas-generating agent(s)), and, optionally, the one or more additive(s).

Statement 12. A method according to any one of the preceding Statements, where the contacting comprises mixing: one or more ceramic precursor(s) (e.g., silica precursor), which may be disposed (e.g., dissolved in) in water, a solvent (e.g., alcohol, such as, for example, ethanol), or a combination thereof; one or more pore-forming gas-forming additive(s) (an inert gas-generating agent), which may be disposed (e.g., dissolved in) in water; one or more catalyst(s), which may be disposed (e.g., dissolved in) in water. The ceramic precursor(s), inert gas-generating agent(s), catalyst(s), and, optionally, additive(s) may be combined in any order. In an example, the catalyst(s) is/are the last component added.

Statement 13. A method according to one of the preceding Statements, where the one or more ceramic precursor(s) (e.g., silica precursor(s)) is/each are present at 2 to 10% weight (based on the total weight of ceramic precursor(s) (e.g., silica precursor(s)), catalyst(s), pore-forming gas-forming additive(s), and, if present, additive(s)).

Statement 14. A method according to any one of the preceding Statement, where the one or more pore-forming gas-forming additive(s) is/are present at 0.4 to 2% weight (based on the total weight of ceramic precursor(s) (e.g., silica precursor(s)), catalyst(s), pore-forming gas-forming additive(s), and, if present, additive(s)). For example, the ceramic precursor(s) (e.g., silica precursor(s)) is/are at least 5 times larger weight than that of the pore-forming gas-forming additive(s) (the inert gas-generating agent(s)).

Statement 15. A method according to any one of the preceding Statements, where the one or more catalyst(s) is/are present at 1 to 2% weight (based on the total weight of ceramic precursor(s) (e.g., silica precursors), catalyst(s), pore-forming gas-forming additive(s), and, if present, additive(s)).

Statement 16. A method according to any one of the preceding Statements, where one or more additive(s) is present at 200 to 1000% weight (based on the total weight of ceramic precursor(s) (e.g., silica precursor(s)), catalyst(s), pore-forming gas-forming additive(s)). For example, the additive(s) is/are 2 times to 10 times greater by weight than the ceramic precursor(s). For example, the one or more additive is present at 10 times the weight of the silica precursor(s), catalyst(s), pore-forming gas-forming additive(s) (based on the total weight of silica precursor(s), catalyst(s), pore-forming gas-forming additive(s)).

Statement 17. A method according to any one of the preceding Statements, where the ratio of ceramic precursor(s) (e.g., silica precursor(s)):pore-forming gas-forming additive(s):catalyst(s):additive(s) is 5:1:1:50. In various examples, one or more of these values ranges by 10% or 20%.

Statement 18. A method according to any one of the preceding Statements, where the contacting is carried out at a temperature of room temperature (e.g., 18-23° C.) to 70° C. and/or for 1 minute to 96 hours (e.g., 1 to 24 hours (h or hrs)).

Statement 19. A method according to any one of the preceding Statements, the method further comprising exchanging (e.g., removing solvent(s)) from the ceramic foam (e.g., silica aerogel).

Statement 20. A method according to any one of the preceding Statements, the method further comprising washing the ceramic foam (e.g., silica aerogel). The washing step may be an exchange step, where undesirable materials (e.g., solvent(s), unreacted ceramic (e.g., silica) reaction components, and the like) are removed. In various examples, 90% or greater, 95% or greater, 99% or greater, or all observable undesirable materials are removed from the film.

Statement 21. A method according to Statement 20, where the washing comprises contacting the ceramic foam (e.g., silica aerogel) with an aqueous solution (e.g., an aqueous alcohol solution).

Statement 22. A method according to any one of the preceding Statements, the method further comprising washing the ceramic foam (e.g., silica aerogel) with an alcohol (e.g., ethanol) and/or drying the ceramic foam (e.g., silica aerogel). E.g., subjecting the ceramic foam (e.g., silica aerogel) (e.g., heating the ceramic foam (e.g., ceramic foam)) to a temperature of room temperature (e.g., 18-23° C.) to 100° C. (e.g., 30-60° C.), where the subjecting (or heating) may be under ambient conditions. For example, the hydrophobic coating is compatible with the ceramic foam structure (e.g., silica aerogel structure).

Statement 23. A method according to any one of the preceding Statements, further comprising forming a layer (e.g., a film) of hydrophobic carbon-containing material disposed on at least a portion or all of a surface of the ceramic foam (e.g., silica aerogel). In an example, the ceramic foam (e.g., silica aerogel) is contacted with a silane (e.g., trialkylhalosilanes, such as, for example, trimethylchlorosilane (TMCS), carbon material (e.g., carbon soot), or a combination thereof).

Statement 24. A method according to any one of the preceding Statements, comprising forming a film from the ceramic foam (e.g., silica aerogel).

Statements 25. A method according to Statement 24, where the film is formed on a substrate. E.g., at least a portion of the ceramic foam (e.g., silica aerogel-like foam or silica aerogel) forming reaction is carried out on the substrate. Non-limiting examples of substrates include paper, metals (e.g., aluminum, which may be an aluminum foil, thermal insulation paper substrates, fibers, and the like.)

Statement 26. A method according to Statements 24 or 25, where the forming is a continuous process (e.g., a continuous roll-to-roll process).

Statement 27. A method according to Statements 24 or 25, where the forming is carried out by doctor blading, drop casting, additive manufacturing (e.g., 3D printing), and/or the like.

Statement 28. A method according to Statements 24 or 25, where the film is formed by spray coating of a gelled (e.g., not solidified) form of the reaction mixture comprising one or more ceramic precursor(s), one or more pore-forming gas-forming additive(s), one or more catalyst(s) and, optionally, one or more additive(s). For example, the gelled form of the reaction mixture has a viscosity of 85 to 1,000 cP. Optionally, a compressed air may be added to the gel to enhance the flowability.

Statement 29. A method according to any one of Statements 1-23, comprising impregnating a substrate with the ceramic foam (e.g., silica aerogel-like foam or silica aerogel). The porous substrates can be immersed and incubated into the silica sol or gel solution from 1 hour to 24 hours. The composite can then be ambient dried or low temperature thermal drying (300 K to 355 K) to form the impregnated substrates.

Statement 30. A method according to any one of the preceding Statements, further comprising decorating or coating at least a portion of a surface (e.g., an exterior surface) of the ceramic foam.

Statement 31. A method according to Statement 30, where the ceramic foam is decorated or coated with a material (e.g., one or more nanoparticle(s), which may be metal oxide nanoparticles) (e.g., iron oxide nanoparticles, which may be magnetic nanoparticles). E.g., the ceramic foam is decorated or coated using an in-situ reaction by impregnating the foam with material (e.g., nanoparticle precursors, which may metal oxide nanoparticle precursors, and followed by solid state sintering from 200 to 1000° C., including all integer ° C. values and ranges therebetween.

Statement 32. A method according to Statement 31, where the nanoparticles are formed by impregnating the ceramic foam with a nanoparticle precursor (e.g., $CuCl_2$, $FeCl_3$, and like, and combinations thereof) and nanoparticles are formed from reaction of the nanoparticle precursor (e.g., heating the impregnated ceramic foam to form nanoparticles) and a nanocomposite material is formed.

Statement 33. A silica aerogel formed by a method of anyone of the preceding claims.

Statement 34. A ceramic foam (e.g., a ceramic foam formed from a method of any one of the preceding claims) having (e.g., comprising) pores and a hierarchical pore gradient. At least a portion or all of the pores may be interconnected. The size of the pores (e.g., macropores) generally decrease or increase along a dimension moving from a first surface of the ceramic foam to a second surface opposite the first surface. The gradient may be a linear gradient. The ceramic foam may comprise mesopores and/or macropores. The mesopores may be mesopores as defined by IUPAC.

Statement 35. A ceramic foam according to Statement 34, where the ceramic foam comprises a ceramic matrix. The ceramic matrix may be formed from ceramic nanoparticles. The ceramic matrix may be mesoporous.

Statement 36. A ceramic foam according to Statement 35, where the ceramic foam comprises pores (e.g., macropores) having a size (e.g., at least one dimension (e.g., a diameter), as measured in a plane parallel to an axis of the pore) and/or at least one dimension (e.g., a height) as measured in a plane perpendicular to an axis of the pore) of 500 microns to 1 micron (e.g., 200 microns to 1 micron or 100 microns to 1 micron).

Statement 37. A ceramic foam according to any one of Statements 34-36, where the ceramic foam is silica aerogel-like or is a silica aerogel and is transparent.

Statement 38. A ceramic foam (e.g., a silica aerogel) according to any one of Statements 34-37, where the ceramic foam has one or more or all of the following features: (e.g., silica aerogel) is 90-99% air (e.g., at least 90%, at least 95%, or at least 98% air), a desirable porosity (<100 nm), a desirable density (~0.003 g/cm$^3$, and a desirable thermal conductivity (typically, ~0.017 W/mK).

Statement 39. A ceramic foam (e.g., a silica aerogel) according to any one of Statements 34-38, where the ceramic foam (e.g., silica aerogel) comprises a layer of carbon-containing material disposed on at least a portion or all of a surface (e.g., an exterior surface) of the ceramic foam. E.g., where the thickness (e.g., a dimension perpendicular to a surface of the ceramic foam) is 10 nm or less (e.g., 0.1 to 10 nm). Non-limiting examples of carbon-containing materials include carbon soot, alkyl silane groups, additive (e.g., surfactant) residues (which may be produced by thermal annealing). The layer may be a continuous layer and/or a conformal layer and/or may have a desirably low number of defects (e.g., no observable, which may be visually observable, defects). The layer may be a molecular layer (e.g., a molecular layer of groups, which may be hydrophobic groups). The layer may provide a hydrophobic exterior surface. A carbon-material (e.g., carbon soot) layer may be formed by combustion of a carbon source.

Statement 40. A ceramic foam according to any one of Statement 34-39, where the ceramic foam further comprises nanoparticles disposed on at least a portion of a surface of the ceramic foam.

Statement 41. A ceramic foam according to any one of Statements 34-39, where the ceramic foam is a monolith, a free-standing film, or a film disposed on at least a portion of or all of a substrate. In an example, the ceramic foam is a free-standing film (e.g., a sheet). In an example, the film does not comprise a binder (e.g., a polymer binder). Examples of binders (e.g., polymer binders) for ceramic foam (e.g., silica aerogel materials) are known in the art.

Statement 42. A ceramic film (e.g., a silica aerogel) according to Statement 41, where the film has a thickness of ¼ inch to 2 inch.

Statement 43. A ceramic foam (e.g., a silica aerogel) according to Statements 41 or 42, where the film is disposed on at least a portion of a surface of a substrate (e.g., aluminum foil, thermal insulation paper, fiber, or the like).

Statement 44. A ceramic foam impregnated substrate formed by a method of any one of Statements 25-29, where the impregnated substrates have desirable porosity (e.g., greater than 100 nm) and/or desirable conductivity (e.g., ~0.017 W/mK or 0.017 W/mK or less).

Statement 45. A ceramic foam according to any one of Statements 34-42, where the ceramic foam exhibits one or more or all of the following:
  Thermal stability (e.g., thermal stability at least to 2000° C.)
  Mechanical strength (e.g., mechanical strength of at least 100 MPa)
  Soundproof/acoustic insulation characteristics Statement 46. A silica aerogel formed by a method according to any one of Statements 1-32 or a ceramic foam (e.g., a silica aerogel) according any one of Statements 34-45. In an example, the silica aerogel film is a free-standing film (e.g., a sheet). In an example, the film does not comprise a binder (e.g., a polymer binder). Examples of binders (e.g., polymer binders) for silica aerogel materials are known in the art.

Statement 47. A silica aerogel impregnated substrate formed from a method according to Statement 28, where the impregnated substrates have desirable porosity (<100 nm) and desirable conductivity (~0.017 W/mK).

The following examples are presented to illustrate the present disclosure. These examples are not intended to be limiting in any matter.

Example 1

This example provides a description of making silica aerogel materials of the present disclosure and characterization of same.

1 g sodium bicarbonate was mixed with 7.08 ml DI water. Added in 4.59 ml Tetraethyl orthosilicate (TEOS) and 22.34 ml pure ethanol. 1 ml catalyst was also added to speed up the gel formation. The catalyst is a mixture of 1.457 ml ammonium hydroxide (28%), 0.1 g ammonium fluoride and 4.35 ml DI water. After 3 min (min=minute(s)), the gel was washed by DI water and then add in 500 ml pure ethanol soaking and stirring for 24 h (h=hour(s)). After soaking, the ethanol was removed. Then 10 ml TMCS (98%) was dropped into the solution. Pure ethanol was also added. $CO_2$ coming out was observed continuously for next 24 h. At last, the gel was dried in 60° C. ambient environment with ethanol for 24 h to get aerogel product.

Example 2

This example provides a description of making silica aerogel materials of the present disclosure and characterization of same.

3.3 g of cetyl trimethylammonium bromide (CTAB) and 33.3 g of urea were dissolved in acetic acid aqueous solution (1 mM, 100 mL) following by 20 min stirring. Then, 56.7 mL of Tetraethyl orthosilicate (TEOS) was added. The solution was stirred vigorously for 30 min to form a uniform bubble emulsion which was sealed and then transferred into a preheated oven at 60° C. for 2-day reaction. The as-prepared aerogel was washed by water and dried at room temperature. The resulting aerogel has a light density (around 0.15 g/cm$^3$) and good thermal insulation.

Example 3

This example provides a description of silica aerogel materials of the present disclosure and characterization of same.

The sample was prepared by running the reaction with a substrate (Unifrax paper) in contact with the reaction mixture. This can be referred to an in-situ infiltration. SEM; energy dispersive x-ray spectroscopy (EDX); and thermal imaging were obtained (FIGS. 2-6).

Example 4

This example provides a description of methods of making silica aerogel materials of the present disclosure and characterization of same.

Trimethylchlorosilane (TMCS), $(CH_3)_3SiCl$, were used for surface modification of silica gels, producing HCl as a byproduct, which spontaneously reacted with sodium bicarbonate to generate the pore-supporting carbon dioxide in-situ. The carbon dioxide formed is trapped in the wet silica gel, with the pressure in the resulting bubbles opposing capillary pressure, which prevents pore shrinkage and collapse during the ambient pressure-drying step. The silica gel precursors used were aqueous tetraethoxysilane (TEOS, $Si(OC_2H_5)_4$) and sodium bicarbonate ($NaHCO_3$), and trimethylchlorosilane used for surface modification.

The low-cost production of aerogel insulation material is expected with in-situ APD and R2R manufacturing. The well prescribed gel can be R2R deposited on an inorganic paper substrate carrier. Central to the fabrication of aerogel materials using R2R manufacturing is the formulation of a gel precursor that is robust in printing. The rheological behavior of silica gel plays a critical role for continuous deposition in R2R process, which requires a non-Newtonian liquid with shear thinning behavior. The Weber number (We) and Ohnesorge (Oh) number (or inverse number Z) are used to predict if a stable deposition is achieved: $We=\rho v^2 d/\sigma$ and $Z=1/Oh=\sqrt{\rho d\sigma}/\mu$, where v is the fluid velocity, d is the nozzle diameter, σ is the surface tension and μ is the viscosity. A Brookfield Viscometer was employed to measure the gel viscosity. Surface tension is measured by capillary rise, $\gamma=\frac{1}{2} rh\rho$, where r is the radius of capillary tube, h is the fluid height, and ρ is fluid density.

Nitrogen physisorption, with fitting by the Brunauer-Emmett-Teller technique, was used to explore the pore distribution of silica aerogel. The $N_2$ adsorption-desorption isotherm plot of silica aerogel, indicated the existence of hierarchical pores and relatively sharp pore distribution (the dominant pore size <60 nm).

The mechanical properties are important for building silica aerogel. A honeycomb aerogel structure was fabricated to study stress-strain curves. Compressive strength σ* is strongly influenced by overall density ρ* of sample as seen from equation $\sigma^*/\sigma_{(ts,strut)}=C[(\rho^*/\rho\_strut)]^c$, where σ^* is compressive strength, σ_(ts,strut) is the compressive strength of the strut composing the honeycomb. Thus, the compressive strength of the aerogel is a function of the porosity, thickness and length. The thickness is tailored through R2R printing. The porosity can be tuned by gel concentration and shrinkage.

Thermal insulation performance is a metric for silica aerogels. The thermal insulation capability of 3D manufactured silica aerogel was investigated. Thermographic analysis showed that the silica aerogel serves as a thermal insulator. Depending on its thickness, thermal insulation of silica aerogel varies. The effective thermal conductivity can be calculated according to the effective medium percolation theory, $\lambda\_eff=\frac{1}{4}\{[\lambda\_p(3v\_p-1)+\lambda\_s(3v\_s-1)]+[([\lambda\_p(3v\_p-1)+\lambda\_s(3v\_s-1)]^2+8\lambda\_p\lambda\_s)]^{(1/2)}\}$, where λ_s and λ_p are the solid and pore conductivity, and v_s, v_p are their volume fraction, respectively. The thermal conductivity of silica aerogel in this case can be estimated as 0.016 W/mK.

SEM and additional testing data is shown in FIGS. 7-22.

Example 5

This example provides a description of making ceramic foams materials of the present disclosure and characterization of same.

Pore-gradient silica aerogel-like foam monoliths (PGAeros) were designed and synthesized, where the hierarchical hollow structures and a gradient pore size are controlled by the hydrolysis of tetraethyl orthosilicate (TEOS) in the presence of acetic acid, urea, and cetrimonium bromide (CTAB). The CTAB micelle networks and in-situ gas bubble formation from the thermal decomposition of urea guide the formation of hierarchical pores and pore gradient in PGAeros, respectively. The as-synthesized silica insulation materials show a superior thermal and acoustic insulation and fire-resistant performance with a thermal conductivity as low as 0.040 W m$^{-1}$ K$^{-1}$ and mechanical integrity of the compressive strength of 100.56 MPa, which enables the further shaping and customization for a desired shape and geometry. The acoustic performance is also tested under different frequencies indicating a better soundproof property (sound reduction by 28.3%, or 22.3 db at a thickness of 15 mm at frequency of 2000 Hz) over the reference insulating foam.

Figure 23:
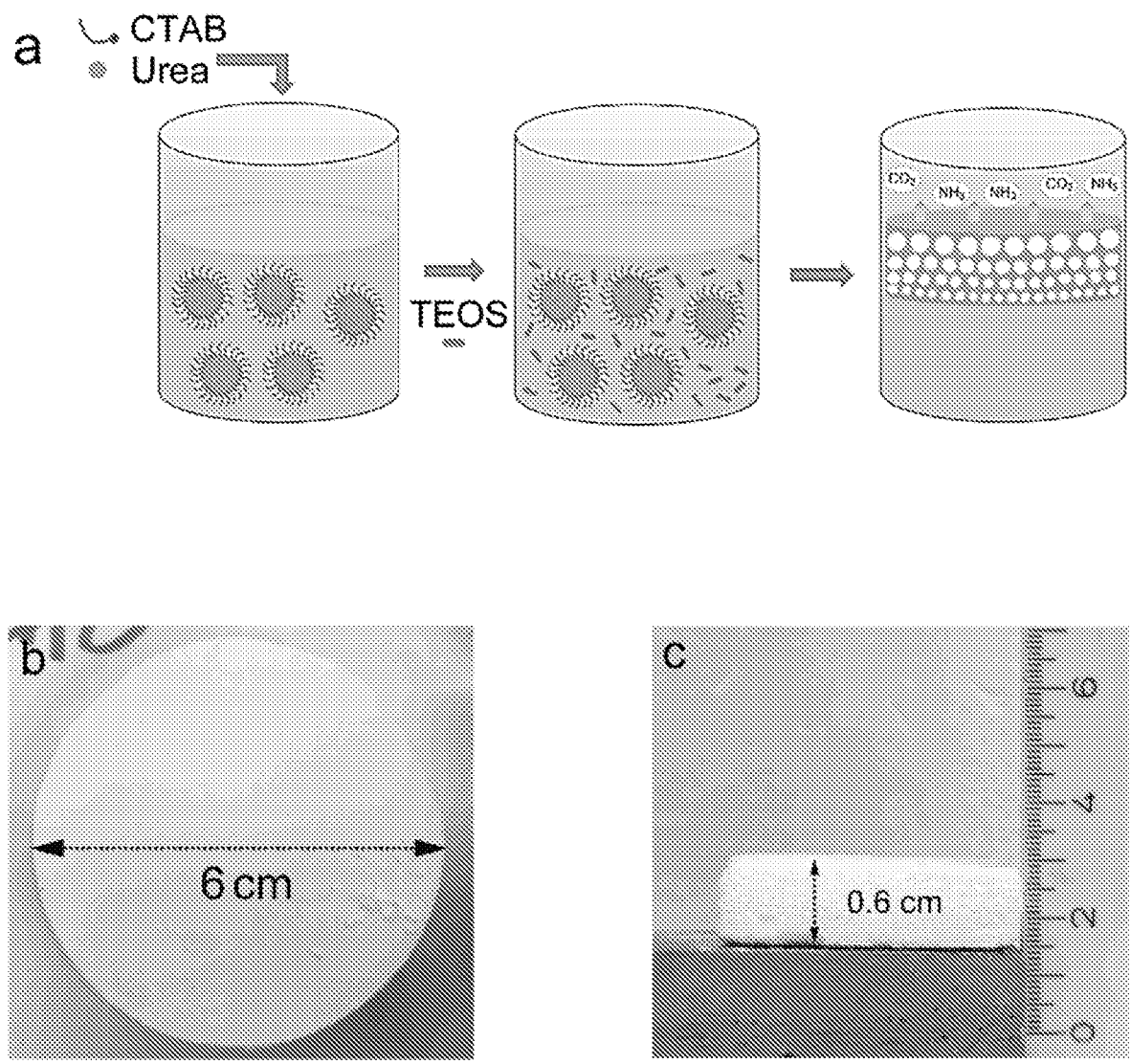
FIG. 23 shows a) a schematic illustration of the synthesis process of silica PGAeros with three steps: 1. Formation of micelles assisted by CTAB in urea aqueous solution, 2. Hydrolysis of TEOS at the interfaces of CTAB micelles, 3. Decomposition of urea with the release of $NH_3$ and $CO_2$. b) Optical image of a typical silica foam with 6 cm in diameter. c) Polished silica PGAero sample with a thickness 0.6 cm. d) Typical SEM image of silica PGAeros indicating a clear pore gradient. Insert shows the increased average pore size from bottom to top. e, f) The high-resolution SEM images with e) large and f) small pores corresponding to the top and bottom area in FIG. 23d, respectively. g) Low-resolution and h) high-resolution TEM images of the particles from the silica networks of PGAeros.
Figure 23:
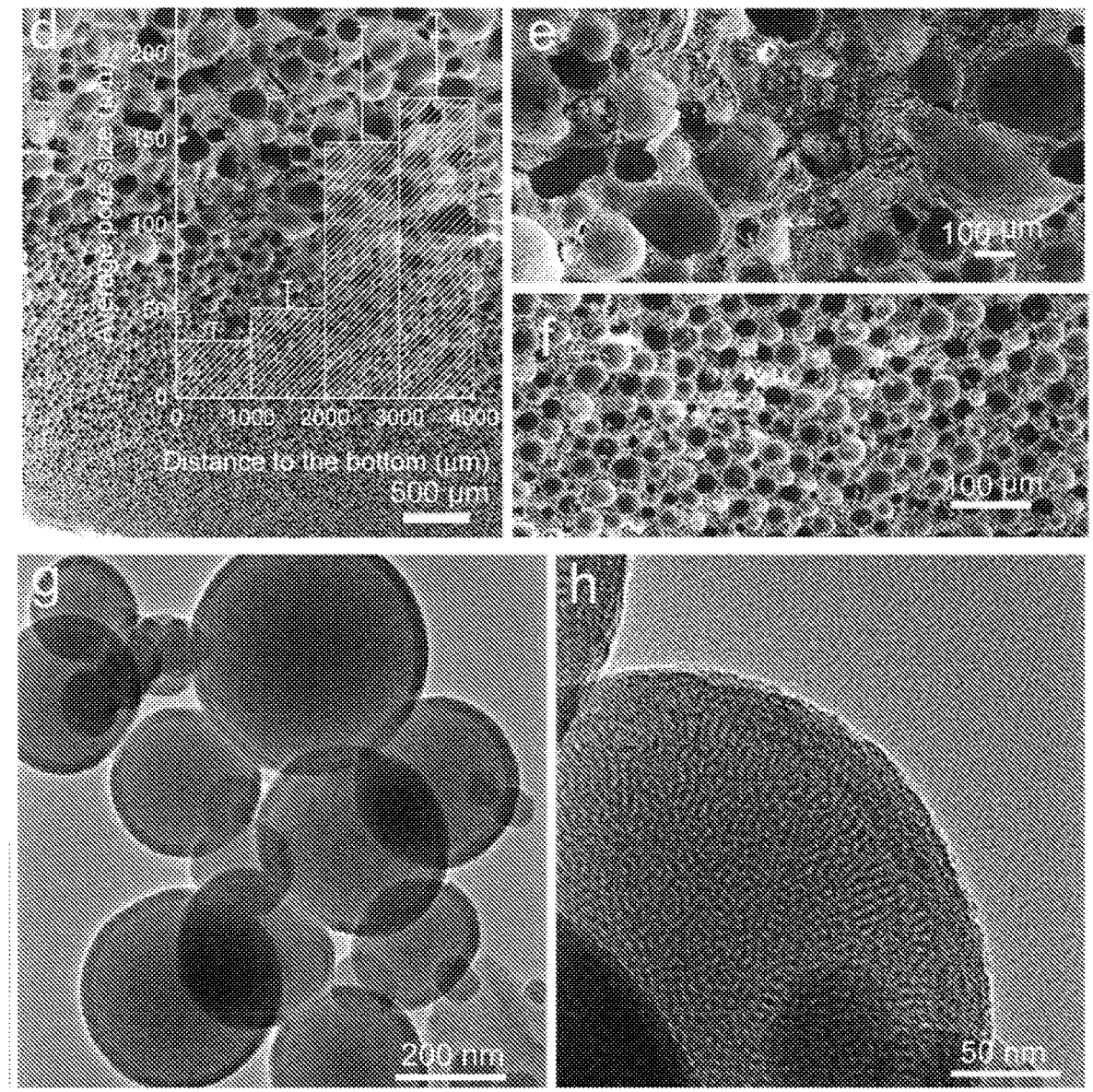

Results and discussion. The scheme in FIG. 23a shows the formation of the hierarchical hollow-structured silica PGAeros which is achieved by a facile one-pot synthesis. The surfactant CTAB is used to form the micelles in the mixture solution of TEOS and water. The hydrolysis of TEOS is proceeded at the shell of the as-formed micelles, which serve as templates leading to the formation of silica shells. The urea addition accelerates the polymerization of silicon alkoxides by raising the solution pH, while it can work as in-situ foaming agent due to its thermal hydrolysis into ammonia ($NH_3$) and carbon dioxide ($CO_2$). The as-formed silica PGAeros float on the water surface due to its low mass density. Continuous decomposition of urea and thereafter release of in-situ carbon dioxide and ammonia gas bubbles build a high pressure in the upper part of the reaction chamber, which leads to the foaming process from the top to the bottom resulting in the pore gradient in PGAeros. FIG. 23b shows the typical photograph of the as-grown opaque silica PGAeros, which can be cut and polished into a desired shape for the further studies (as shown in FIG. 23c). The pore gradient can be readily observed from the scanning electron microscopy (SEM) image (FIG. 23d), exhibiting an increase of average pore size from the top to the bottom, where the dimension of pore is dependent on the reaction conditions, such as the chemical concentrations, reaction temperature and time (These are discussed in the following sections). The average pore size of PGAeros from the bottom to the top regions was calculated indicating an increase from 33.3 µm to 174.8 µm at the ratio of TEOS:CTAB:Urea=27.8:1:60.7 (Insert in FIG. 23d). The high-resolution SEM images of PGAeros at the large-pore and small-pore regions are shown in FIGS. 23e and f, respectively. In addition, the as-synthesized silica PGAeros show a porosity of 94.1% by Pycnometer and low density of 0.128 g cm$^{-3}$. The solid networks of PGAeros are constructed by nanoscale silica particles, which were further characterized by transmission electron microscopy (TEM). As shown in FIGS. 23g and h, a large number of micropores in each particle was clearly observed presumably due to the template effect of CTAB molecules. Therefore, silica PGAeros with high porosity and low density due to the hierarchical hollow structures with gradient macroscale pores and mesopores inside the silica networks were obtained, which can be expected to render the as-syntheiszed silica PGAero with confined gas thermal conduction and high phonon scattering resulting in a high insulting performance.

Figure 24:
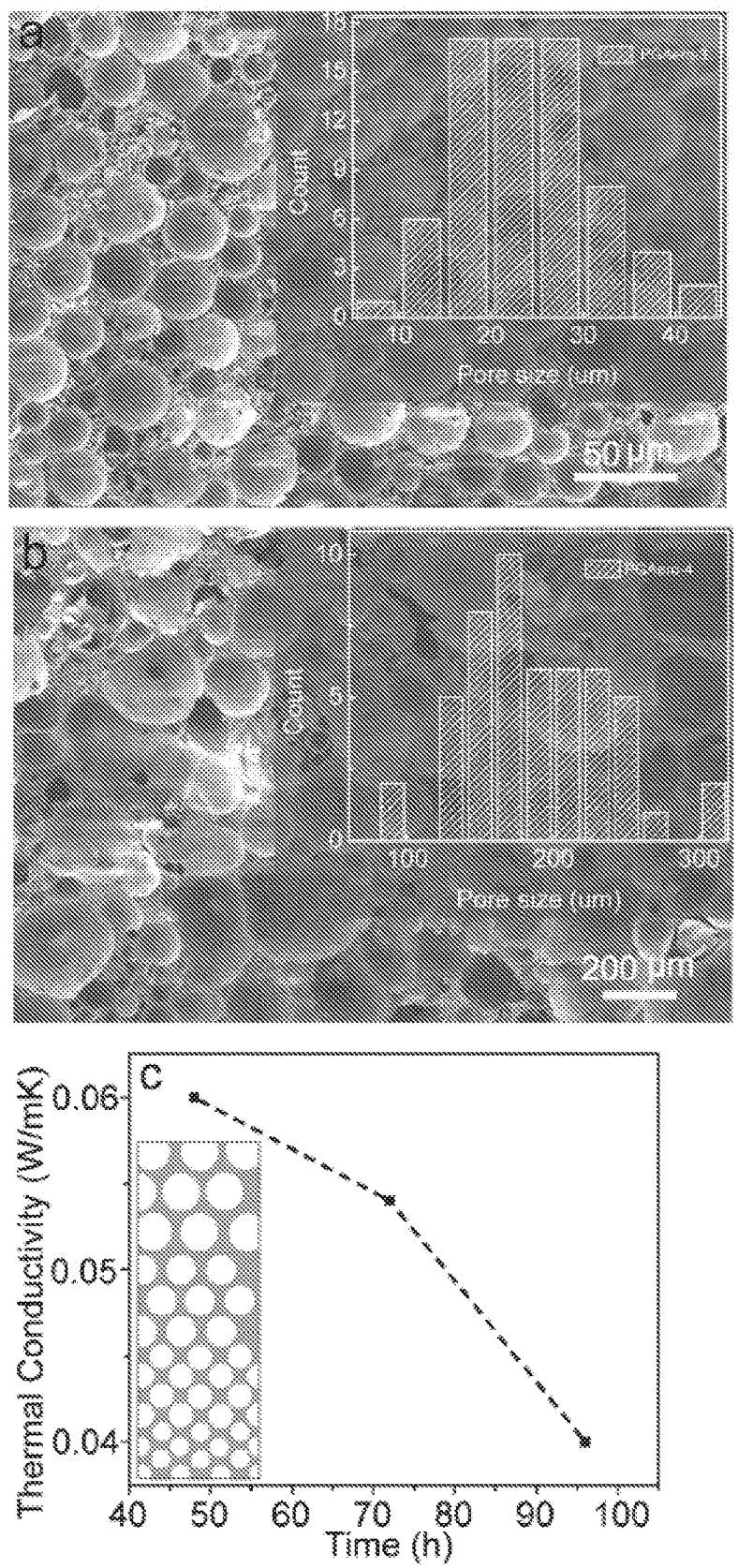
FIG. 24 shows SEM images of silica PGAeros with reaction time of a) 48 h (hours), and b) 72 h. Insert figures show the corresponding size distribution of pores. c) Thermal conductivities of the silica PGAeros synthesized by different periods of reaction time.
Figure 27:
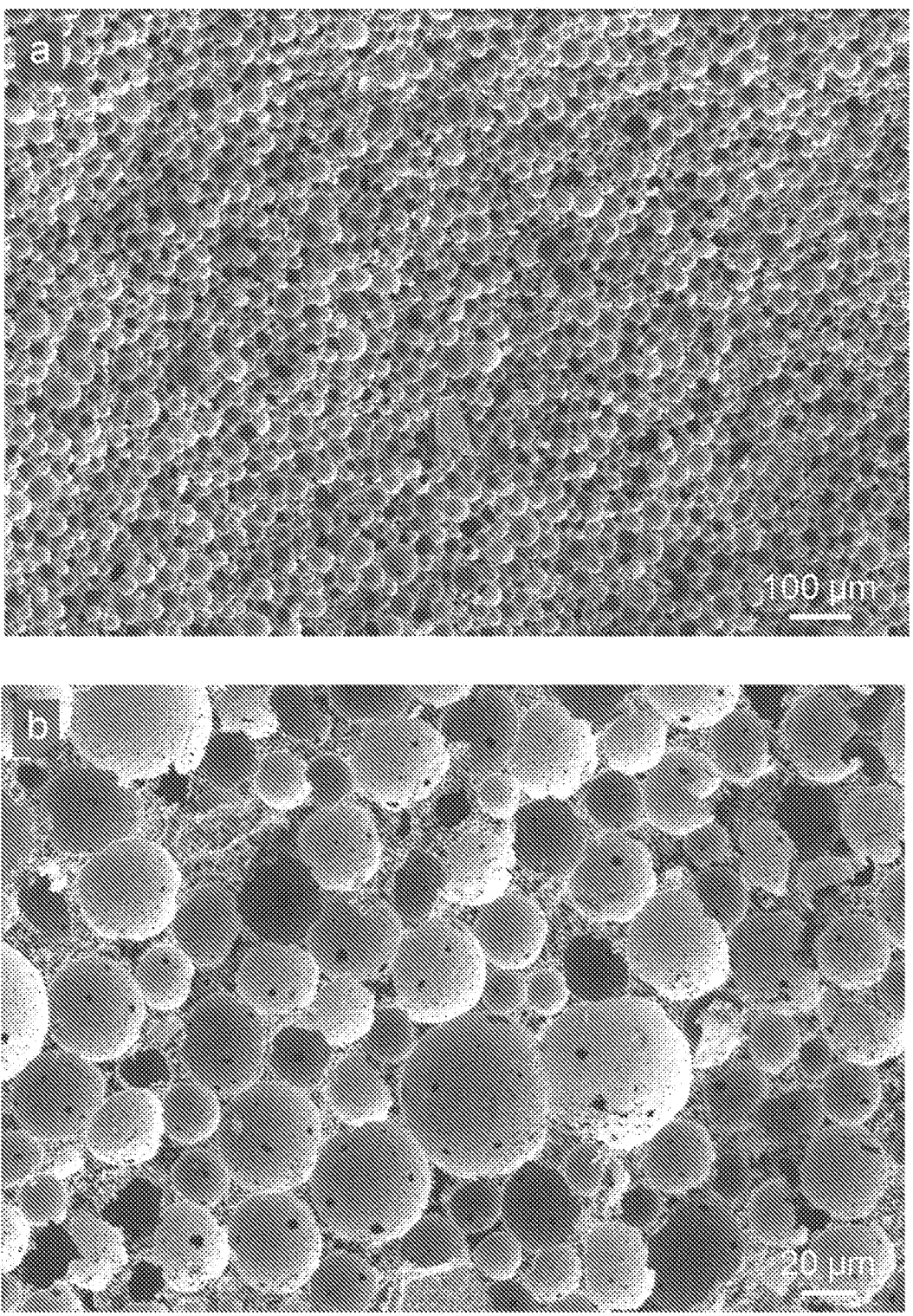
FIG. 27 shows a, b) large scale and zoom in SEM image of the PGAero-2 sample.
Figure 28:
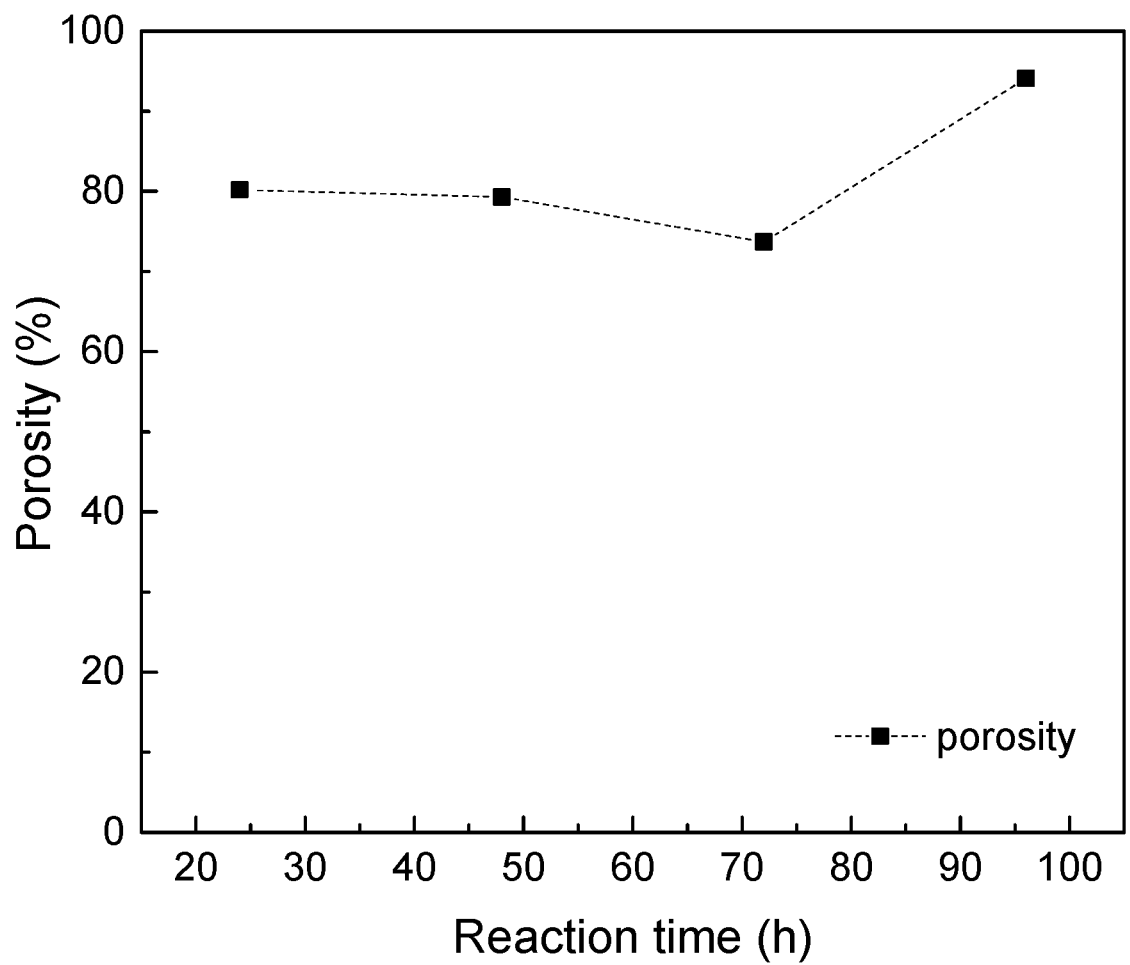
FIG. 28 shows porosity changing along the reaction time.
Figure 30:
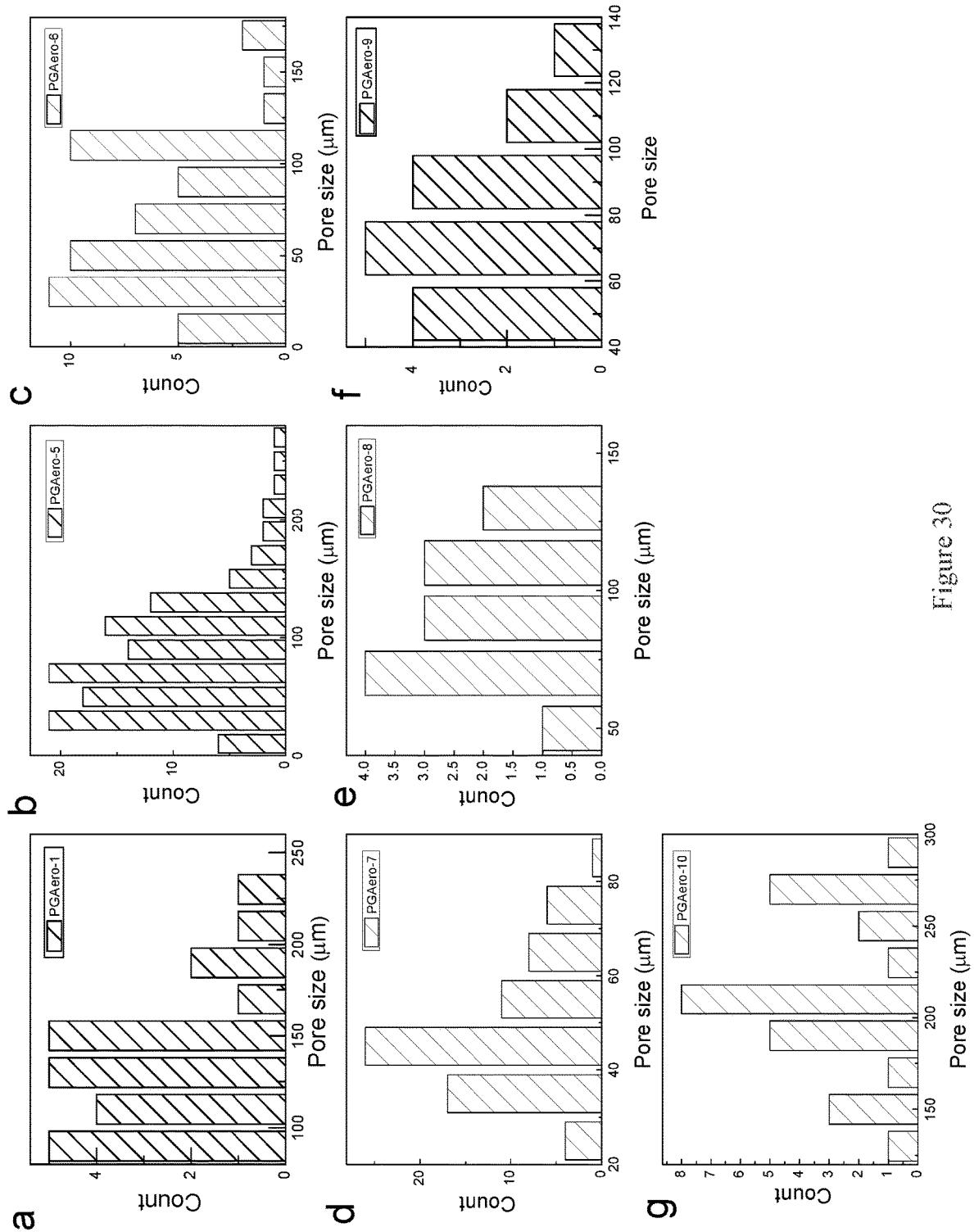
FIG. 30 shows a-g) Average pore size distribution of sample PGAero-1, PGAero-5-PGAero-10.

To understand and control the pore gradient formation in PGAeros, a series of experiments was designed to synthesize PGAeros with less reaction periods of 24 h, 48 h, and 72 h (nominated by PGAero-2, PGAero-3, PGAero-4, respectively). Compared with the original sample synthesized by the reaction time of 96 h with a pore gradient (referred as PGAero-1), the silica PGAeros by 24 h has a uniform pore size of 27.5 µm and a standard deviation of 9.4 µm (FIG. 27a, b). With the increase of the reaction time to 48 h, the gradient pore of PGAeros is gradually formed resulting in a larger pore deviation as shown in FIG. 24a. When the reaction time is increased to 72 h, the pore size of PGAeros shows a wide range from 15 µm to 300 µm with a much larger deviation of 85.3 µm (FIG. 24b). The porosities of silica PGAeros maintain around 80% with a slight decrease by increasing the reaction time due to continuous growth of silica (FIG. 28). The pore gradient with increased pore size and decrease of porosity show the competition effects on the insulation performance. The decrease of porosities of silica PGAeros synthesized from 24 h to 48 h primarily results in an increased of thermal conductivity from 0.049 W m$^{-1}$ K$^{-1}$ to 0.060 W m$^{-1}$ K$^{-1}$. In the meantime, the pore gradient with the increased pore size dominates the insulating performance, leading to a lower thermal conductivity of 0.054 W m$^{-1}$ K$^{-1}$. Further increasing the reaction time renders the silica PGAero with a lowest thermal conductivity of 0.040 W m$^{-1}$ K$^{-1}$ (FIG. 24c).

Figure 25:
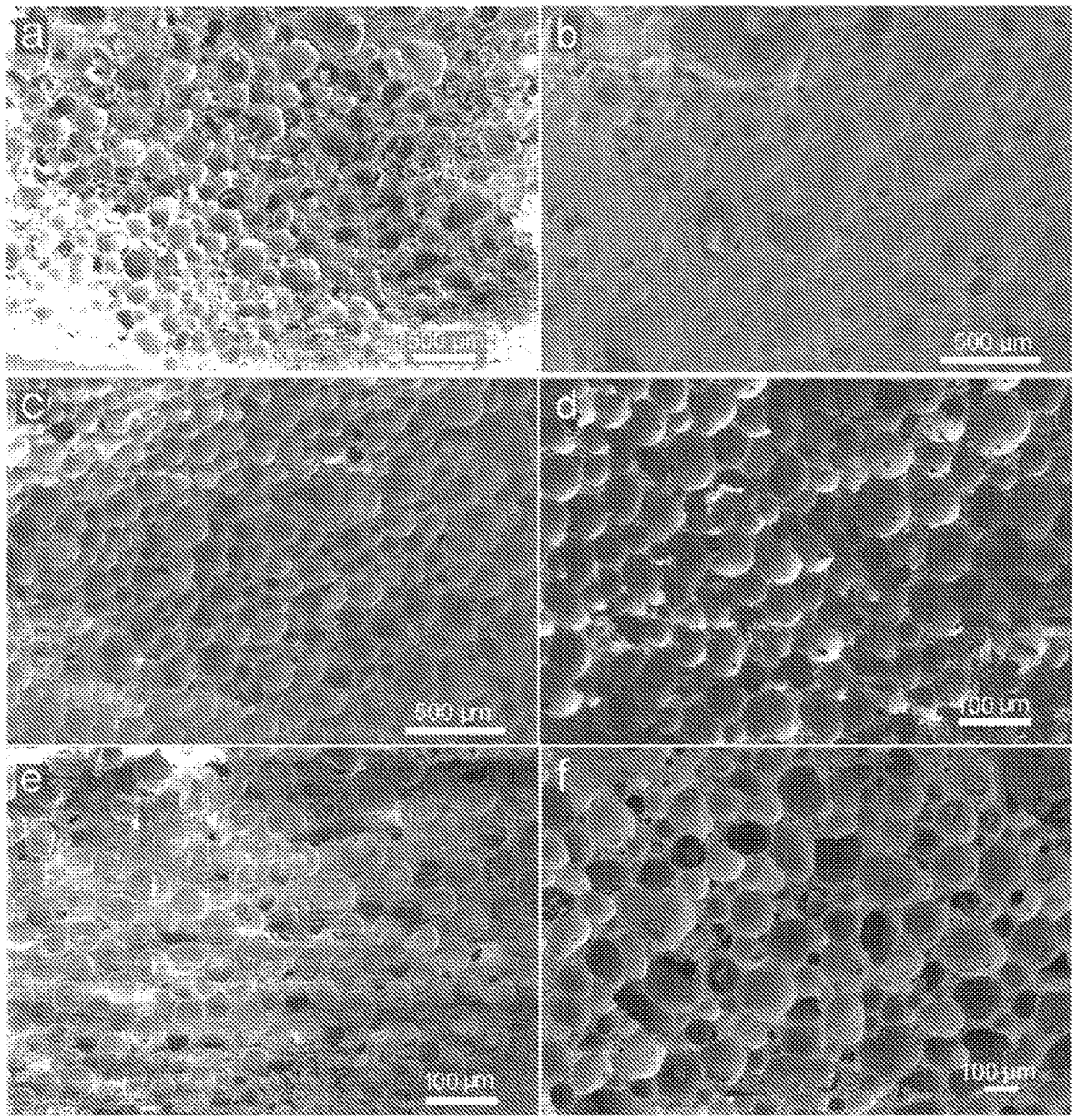
FIG. 25 shows a-f) SEM images of silica PGAeros synthesized by varying the amount of precursors referred as to PGAero-1, 5, 6, 7, 8, and 9, respectively. g) The thermal conductivities of the series of PGAeros dependent on average pore size and porosity.
Figure 25:
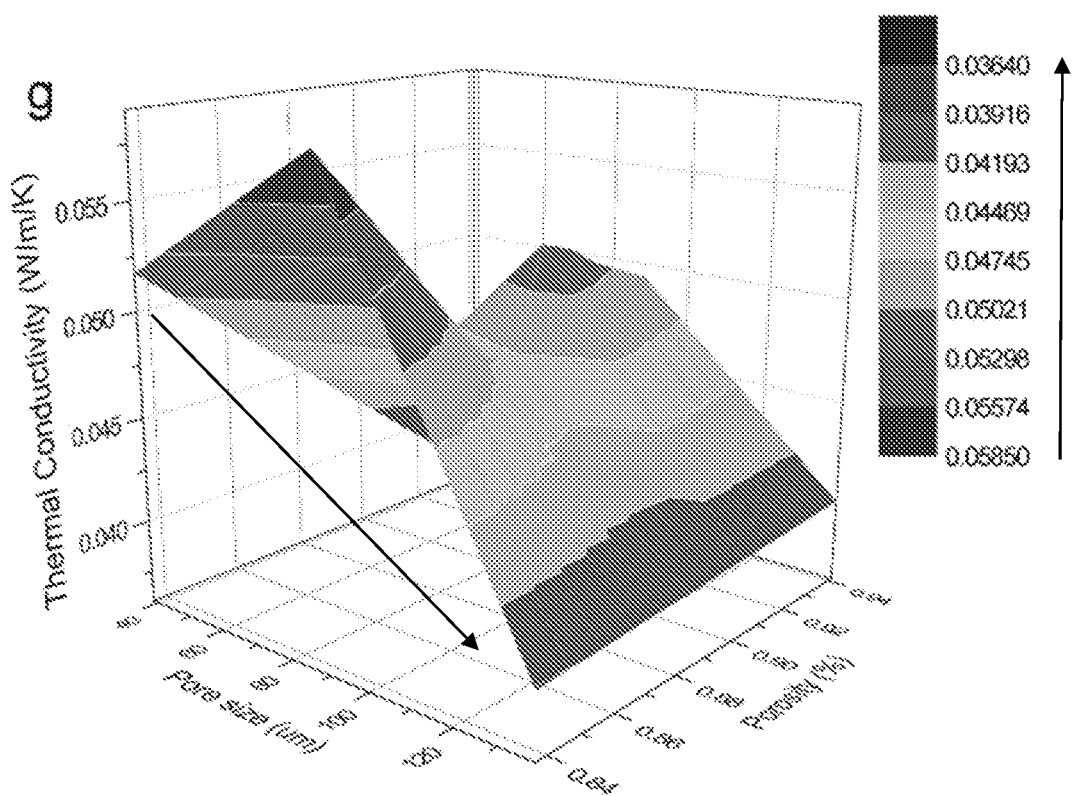

The average pore size and porosities was investigated by tuning the reaction conditions and their correlation with thermal conductivity of PGAeros (FIG. 29). Typical SEM cross-sectional images of silica PGAeros are shown in FIGS. 25a-f. The average pore size of each sample was calculated by counting more than 100 pores via SEM images as shown in FIG. 30a-g. Increasing the concentration of TEOS from 1.4 mol L$^{-1}$ of the PGAero-1 sample (with the average pore size of 138.3 µm and porosity of 94.1%) to 2.1 mol L$^{-1}$ and 2.8 mol L$^{-1}$ corresponding to PGAero-5 and PGAero-6, resulting in enhanced average pore sizes of 85.0 µm and 68.4 µm and porosities of 89% and 88% (FIG. 25a-c). The increase of TEOS concentrations decreases the average pore size and porosity, leading to a highly densified silica PGAeros which bring a higher thermal conductivity from 0.040 W m$^{-1}$K$^{-1}$ to 0.049 W m$^{-1}$ K$^{-1}$ (PGAero-5) and 0.055 W m$^{-1}$ K$^{-1}$ (PGAero-6). The increase of thermal conductivity mainly because the increase of solid thermal transport through the high-component silica network. The concentration of CTAB initially determines the pore size of the silica PGAeros, in which less CTAB component results in a smaller average pore size of PGAeros by comparing FIGS. 25a and 25d (PGAero-7). The urea addition serves as a mineralizing chemical and in-situ gas bubble foaming agent, and therefore increasing the urea addition can result in a larger pore size and lower mass density. As shown in FIGS. 25f and 25g, changing the urea from 1.5 mol L$^{-1}$ (PGAero-8) to 4.5 mol L$^{-1}$ (PGAero-9), the pore size of as-formed silica PGAeros can be significantly increased from 38.65 µm to 110.39 µm. The thermal insulating performance is highly correlated with the pore sizes and porosities of silica PGAeros. FIG. 25g shows the thermal conductivities of different silica PGAeros, dependent on the pore sizes and porosities. Large pore size and high porosity bring a low thermal conductivity of PGAeros. The lowest thermal conductivity of 0.040 W m$^{-1}$ K$^{-1}$ can be achieved by the silica PGAeros synthesized by TEOS:CTAB:Urea=27.8:1:60.7.

Figure 26:
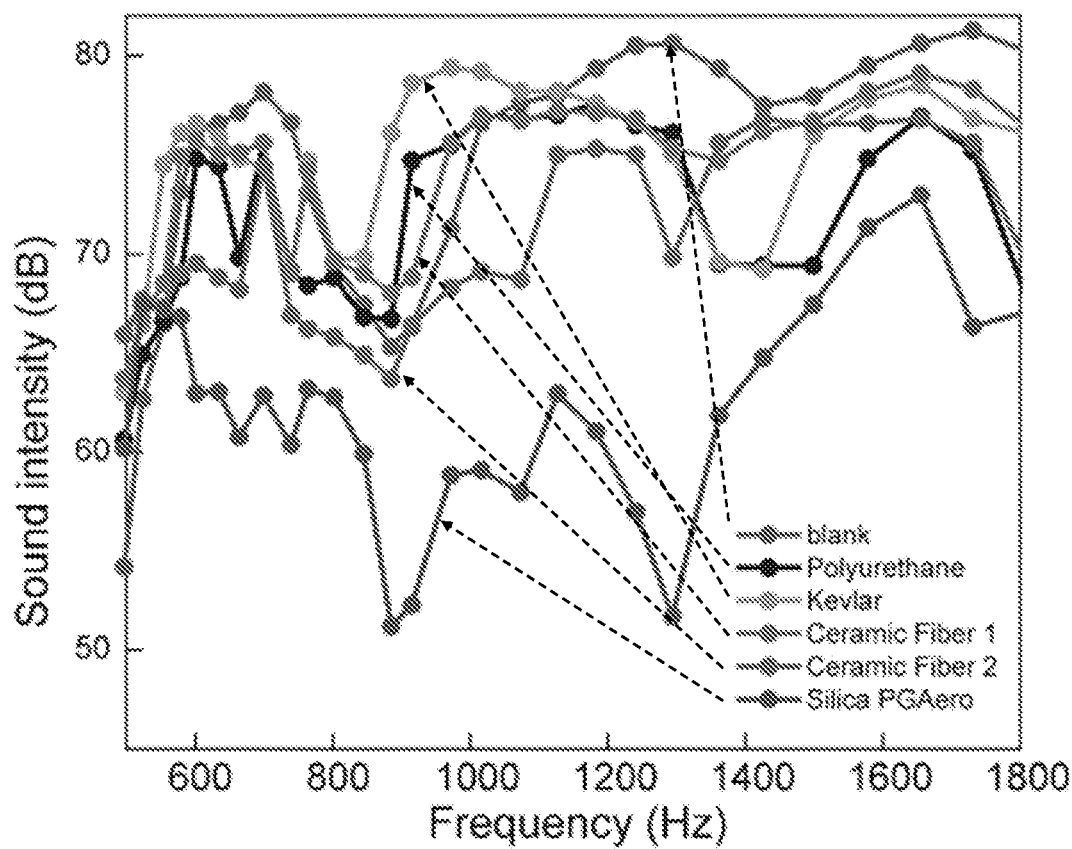
FIG. 26 shows a) mechanical property of silica PGAero before and after annealing treatment at 400° C. Inserts show the SEM images before (up) and after (bottom) annealing. b) Schematic figure shows heat and sound reduced by gradient structure of silica PGAero. c) Soundproof performance of silica PGAero compare to polyurethane, kavlar and two different types of ceramic fiber blankets from Unifrax (Ceramic fiber 1: PC-Max 2000i, Ceramic fiber 2: Saffil Alumina) under sound frequency from 500 Hz to 1800 Hz. d) Soundproof performance of silica PGAero and reference polystyrene foam under frequencies of 2000 Hz. e) Soundproof performance plot of sound intensity and soundproof coefficients at frequency of 500 Hz, 800 Hz, and 2000 Hz.
Figure 31:
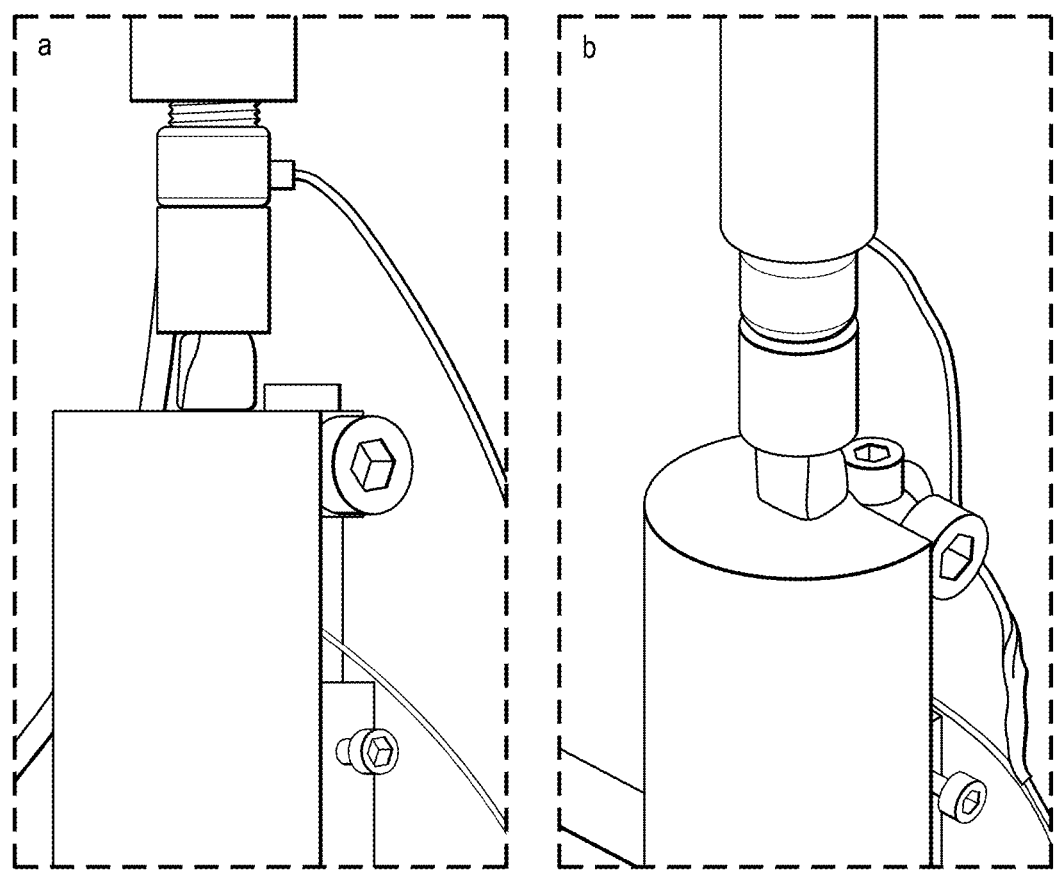
FIG. 31 shows a, b) photographs of a mechanical test.
Figure 33:
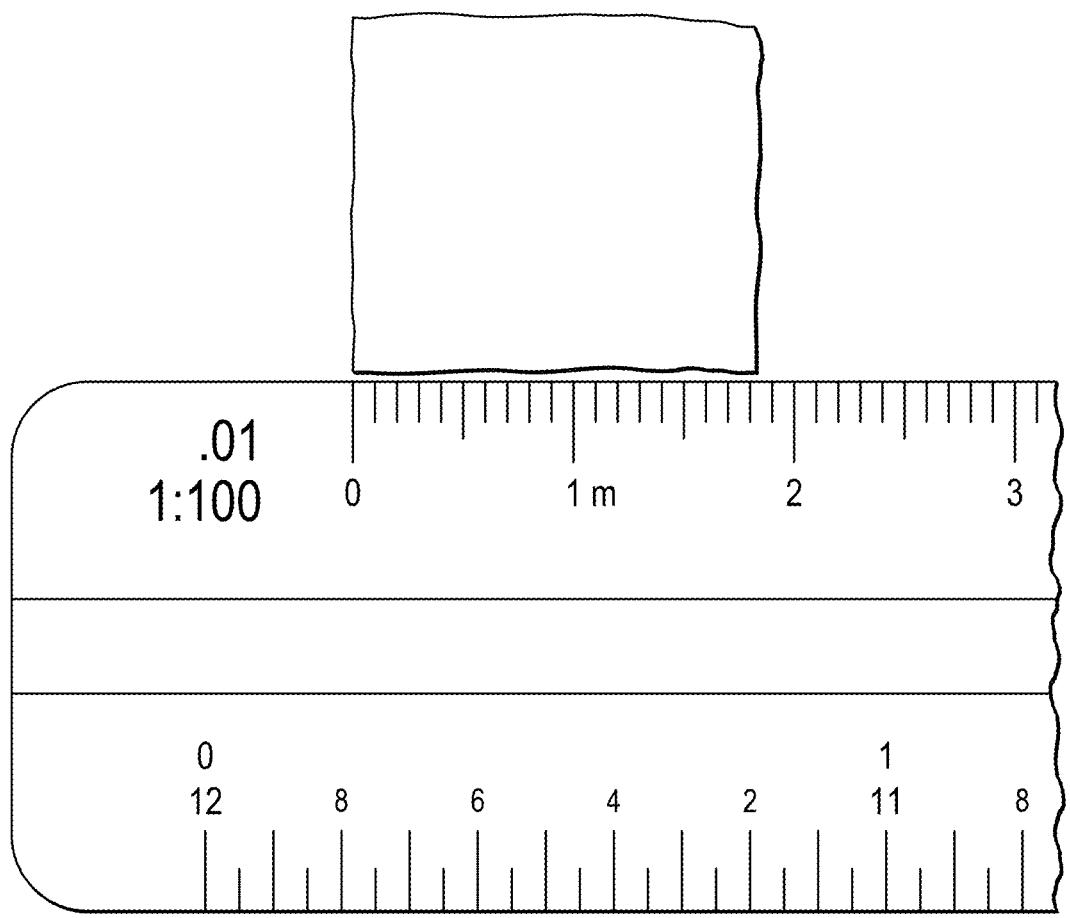
FIG. 33 shows a photo of a sample which was annealed at 1000° C. for 24 h.

Mechanical stability of silica aerogels is key to its large-scale commercial applications. The gradient pore structure has been reported with a great advantage on optimizing the mechanical performance. The silica PGAeros with pore gradient synthesized as a monolithic form had a high mechanical strength, which was characterized by the uniaxial compression test (FIG. 31). The stress-strain curve of silica PGAero-1 indicates a high mechanical strength with a high Young's module of 81.33 MPa which can be further increased to 100.56 MPa by a post annealing treatment at 400° C. for 2 h (FIGS. 26a and 32a-c). The inset of FIG. 26a shows the SEM images of silica PGAeros before (upper) and after (bottom) annealing, the robust pore structure renders the silica PGAeros with a good mechanical integrity. The silica PGAeros before and after annealing has a thermal conductivity of 0.040 W m$^{-1}$ K$^{-1}$ and 0.044 W m$^{-1}$ K$^{-1}$, respectively. The annealing treatment improves the mechanical property without compromising the insulating performance. Importantly, the mechanically robust foam can maintain the low thermal conductivity of 0.060 W m$^{-1}$ K$^{-1}$ after a long-term annealing at 1000° C. for 24 h as shown in FIG. 33. The highly mechanical robustness and thermal stability render the synthesized silica PGAero show great promising for the increased demanding of insulation materials applied to extreme environment.

Figure 34:
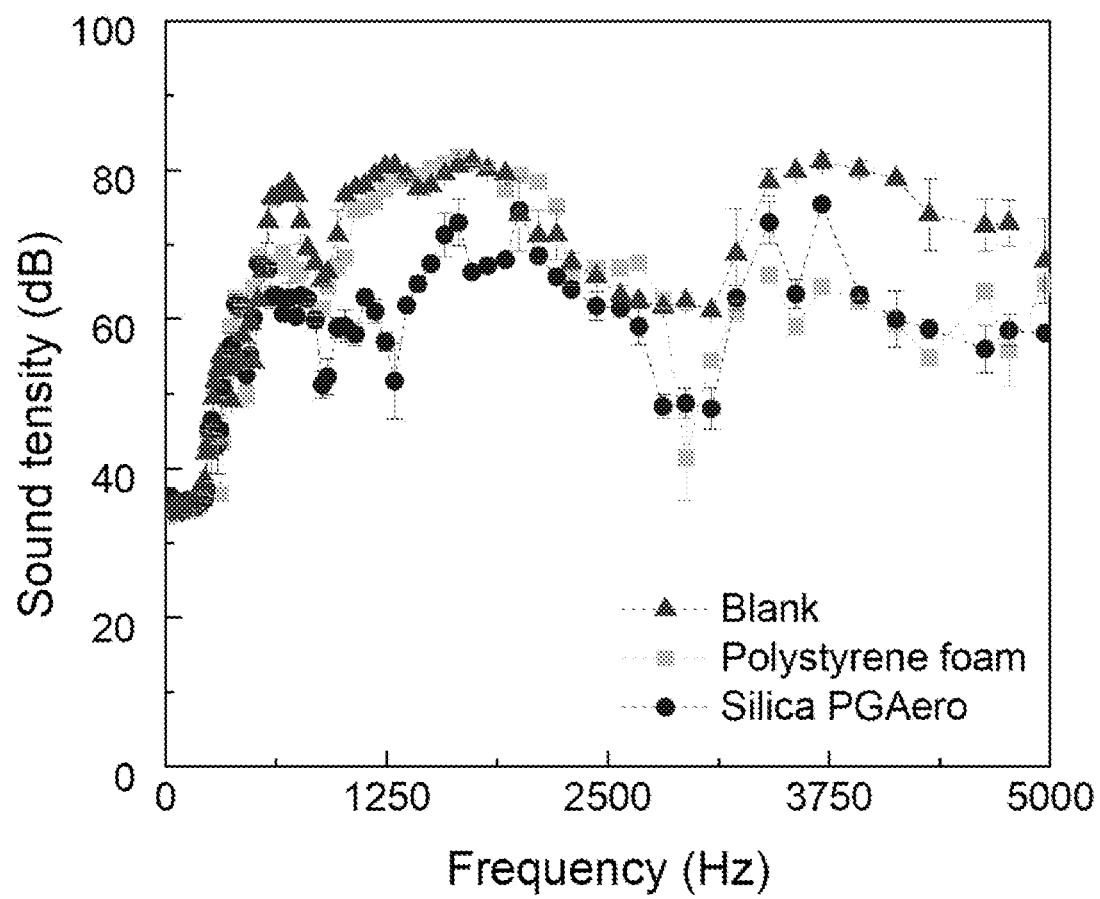
FIG. 34 shows sound intensity difference of blank, polystyrene foam and Silica PGAero between 20 Hz to 5000 Hz frequency.
Figure 35:
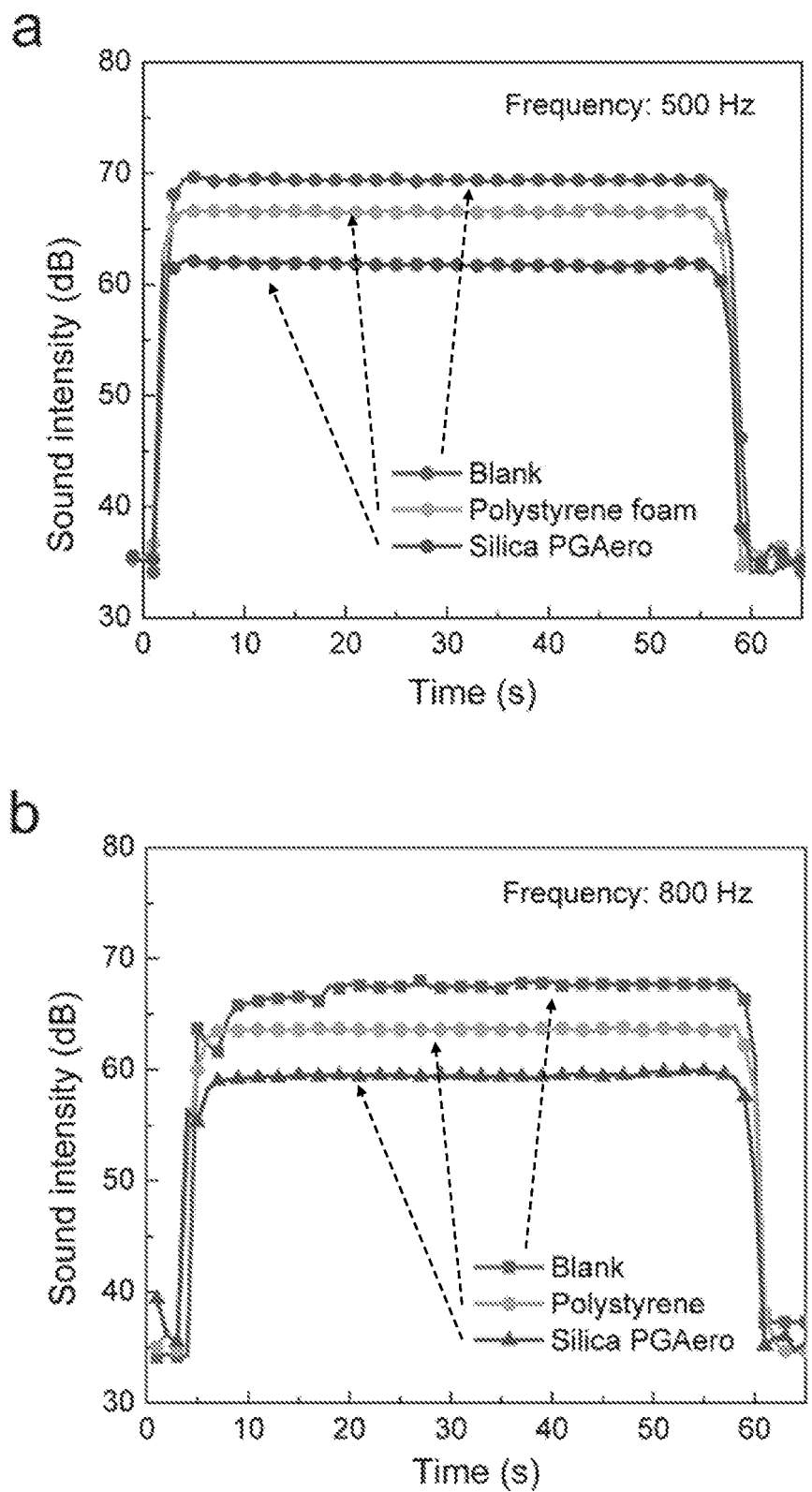
FIG. 35 shows sound intensity difference of 500 Hz and 800 Hz.
Figure 36:
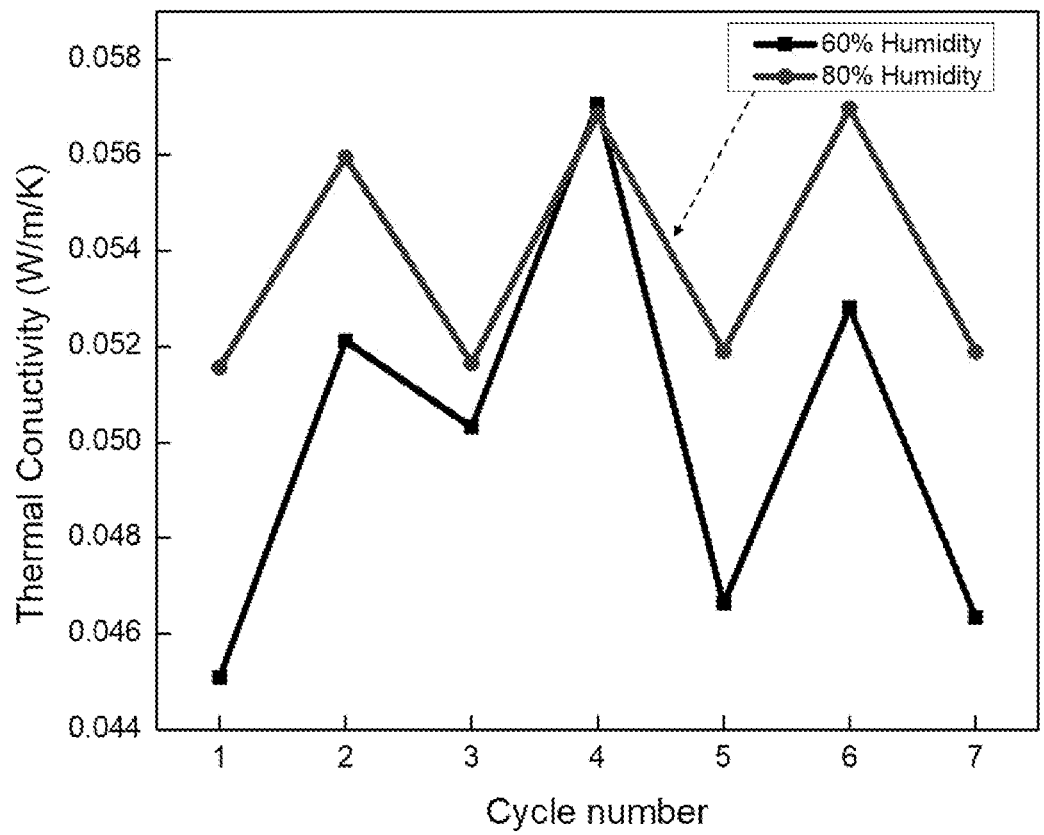
FIG. 36 shows humidity aging cycling measurement under 60% and 80% of silica foam.

The acoustic insulation for soundproof plays an important role in superinsulation applications. The sound wave and heat both could be significantly reduced by the silica PGAero with pore gradient structure, shown in FIG. 26b. The detected sound intensities without any sample (blank control) and through a silica PGAeros and polystyrene reference are plotted as shown in FIG. 34. Furthermore, several commonly used commercial soundproof material like polyurethane, Kevlar and two types of ceramic fiber blankets. The silica PGAero shows a low detected sound intensity across the whole frequency range from (500 Hz to 1800 Hz) indicating a much better soundproof performance compare to all those common used commercial soundproof materials shown in FIG. 26c. The silica PGAeros with a thickness of 0.014 m has a better soundproof performance comparing with the reference PS foam at different frequencies of 500 Hz, 800 Hz, and 2000 Hz, showing the noise reductions of 10.9%, 12.0%, and 28.4%, respectively (FIG. 26e, 35a, b). Especially under the sound frequency of 2000 Hz, FIG. 26d). To calibrate the thickness-independent soundproof performance, we define a soundproof coefficient by dividing the noise reduction with the sample thickness. The soundproof coefficients of silica PGAeros show 2.7, 2.0, and 18.2 times higher than those of the reference sample at 500 Hz, 800 Hz, and 2000 Hz, respectively. Besides mechanical and acoustic soundproof properties, the hygroscopic performance of silica PGAeros was investigated under a humid environment. Two kinds of PGAeros with an initial thermal conductivity of 0.045 W m$^{-1}$ K$^{-1}$ and 0.052 W m$^{-1}$ K$^{-1}$ were selected for the hygroscopic experiments under the humidity of 60% and 80%, respectively. High humidity condition results in an increased thermal conductivity, which can be recovered after drying at 60° C. (FIG. 36). The cycling experiments show that the thermal conductivity of PGAeros can be restored back to the initial point with a loss of less than 16%.

Light-weight silica PGAeros with a desirable porosity and a desirable pore gradient for thermal and acoustic superinsulation was developed. Micelle-mediated growth of silica and gas foaming process due to the thermal hydrolysis of urea together lead to the pore generation and gradient formation. The well-designed monolithic geometry with unique pore structures and ceramic nature provide such PGAeros with a superior thermal insulation and fire-resistant performance across a wide temperature range with a thermal conductivity as low as 0.040 W m$^{-1}$ K$^{-1}$ and high mechanical integrity of the compressive strength of 100.56 MPa. Such silica PGAeros also show a better soundproof property under different frequencies with sound reduction by 28.3%, or 22.3 db at a thickness of 15 mm at frequency of 2,000 Hz higher than that of the reference insulating foam. Stability under humidity environment also has been proven to be reliable for long-term period. It is expected that a material with high thermal insulation and soundproof performance and in the meantime maintain the thermal conductivity could be suitable for next generation construction materials and other applications.

Materials and Experiment. Experimental: Preparation: Add in 3 mol L$^{-1}$ g Urea (Sigma-Aldrich), 0.3 mol L$^{-1}$ CTAB (VWR), 1 mmol Acetic Acid (EMD Millipore Corporation) dissolved with distilled water to 100 ml in beaker stirring for 3 h till to all transparent solution. Then 1.4 mol L$^{-1}$ TEOS (Sigma-Aldrich) was add into the solution. Continue stirring for 10 minutes, the solution turns to homogeneous semitransparent. Then transfer the solution to plastic bottle, and tightly seal the container. Then place the container into the oven which preheated to 60° C. for 4 days. After this gelation process, sample was taken out from the container to distilled water preheated to 60° C. for two days. During this washing process, water has been changed several times till the supernatant water is clear and all ammonia is removed. The sample was placed into the preheated oven at 60° C. for two days for drying purpose right after the washing step completed.

Characterization: Thermal conductivity measurement home customized follow the ASTM C518 standard thermal conductivity procedure. Using heat flux sensor bought from Fluxtaq company and calibrated with reference polystyrene commercial heat insulation material.

Acoustic test, home customized sound box with sound insulation material inside and sound detector bought from Kasuntest. Different thickness sample test under different frequency generate by the sound source.

Pycnometer test using helium gas to penetrate the porous sample in the chamber to get the volume of the solid part of the sample. With known the solid part of the sample we can calculate the porosity of the silica foam sample.

Mechanical test, both original silica foam sample and after 400° C. heat synthesis bulk sample with compression test under different load with multiple cycling times.

Humidity aging cycling test measures the thermal conductivity of the sample. The sample was placed under each humidity environment for 24 h and dried in the preheated oven for another 24 h and repeat the cycling.

Example 6

This example provides a description of making ceramic foams materials of the present disclosure and characterization of same.

Experimental method: Add in 3 mol L$^{-1}$ g Urea (Sigma-Aldrich), 0.3 mol CTAB, Cetyltrimethylammonium bromide (VWR)/SDS, Sodium dodecyl sulfate (Sigma-Aldrich), 1 mmol Acetic Acid (EMD Millipore Corporation) dissolved with distilled water to 100 ml in beaker Stirring for 3 hours till the solution became all transparent. Then 1.4 mol L$^{-1}$ TEOS (Sigma-Aldrich) was add into the solution. Continue stirring for 10 minutes, the solution turns to homogeneous semi-transparent. Then transfer the solution to aluminum vessel, and tightly seal the container. Then place the container into the oven which preheated to 60° C. for 4 days. After this gelation process, sample (monolith and gel) was taken out from the container to a container filled with distilled water preheated to 60° C. for two days. During this washing process, water has been changed several times till the supernatant water is clear and all ammonia is removed. Then sample (gel) was stored in a sealed container for further application.

Figure 37:
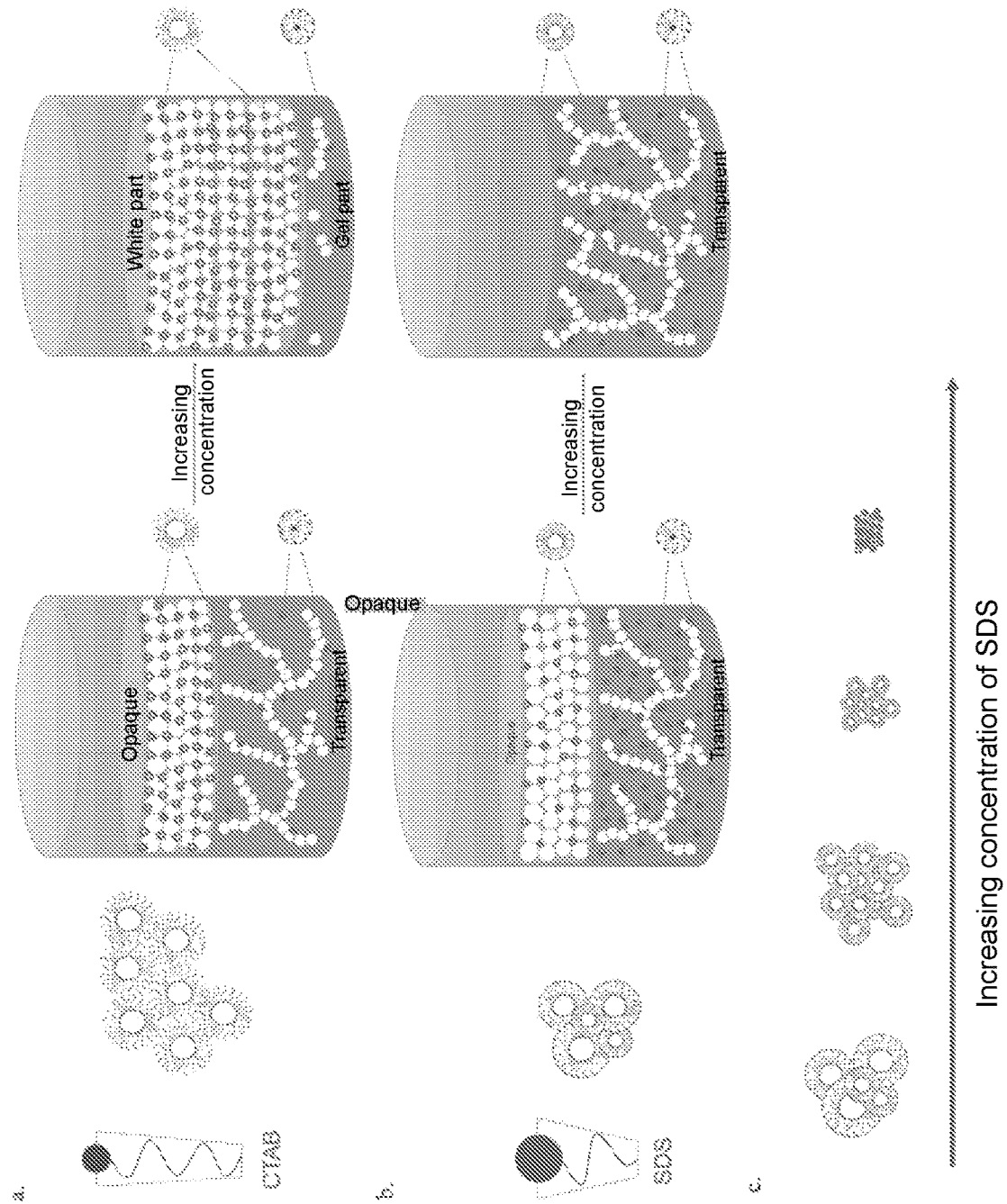
FIG. 37 shows a schematic showing that the opaque and transparent phase changing with increasing concentration of surfactant. a) For surfactant CTAB, the opaque phase becoming more with increasing concentration of CTAB, due to hydrophilic particle is the majority in the precursor. b) For surfactant SDS, the transparent phase becoming more with increasing concentration of SDS, due to hydrophobic particle is the majority in the precursor. c) Micelle formation changing for SDS with increasing concentration of SDS. Micelle formation becoming more organized and each micelle particle becoming smaller with increasing concentration of SDS.
Figure 38:
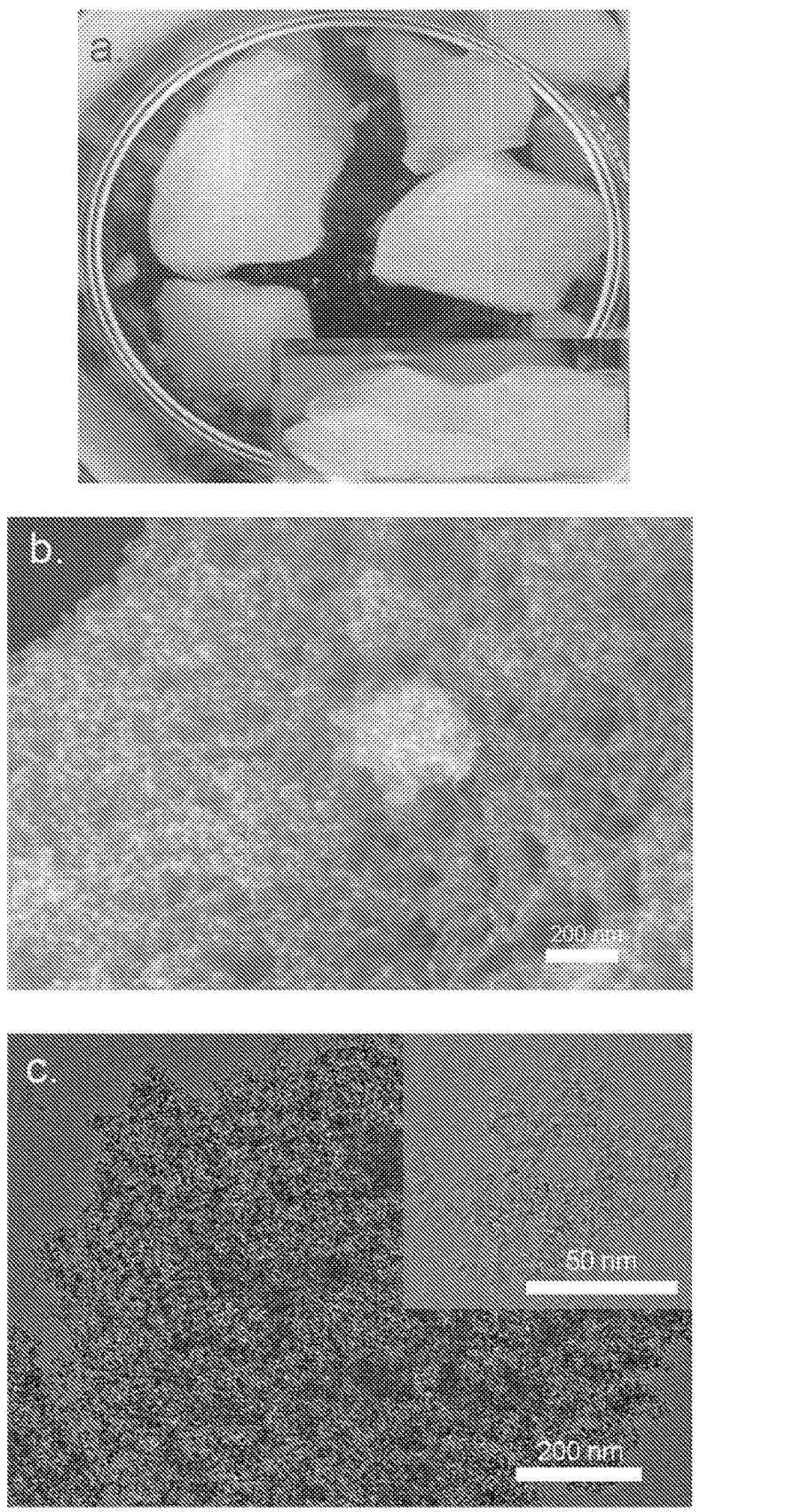
FIG. 38 shows a) optical image of gel part. b, c) SEM and TEM shows the micro structure of gel part. d) Gel part density and porosity changing with concentration of SDS. e) Thermal conductivity and average pore size and density relationship. f) Shows BET result of gel part.
Figure 38:
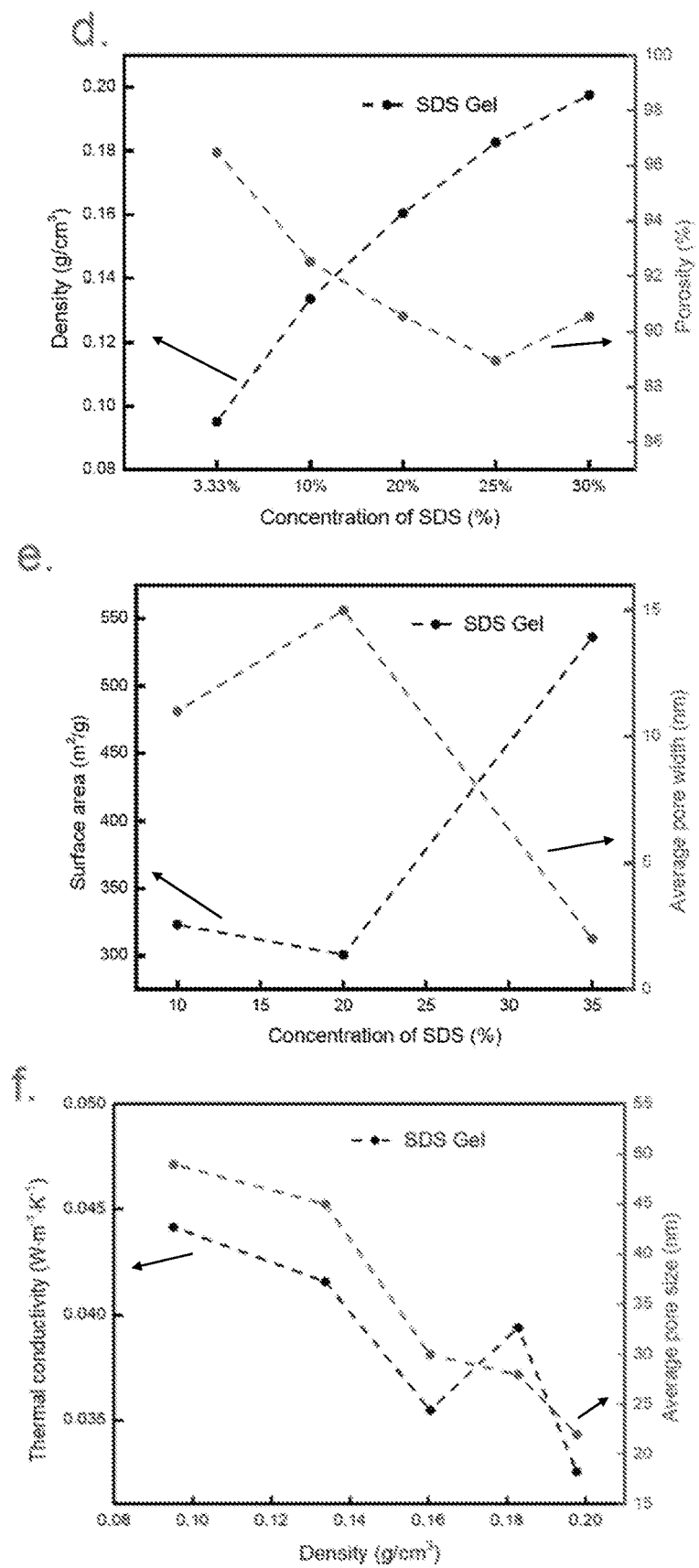
Figure 39:
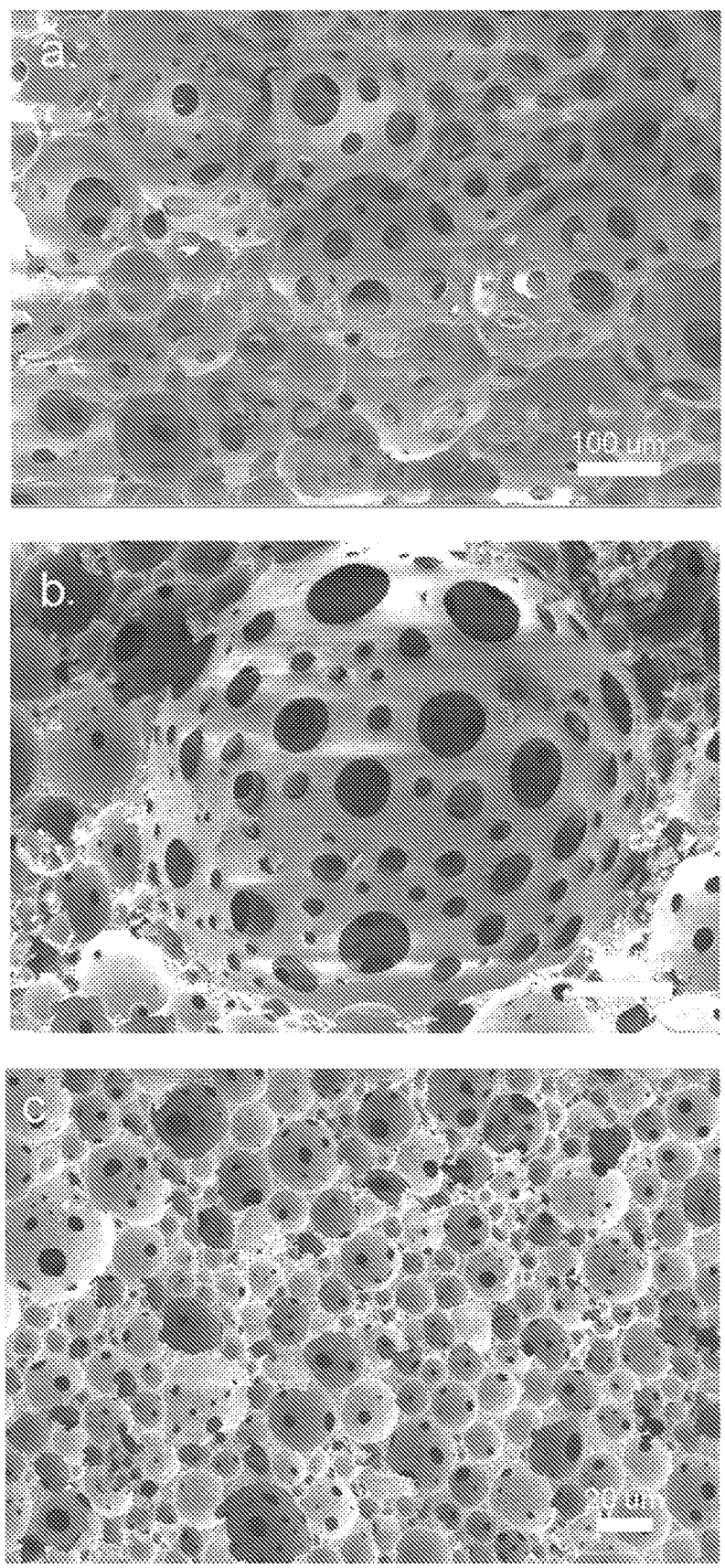
FIG. 39 shows a, b, c) SEM images show structure of white part transformation change from open pore to close pore. d) Optical image of white part. e) Density and porosity change with concentration of SDS. f) Thermal conductivity and density, average pore size relationship.
Figure 39:
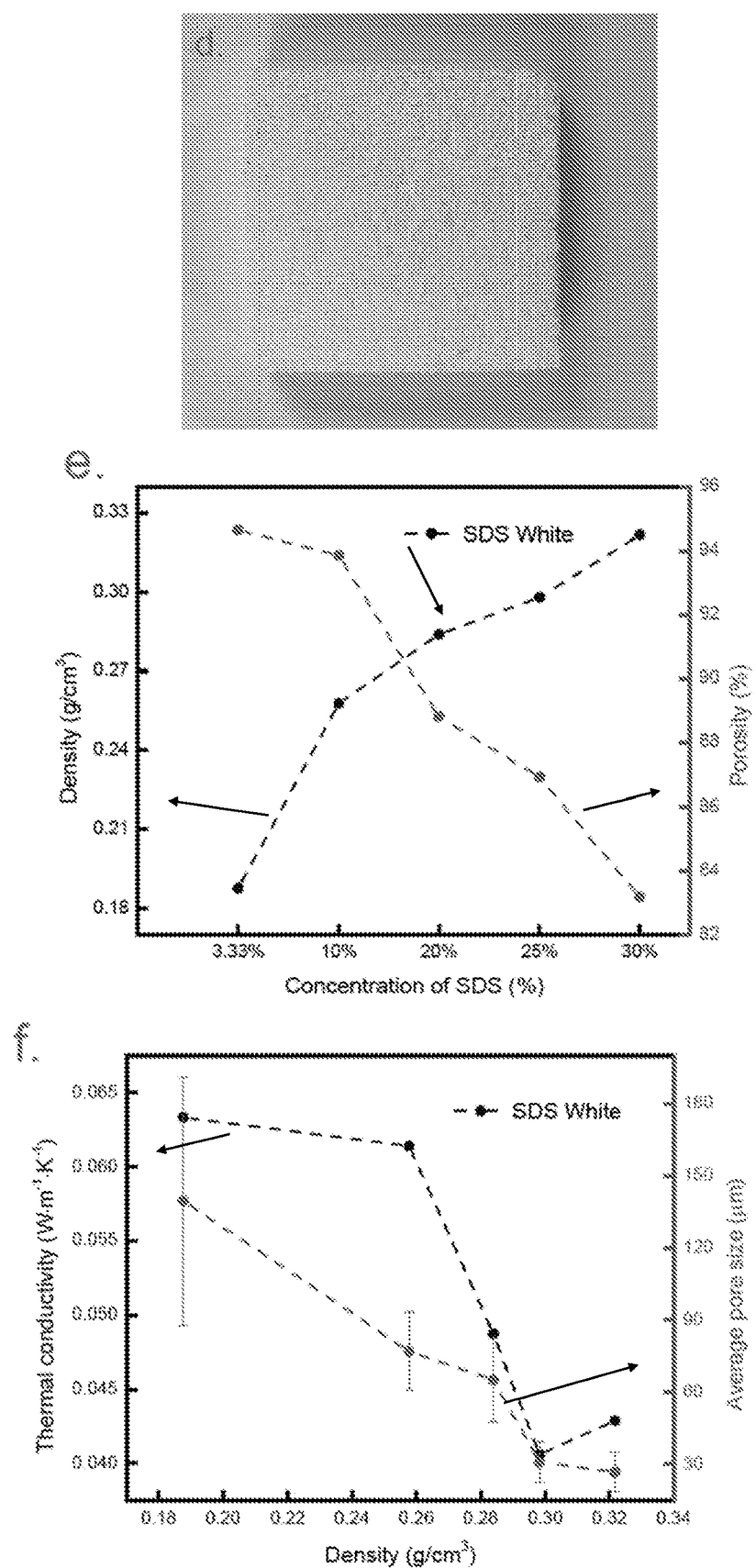
Figure 40:
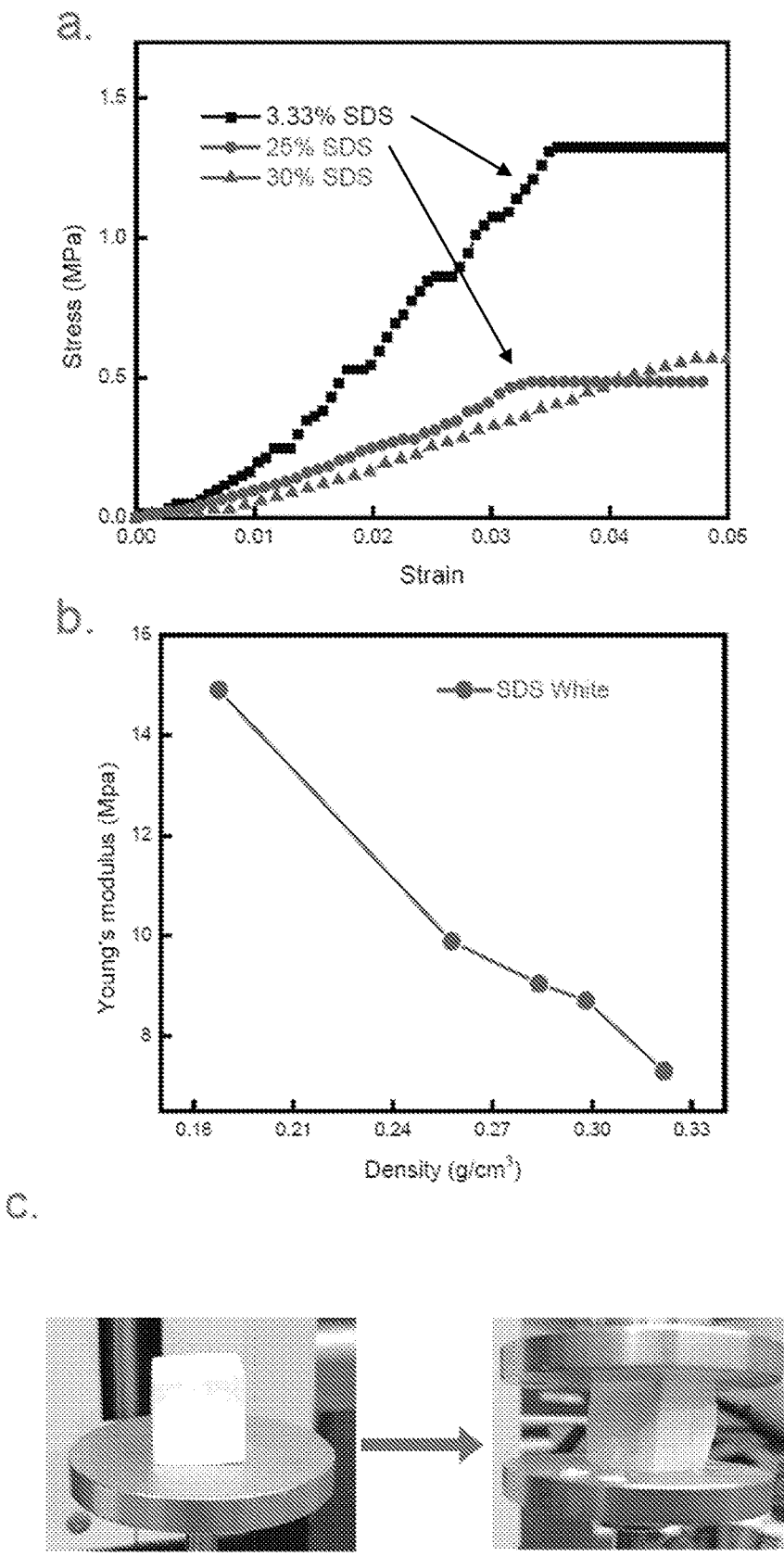
FIG. 40 shows a) strain stress curve shows high mechanical strength. Mechanical strength becomes lower with increasing concentration of SDS. b) Young's modulus decreasing with increasing density due to increasing concentration of SDS. c) Optical images of 3.33% SDS sample before and after mechanical compressive test.
Figure 41:
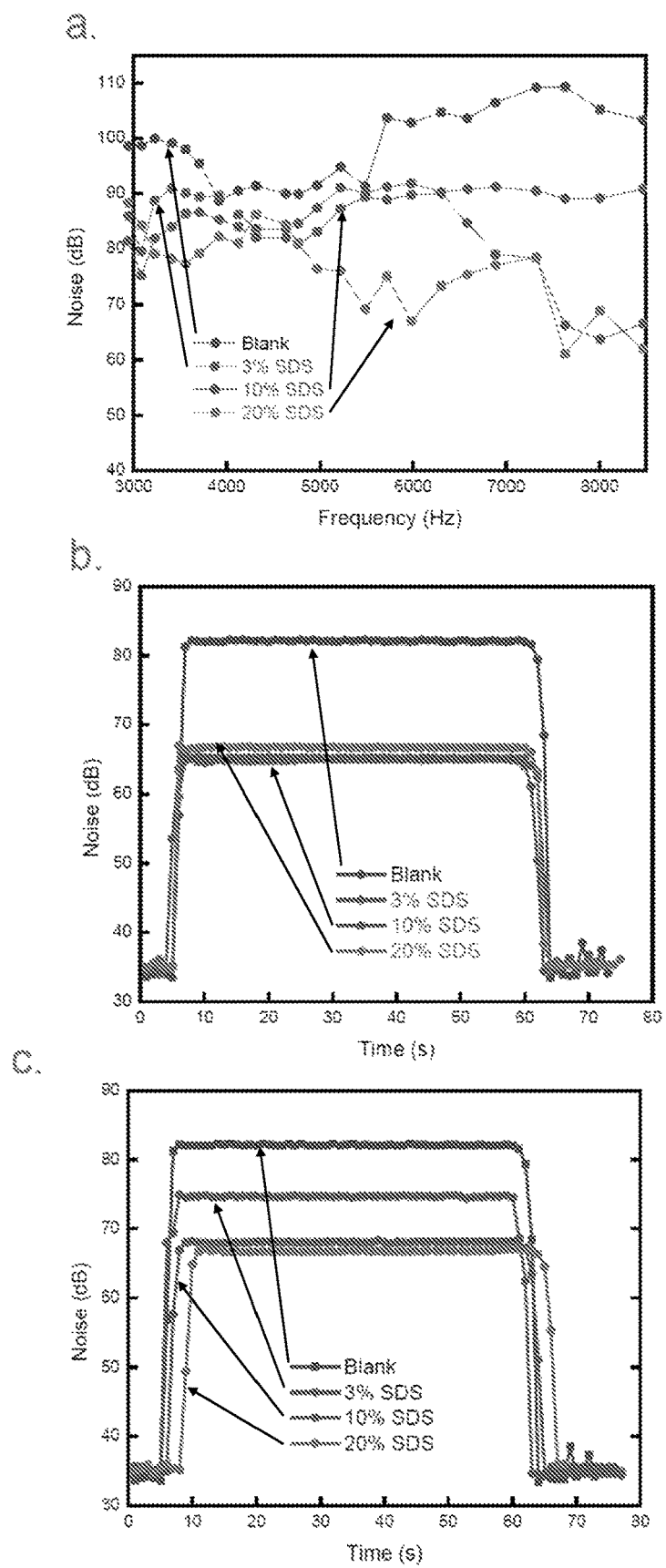
FIG. 41 shows a) soundproof performance of different concentration of SDS under high sound frequency from 3000 Hz to 8500 Hz. b) Soundproof performance of different concentration of SDS under sound frequency of 500 Hz. c) Soundproof performance of different concentration of SDS under sound frequency of 800 Hz.

FIG. 37 shows a schematic of a ceramic foam making process. FIGS. 38-41 show various characterizations of examples of the ceramic foams made in the example.

Although the present disclosure has been described with respect to one or more particular embodiments and/or examples, it will be understood that other embodiments and/or examples of the present disclosure may be made without departing from the scope of the present disclosure.

The invention claimed is:

1. A method for forming a ceramic aerogel comprising:
    contacting
      a ceramic precursor;
      a pore-forming gas-forming additive selected from urea and a combination of sodium bicarbonate and urea;
      a catalyst; and
      a surfactant,
      wherein the contacting results in formation of an inert gas and a ceramic aerogel having a pore gradient structure.

2. The method of claim 1, wherein the ceramic precursor is selected from a silica precursor, an alumina precursor, a transition-metal oxide precursor, and combinations thereof.

3. The method of claim 2, wherein the silica precursor is chosen from tetraalkoxysilanes, alkyltrialkoxysilanes, sodium metasilicates, and/or combinations thereof;
    wherein the alumina precursor is chosen from aluminum alkoxides, alumatrane, tris(alumatranyloxy-i-propyl) amine, and/or combinations thereof;
    wherein the transition-metal oxide precursor is chosen from transition metal alkoxides.

4. The method of claim 1, wherein the catalyst is an acid catalyst, selected from protic acids, hydrohalic acids, and combinations thereof.

5. The method of claim 1, wherein the ceramic precursor, the pore-forming gas-forming additive, and the surfactant are contacted and then the catalyst is contacted with the ceramic precursor, the pore-forming gas-forming additive, and the surfactant;
wherein the contacting comprises mixing: the ceramic precursor, which may be disposed in water, a solvent, or a combination thereof, the pore-forming gas-forming additive, which may be disposed in water, and the catalyst, which may be disposed in water; and/or
wherein the contacting is carried out at a temperature of from room temperature to 70° C. and/or for 1 minute to 96 hours.

6. The method of claim 1, wherein the ceramic precursor is present at 2 to 10% by weight, based on the total weight of the ceramic precursor, the catalyst, the pore-forming gas-forming additive, and the surfactant;
wherein the pore-forming gas-forming additive is present at 0.4 to 2% by weight, based on the total weight of the ceramic precursor, the catalyst, the pore-forming gas-forming additive, and the surfactant;
wherein the catalyst is present at 1 to 2% by weight, based on the total weight of the ceramic precursor, the catalyst, the pore-forming gas-forming additive, and the surfactant;
wherein the surfactant is present at 200 to 1000% by weight, based on the total weight of the ceramic precursor, the catalyst, and the pore-forming gas-forming additive; and/or
wherein a ratio of the ceramic precursor:the pore-forming gas-forming additive:the catalyst:the surfactant is 5:1:1:50.

7. The method of claim 1, further comprising:
forming a layer of hydrophobic carbon-containing material disposed on at least a portion of a surface of the ceramic aerogel;
forming a film from the ceramic aerogel, wherein the film is formed on a substrate, wherein the forming is a continuous process, wherein the forming is carried out by doctor blading, drop casting, or additive manufacturing, and/or wherein the film is formed by spray coating of a gelled form of a reaction mixture comprising the ceramic precursor, the pore-forming gas-forming additive, the catalyst and the surfactant;
impregnating a substrate with the ceramic aerogel; and/or
decorating or coating at least a portion of a surface of the ceramic aerogel, wherein the ceramic aerogel is decorated or coated with a material, wherein the material comprises nanoparticles, wherein the nanoparticles are formed by impregnating the ceramic aerogel with a nanoparticle precursor and a nanocomposite material is formed.

8. The method of claim 2 wherein the silica precursor is selected from tetramethylorthosilicate, tetraethylorthosilicate, methyltrimethoxysilane, sodium silicate and combinations thereof.

9. The method of claim 1 wherein the catalyst is a base catalyst selected from ammonia, ammonium fluoride, ammonium hydroxide and combinations thereof.

10. The method of claim 4, wherein the catalyst is acetic acid.

11. The method of claim 1, wherein the surfactant is selected from cetyltrimethylammonium bromide and sodium dodecyl sulfate.

* * * * *